US008788585B2

(12) United States Patent
McBrearty

(10) Patent No.: US 8,788,585 B2
(45) Date of Patent: Jul. 22, 2014

(54) INTERACTIVE EXPERIENCE SHARING AND EVALUATION SYSTEM AND METHOD HAVING HIGHLY CUSTOMIZABLE INDIVIDUAL SECURITY LEVEL SETTINGS

(75) Inventor: Alan McBrearty, Boca Raton, FL (US)

(73) Assignee: Alpha Sun & Sport—AS&S, LLC, Pompano Beach, FL (US)

( * ) Notice: Subject to any disclaimer, the term of this patent is extended or adjusted under 35 U.S.C. 154(b) by 293 days.

(21) Appl. No.: 13/252,666

(22) Filed: Oct. 4, 2011

(65) Prior Publication Data
US 2012/0084362 A1  Apr. 5, 2012

Related U.S. Application Data

(60) Provisional application No. 61/389,673, filed on Oct. 4, 2010.

(51) Int. Cl.
*G06F 15/16* (2006.01)
(52) U.S. Cl.
USPC .......................................................... 709/204
(58) Field of Classification Search
USPC ......... 709/204, 201–203, 205–207, 217–219, 709/227, 229; 707/758, 769–771, 733, 708, 707/734; 705/1, 14, 26.1–26.9, 27.1–27.2, 705/37, 1.1; 715/733–759
See application file for complete search history.

(56) References Cited

U.S. PATENT DOCUMENTS

| | | | | |
|---|---|---|---|---|
| 2008/0120178 | A1* | 5/2008 | Martinez et al. | 705/14 |
| 2009/0112729 | A1* | 4/2009 | Shah | 705/26 |
| 2009/0307003 | A1* | 12/2009 | Benyamin et al. | 705/1 |
| 2011/0016014 | A1* | 1/2011 | Tonnison et al. | 705/26.2 |
| 2011/0179116 | A1* | 7/2011 | Solomon et al. | 709/204 |

* cited by examiner

*Primary Examiner* — Ruolei Zong
(74) *Attorney, Agent, or Firm* — Symbus Law Group LLC; Clifford D. Hyra

(57) ABSTRACT

An interactive experience sharing and evaluation system is implemented through a website in one easy step. Users submit information in the form of journal entries about experiences they have had, which can include photos, videos, a rating, and comments with varying privacy levels. Other users can search through these journal entries according to their security access level and add their own information, rating, comments, etc. Users also can provide personal information and search through and connect with other users and communicate with one another regarding submitted experiences. Users construct a dream-list of desired future experiences and set up ongoing searches for new information submitted regarding the users' interests. Custom information is provided to users on the basis of the contents of their dream-lists, and include advertisements.

21 Claims, 72 Drawing Sheets

INTERACTIVE EXPERIENCE SHARING AND EVALUATION SYSTEM AND METHOD HAVING HIGHLY CUSTOMIZABLE INDIVIDUAL SECURITY LEVEL SETTINGS

This application claims the benefit of U.S. Provisional Application No. 61/389,673, filed Oct. 4, 2010, which is hereby incorporated by reference in its entirety.

BACKGROUND

Numerous social networking sites have come into existence in recent years. However, these sites have many limitations.

Needs exist for improved systems for integrated planning, cataloging, sharing, discussing, and searching of activities and experiences, for precisely controlling access to the activities and experiences, and for organizing and storing such activities and experiences and related information and relationships. Needs exist for improved systems for bringing together active enthusiasts of all kinds and catering to their needs and interests.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

An interactive experience sharing and evaluation system is implemented through a website. Users submit information about experiences they have had, which can include photos, videos, a rating, and comments with varying privacy levels. Other users can search through this information and add their own information, rating, comments, etc. Users also can provide personal information and search through and connect with other users and communicate with one another regarding submitted experiences. Users construct a dream-list of desired future experiences and set up ongoing searches for new information submitted regarding the users' interests. In some embodiments custom information is provided to users on the basis of the contents of their dream-list, and includes advertisements. This information in some embodiments is provided directly through the website and in other embodiments is provided by third parties through or outside of the website.

All of a user's photos and videos can be uploaded to the site and managed in a central location. Advanced search features allow a user to quickly retrieve the photos and videos they are looking for later. Thus, a user no longer needs to worry about keeping these treasured photographs and videos on a physical device vulnerable to damage and loss or about losing track of individual photos and videos scattered in different websites, physical media, etc.

A user can submit information about an event or activity—which may be a vacation, an activity lived or performed (scuba diving, para-sailing, rock climbing, going to the beach, etc.) a location visited, or another life experience like getting a driver's license, getting married, going out on the town, eating at a restaurant, taking a class, etc. The information can include details like location, cost, rating, type of activity, etc., as well as photographs, videos, links and the like. The information can be submitted in the form of a journal entry, creating a record of an event that has already taken place, as an event scheduled to take place in the future, or as a dream list entry, which details activities or experiences the user would like to have at an indefinite point in the future.

The user can easily transform such information from one category to another—for example from a dream list entry to a scheduled event, from a scheduled event to a journal entry, or from a scheduled event back to a dream list entry, as activities are planned, take place, or are canceled. The information can be updated, modified and added to during the transformation. When an event is created, other (selected) users can be invited to participate in the activity.

This information is made available to other users to view and search through according to the security settings assigned by the user for each individual entry. The user can easily designate which users can view each element of the information submitted. For example, one set of users may be able to see certain videos while only a different set of users can see other videos, as set by the submitting user, although both sets of users are viewing information about the same activity or experience. In certain embodiments, during the process of entering the information for submission, fields are presented to the user that correspond to various security levels, for example sharing with friends and sharing with communities or globally. Each field may then be customized, for example the field for sharing with friends may be limited to selected friends. The user enters information into each field as appropriate. Thus, there can be a single entry including a variety of information under a variety of security settings, all of which can be established in a single simple step. In various embodiments, different numbers of fields are available, corresponding to different security settings, and the level of available customization of the fields varies, for example there may be no customization or each field may be completely customizable. This ability to easily submit information grouped together, but with each individual element having its own security settings, powerfully addresses the growing need for privacy controls in online interaction.

The process of setting which users can see which elements is made easier in some embodiments by a variety of organizational tools. A user can add other users as friends and group those friends as desired without limitation, and then choose to share certain elements with those pre-organized groups. A user can choose to be associated with a community (for example, dedicated to scuba diving, or Australia, etc.) and then permit all users associated with that community to view certain elements of information.

The user can search through and view information submitted by other users and, upon seeing an activity or experience that the user has had in the past, has scheduled for the future, or is interested in having in the future, can transform that other user's information into the user's own journal entry, event, or dream list entry, as appropriate. The user can modify and add to the information at the time of transformation. The user can easily search for activities of interest by searching in a given location or for a certain type of activity and sorting by cost and/or rating, can search within cost, rating, or geographical ranges, can search or organize search results by community members and specific users or groups of users, and by a variety of other criteria. The user will be able to view a wide variety of activities falling within the desired search criteria with incredible detail to best plan their future activities. The site will ultimately create the world's largest database of autobiographies. A user may search for the entries of a specific person, for example a celebrity, relative, or friend. If desired, users can make this autobiographical information freely available to other users.

Users can interact with the information submitted by other users in a variety of ways, for example by commenting on them (with text or a video, photo, or link for example), by rating them, or by indicating approval (for example, clicking a "Like" button). The interaction of other users is visible to the same people as the element or entry that is being commented on. In some embodiments, the interacting users can choose for the interactions to be visible to a subset of the users who can see the element or entry that was commented on. When a user interacts with the information, the user who originally submitted the information is notified of the interaction, and the interaction appears on a main page for the user for the user's review. Along with the interaction is all of the originally submitted information, which is expandable/collapsible. Initially, this information is contracted to take up less space on the user's main page, but expands on demand so that a user can understand the context of the interaction immediately, even if some time has passed since the original material was submitted. The interaction and originally submitted information may also be displayed this way to other users, for example other users who have interacted with the originally submitted information.

When a user creates an event or dream list entry, targeted advertisements may be directed to the user for products that might be helpful to the user for that event or dream list entry. For example, baseball equipment might be advertised for an upcoming baseball game, rock-climbing equipment for a rock-climbing expedition, etc. This targeting can be tailored over time based on user response rates to various advertisements for various types of events and entries, as well as based on the user's personal information if any, other journal entries, events, and dream list entries, etc.

Adding desired experiences to a dream list helps a user to remember all the things they have seen or heard about that they thought to themselves they would one day like to experience. It can serve as a "bucket list." It keeps the user's dreams together in one place, in a vivid format that may include accompanying pictures and videos from others who have lived that dream. This keeps the dreams in the user's mind, as do custom advertisements tailored for the various dreams, motivating the user and making the user more likely to one day achieve those dreams. The dreams being available to other users/the public also motivates the user to turn those dreams into a reality and convert them into journal entries (or events). Seeing previous experiences in journal entries can also motivate the user to achieve other goals and dreams. The site thus serves as an effective motivational and self-help tool.

In a new method, information related to experiences and activities is received from a user, information received from the user is stored on a non-transitory computer-readable medium and associated with the user from which it was received, the information related to experiences and activities received from the user is displayed to other users, information is received from another user related to the displayed information related to experiences and activities, stored, associate with the displayed information related to experiences and activities, and displayed to users. The received information related to experiences and activities is categorized and displayed in a first category for experiences and activities indicated to have already taken place, in a second category for experiences and activities indicated to be taking place at a definite time in the future, and in a third category for experiences and activities indicated not to have taken place and not having been scheduled for any definite time in the future. Information is received from the user indicating that information related to an experience or activity has moved from one category to another, the information is re-categorized accordingly, and the information is modified or added to as part of the re-categorization process. Information associated with the user in one category is converted into information associated with a second user in a second category, and the information is modified or added to as part of the conversion process.

These methods may be carried out by software modules programmed on a server. The software modules may together make up one or more programs and the various steps of the method may be carried out by various software modules. For example, there may be a single software module for each step, or a single software module may carry out multiple steps. Users may access the program via an Internet connection and web browser as discussed below in detail.

Advertising information may be transmitted to the user related to stored information associated with the user. The stored information received from users may include multiple elements, and a security level associated with each element may be received, where the security level dictates which other users the information can be displayed to. The information received from the other user related to the displayed information related to experiences and activities may be displayed only to users the displayed information related to experiences and activities can be displayed to, as specified by the associated security level. An indication may be received from two users that they desire to be associated as friends of one another and the two users may be associated as friends and an indication may be received from the user that the user desires to be associated with a community and the user may be associated with the community. The security level may allow the associated element to be displayed to either a) only the user, b) only the user or the user's specified friends or groups of friends, c) only the user or the user's friends, d) only the user, the user's friends, or members of specified communities the user is associated with, e) only the user, the user's friends, or members of communities the user is associated with, or f) all users.

The user's friends may be organized into groups received from the user, and each of the user's friends may be members of one or more of the groups. The information received from the other user related to the displayed information related to experiences and activities may be displayed only to a subset of the users the displayed information related to experiences and activities can be displayed to, as specified by the associated security level, wherein the subset is received from the other user. The information related to experiences and activities may include videos, photographs, comments, locations, costs, and ratings. Public and private messages may be transmitted between users. A user query may be received including search terms and one or more results categories and stored information related to experiences and activities relevant to terms of the query, viewable by the user, and falling under the results categories received may be displayed. The search terms may include one or more of the following: location, type of experience or activity, cost, and rating. The information from another user related to the displayed information related to experiences and activities is displayed to the user on a main website page together with the information related to experiences and activities in expandable/collapsible form.

In a new method, information related to an experience or activity is transmitted, including the date on which it occurred, the date for which it is planned, or that it has not occurred or been planned, to a central computing device over a network for storing and sharing with other users, transmitted information is updated to reflect that a scheduled experience or activity has taken place or been canceled, or to reflect that an experience or activity with no associated date has been scheduled or has taken place, information submitted by another user regarding the transmitted information is received and viewed, information submitted by other users pertaining to their experiences and activities is viewed, and information submitted by another user pertaining to the other user's experience or activity is viewed on a graphical user interface, the information is added or modified on the graphical user interface so that the information pertains to the user's own experience or activity, including whether and when the experience or activity took place or is scheduled, and the information is transmitted to the central computing device over a network for storing and sharing with other users.

The transmitted information related to an experience or activity may include multiple elements, and a security level associated with each element is transmitted, where the security level dictates which other users can view the information. Information relating to information submitted by another user pertaining to the other user's experience or activity is transmitted for sharing with other users. A friend request from another user is accepted and a request may be made to be associated with a community. The security level may allow the associated element to be displayed to either a) only the user transmitting the associated element, b) only the user transmitting the associated element or the user's specified friends or groups of friends, c) only the user transmitting the associated element or the user's friends, d) only the user transmitting the associated element, the user's friends, or members of specified communities the user is associated with, e) only the user transmitting the associated element, the user's friends, or members of communities the user is associated with, or f) all users.

Friends may be organized into one or more groups, and each friend may be a member of one or more of the groups. A user query including search terms and one or more results categories may be transmitted and information submitted by another user pertaining to the other user's experience or activity related to experiences and activities relevant to terms of the query and falling under the results categories transmitted received, where the search terms include one or more of the following: location, type of experience or activity, cost, and rating.

A new system includes a processor and a memory containing software modules, which, when executed by the processor, are configured to perform operations, the operations comprising: receiving from users information related to experiences and activities, storing information received from users on a non-transitory computer-readable medium and associating it with the users from which it was received, displaying the information received from users to other users, receiving information from other users related to the displayed information, storing it, associating it with the displayed information, and displaying it to users, categorizing and displaying the received information related to experiences and activities in a first category for experiences and activities indicated to have already taken place, in a second category for experiences and activities indicated to be taking place at a definite time in the future, and in a third category for experiences and activities indicated not to have taken place and not having been scheduled for any definite time in the future, receiving information from a user indicating that information related to an experience or activity has moved from one category to another, re-categorizing the information accordingly, and modifying or adding to the information as part of the re-categorization process, and converting information associated with one user in one category into information associated with a second user in a second category, and modifying or adding to the information as part of the conversion process.

A new computer-readable storage medium includes a program, which when executed on a processor performs an operation, the operation comprising: receiving from users information related to experiences and activities, storing information received from users on a non-transitory computer-readable medium and associating it with the users from which it was received, displaying the information received from users to other users, receiving information from other users related to the displayed information, storing it, associating it with the displayed information, and displaying it to users, categorizing and displaying the received information related to experiences and activities in a first category for experiences and activities indicated to have already taken place, in a second category for experiences and activities indicated to be taking place at a definite time in the future, and in a third category for experiences and activities indicated not to have taken place and not having been scheduled for any definite time in the future, receiving information from a user indicating that information related to an experience or activity has moved from one category to another, re-categorizing the information accordingly, and modifying or adding to the information as part of the re-categorization process, and converting information associated with one user in one category into information associated with a second user in a second category, and modifying or adding to the information as part of the conversion process.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 45 is a flowchart illustrating a website process for logging in.

DETAILED DESCRIPTION

Figure 1:
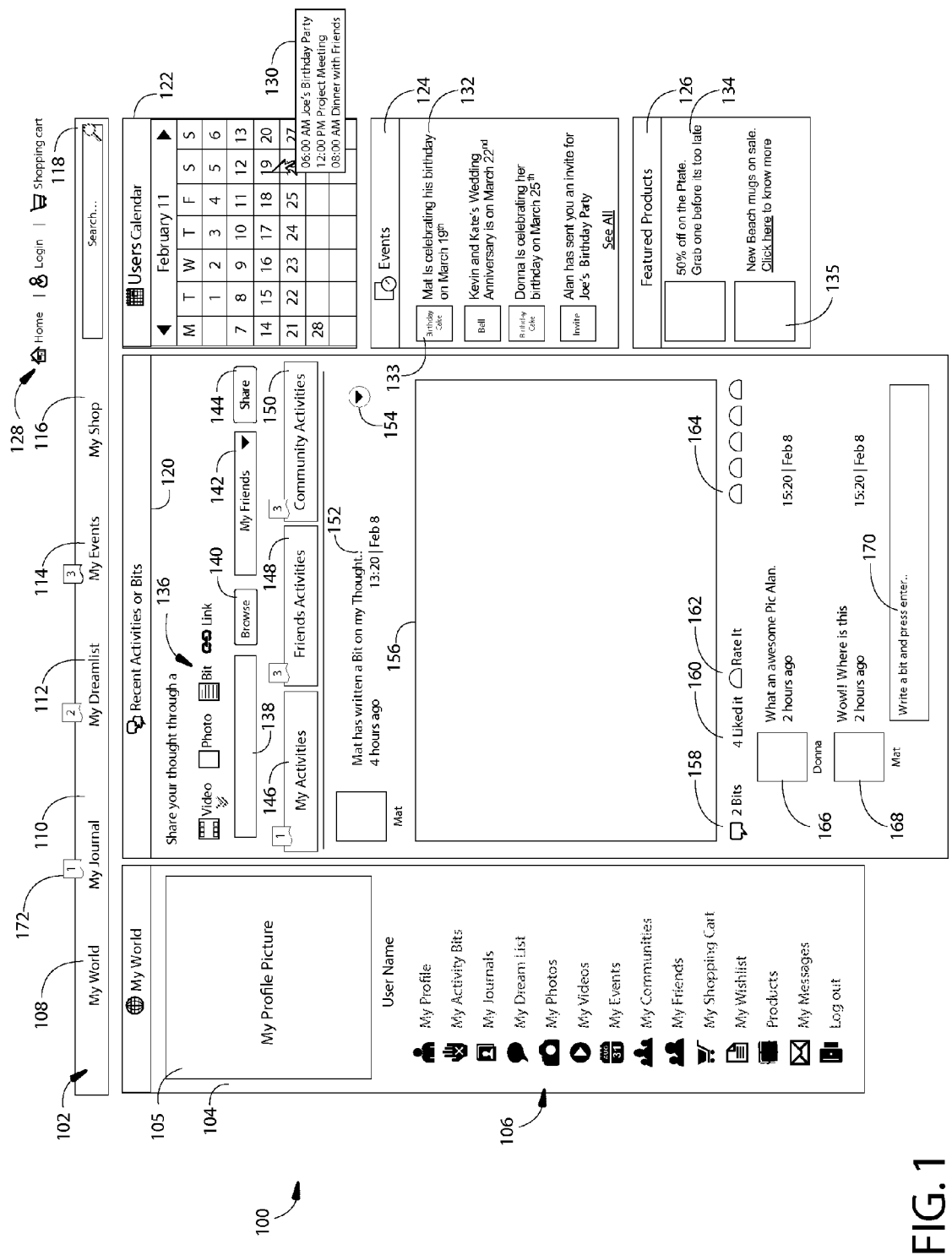
FIG. 1 is a diagram of a My World webpage, in an embodiment.

An interactive experience sharing and evaluation system and method will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

It will be understood that the particular website layouts shown in the screenshots below are exemplary only. The positioning of the various items can be altered as desired, and some items and functions may be added, deleted or altered within the spirit and scope of the present invention, as defined in the appended claims.

In an exemplary embodiment of a new website-implemented system, users register and create profiles in order to interact with other like minded enthusiasts. The website is configured to allow users to submit various information for viewing and comment by other users and to select the level of security applied to information they submit, limiting viewing to the entire community, their friends, or only themselves. Users can submit information about any experience, for example visits to countries, cities, landmarks, museums, tourist destinations, geographical features like mountains, lakes, and rivers, parks, restaurants, or other activities or establishments, particularly for the active minded enthusiast, as well as other experiences and memories or victories such as taking a certain test or attending a certain school or training program.

The information includes some identifier indicating the nature of the experience and, at the user's option, various other data including photos and videos of the experience, a date and the user's comments and ratings. The website is configured to allow other users, if the security level selected allows them to view these experiences, to add their own comments, rating, and/or other related information. The original submitter of the information can then respond to the other users if desired, allowing discussion and further exploration of the experience. Users can also connect with other users who have submitted information of interest to them, allowing them to further discuss that information and to be notified of future submissions by that user.

Users can search through the information submitted by other users by a number of criteria, and can establish automated and continuing searches for experiences related to their interests. For example, someone interested in whitewater rafting might set up an ongoing search to alert them of any new submissions related to whitewater rafting.

The website is configured to allow different submissions to be explicitly linked, for example where there are multiple submissions regarding a single place, in order for users to more easily find related reviews when interested in learning more about a particular experience. Related submissions are displayed when one of the submissions is viewed by a user.

Users can add various experiences submitted by other users to their dream-list, which generally constitutes a list of activities they would like to experience. They can set up a search that brings new submissions related to the experiences on their dream-list to their attention. Advertisements are also targeted to users on the basis of their dream-list, allowing the users to receive special offers for things the users have already indicated they would like to do.

The figures are screen shots of an example website implementation of an interactive experience sharing and evaluation system.

FIG. 1 is a diagram of a My World page 100. This is the first page a user sees after logging in. The page includes a top navigation bar 102, left User's Navigation List box 104, Recent Alpha Activities or bits box 120, and right side User's Calendar 122, Alpha Events 124, and Featured Alpha Products 126 boxes. Global navigation links 128 allow a user to go directly to this home page, to the login page, or to the user's shopping cart. The top navigation bar 102 includes direct links to User's My World 108, My Journal 110, My Dream-List 112, My Events 114, and My Shop 116 pages, as well as search box 118. My World Box 104 includes profile picture 105 and user profile links 106 to pages for My Profile, My Activities/bits, My Journals, My Dream-List, My Photos, My Videos, My Events, My Communities, My Friends, My Shopping Cart, My Dream-List, Alpha Products, My Messages, and to Log out. User's calendar displays the current months' calendar, with buttons for scrolling through the months, and a user can move the mouse over a date to view a pop-up box 130 containing the day's events. My Events box 124 contains a list of selected upcoming events 132 with associated icons 133. Featured My Products According to User's Activity Preferences box 126 contains a list of selected products for sale 134 with associated pictures 135.

Recent My Activities or Bits box 120 displays information that the logged-in user or that user's friends or community members have shared. At the top are buttons/fields 136, 138, 140, 142, 144 for sharing. First the user selects whether to share a video, photo, text, or link from the selection bar 136. Here, Video is selected and a field 138 below allows a user to enter the location of the video. The user can press button 140 to browse his or her computer's contents to find the location of the desired video. The privacy selector 142 allows the user to choose whether to share the video with the general public, with members of communities the user is a member of and with friends, just with friends, or to "share" it only with the user—for example to create a digital archive of the material. Finally, the user selects share button 144 to share the material as selected (which is then submitted and distributed in one easy operation).

Three tabs allow a user to view only his or her own shared activities (My Activities tab 146), activities shared by friends (Friends Activities tab 148) or activities shared by community members (Community Activities 150). The selected activities are displayed below. As shown, the most recent activity displayed is another user's comment 152 (called a Bit) on this user's shared activity, showing that user's profile picture and the date and time of the comment.

The activity the user commented on, here a picture 156 is displayed below, along with the rating 164 for the picture, number of comments 158, number of users who indicated they like the picture, 160, and a button 162 for the user to rate the picture. The comments (Bits) 166, 168 are shown below the picture 156. A user may add their own comment to the list by typing it into the comment box 170. Collapse button 154 allows a user to collapse/hide the picture 156 and comments 166, 168, leaving only the notification 152 that a comment has been written about the information and freeing up space in the Recent Activities box 120 for other recent activities.

The number of feeds indicated in 172 shows new information that a user has not viewed as yet, for example when a friend posts a new My Journal, Photo or Video or even a comment on any Journal, Photo album, Photo, Video Album, or Video. For example the "1" notification 172 next to the My Journal link in the top navigation bar 102 indicates one new entry on the My Journal page that the user has not yet viewed.

Of course in alternative embodiments, the page may have a different layout, with the boxes having varying locations and using various tags and titles for the various components. In some embodiments, the setup of the page is user-selected or user-influenced, with individual users able to customize, partially or completely, what information appears on the home page and/or where it appears. This is true of all the pages described.

Figure 2:
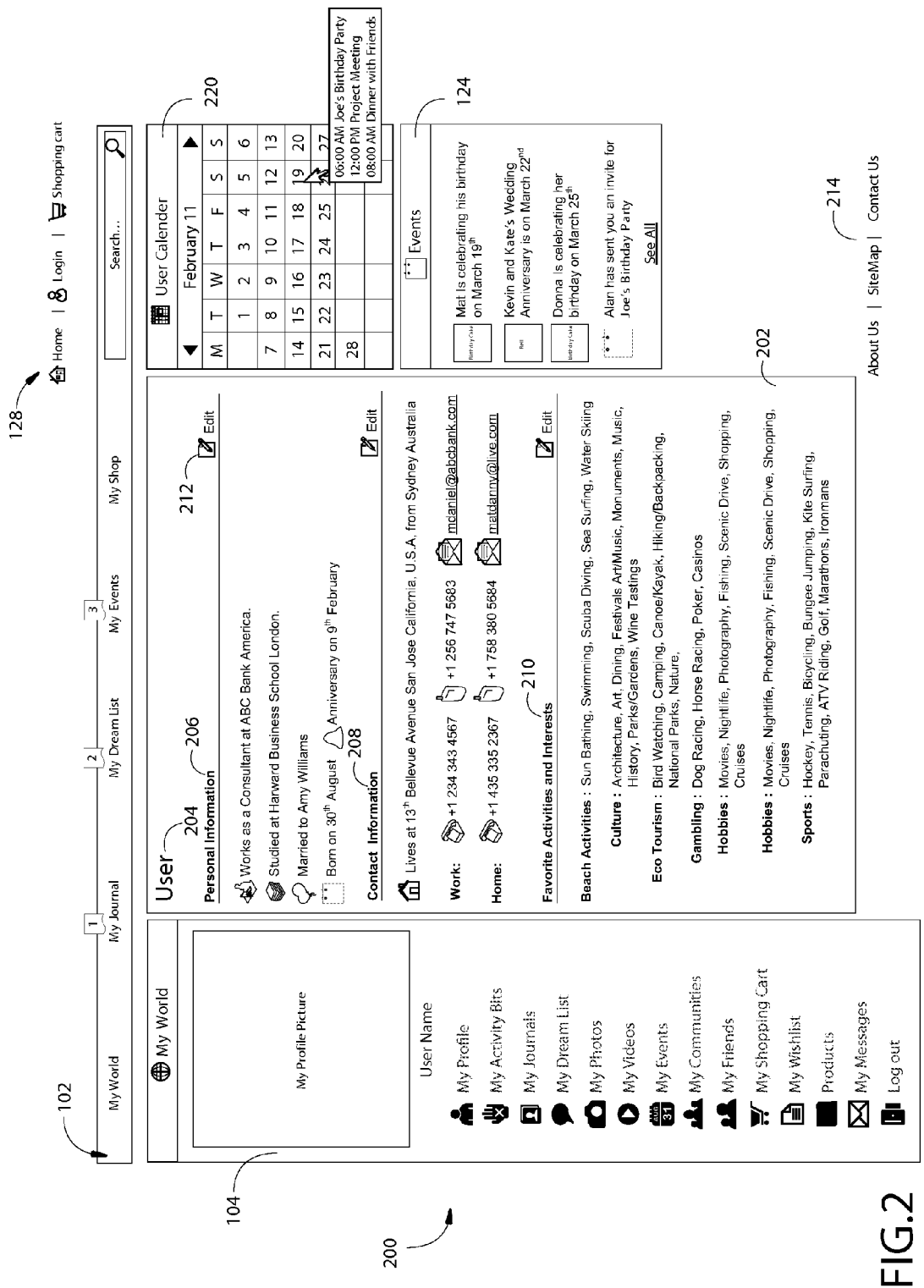
FIG. 2 is a diagram of a My Profile webpage, in an embodiment.

FIG. 2 is a diagram of a My Profile page 200. The layout is the same when a user views another user's profile page. In that case, the information displayed is based on the security level chosen by that user when creating his or her profile (or at a later date). This page is arrived at by selecting the My Profile link from the left My World box. Top navigation bar 102, left My World box 104, User's Calendar box 122, My Events box 124 and global links 128 remain from the home page 100. Replacing the Recent My Activities box 120 in the center of the page is profile box 202, containing the user's name 204, Personal Information 206 such as employment, education, relationship status, birthday and anniversary, Contact Information 208 such as address, phone numbers and email addresses, and Favorite Activities and Interests 210. Edit buttons 212 allow the user to edit their profile information. In this page, bottom global links 214 are also shown, which may also be present in any of the other pages described. The links include About Us, SiteMap, and Contact Us.

In various embodiments, the information in the profile box 202 is partially or completely user customizable, with users able to construct their own categories of information as well as the particular types of information.

Figure 3:
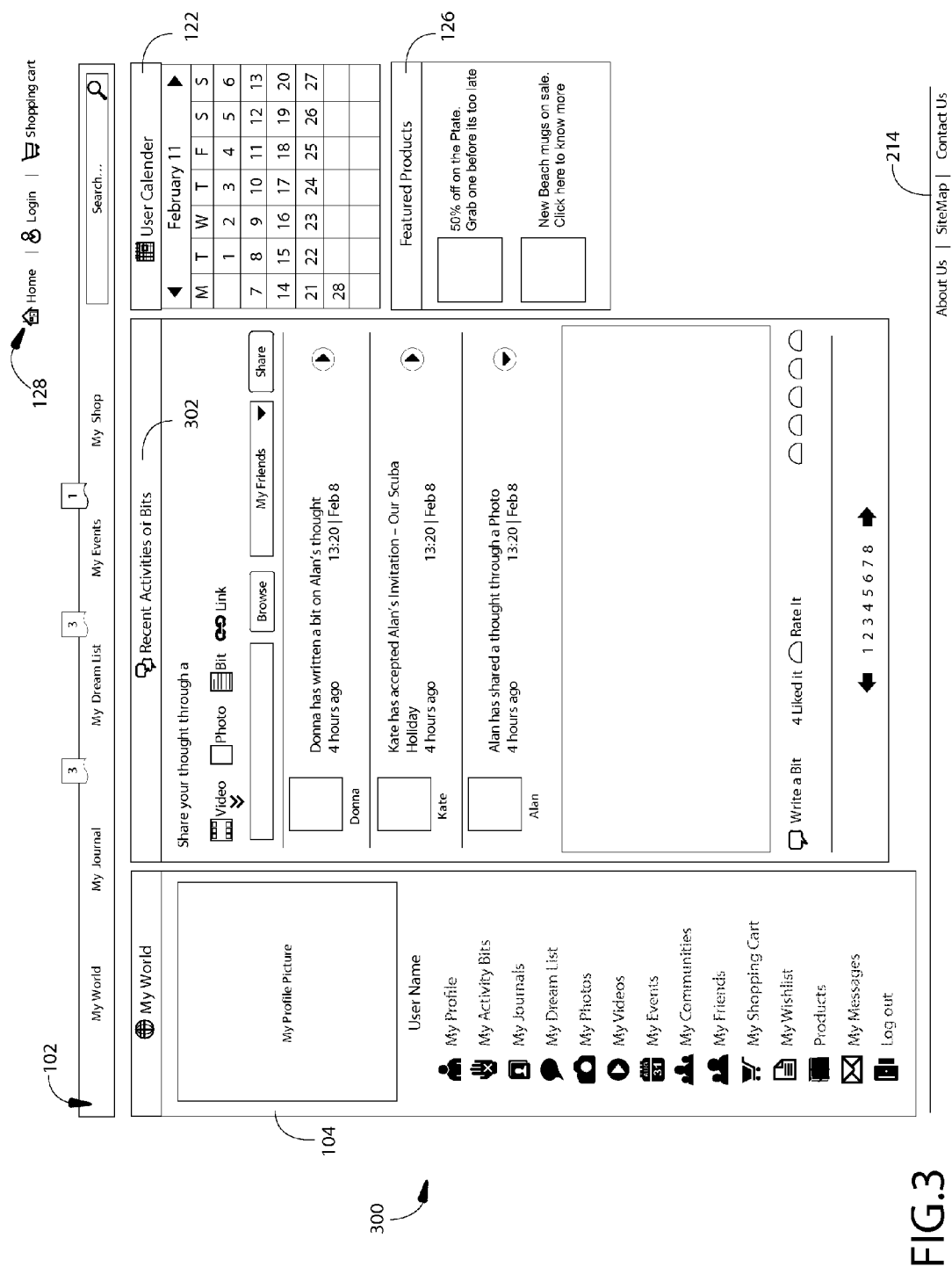
FIG. 3 is a diagram of the My World webpage, in an embodiment.

FIG. 3 is a diagram of the My World page of another user 300. This page is reached when a user clicks on the picture of another user in the site (which appears for example next to their comments/Bits). Top navigation bar 102, left My World box 104, User's Calendar box 122, My Events box 124 and global links 128 remain from the home page 100. Replacing the Recent My Activities box 120 in the center of the page is User's Recent Activities box (where "User" is the name of the user whose picture was clicked on), which has the same features as the Recent My Activities box 120 except that rather than showing Activities relevant to the user, it shows Activities relevant to the other user.

Figure 4:
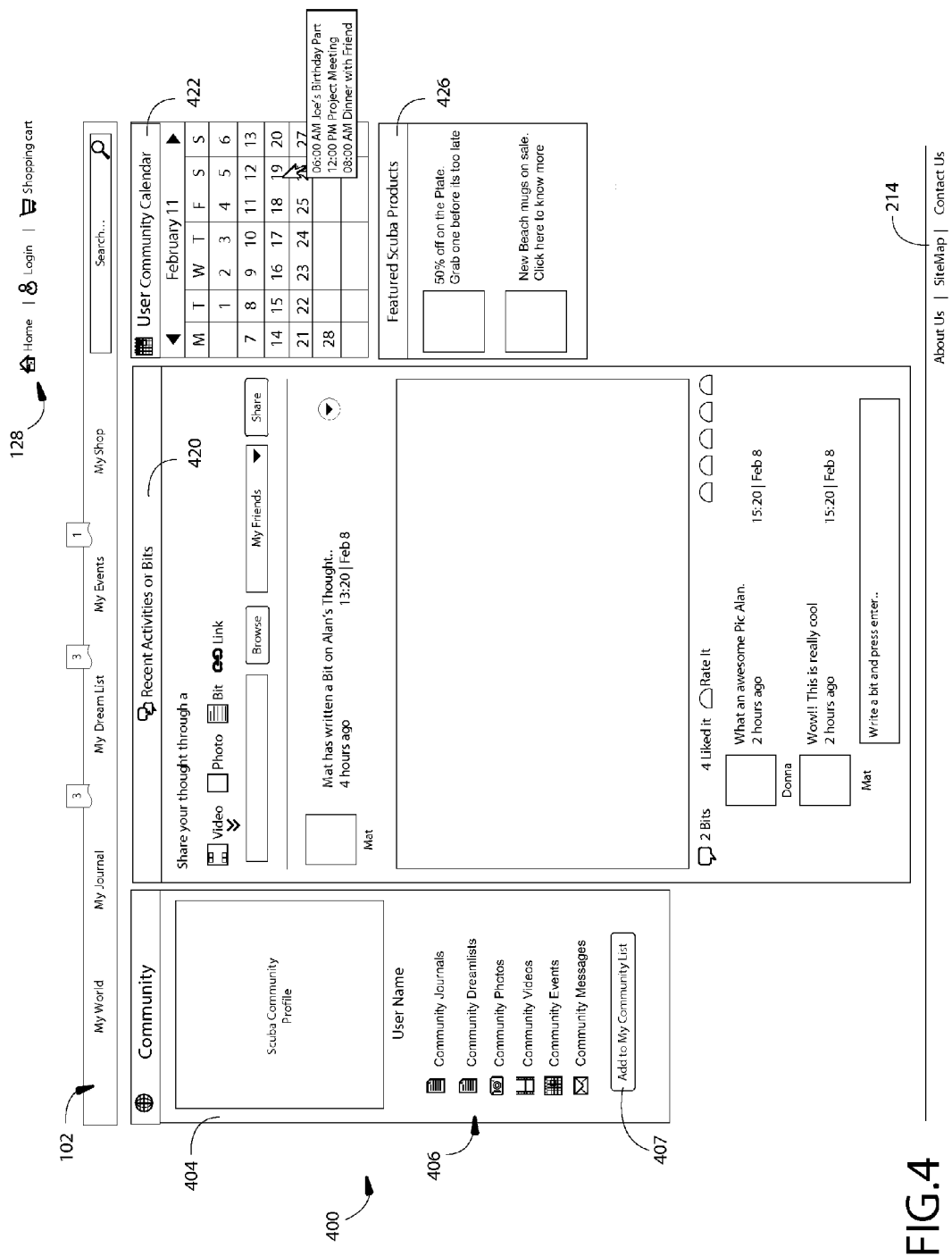
FIG. 4 is a diagram of a Community webpage, in an embodiment.

FIG. 4 is a diagram of a Community page 400. A Community page may be reached by clicking on the name of the community in a user's My Communities page or from a search. In some embodiments, communities are designed as users with limited privileges, which unlike other users cannot have friends or members, and cannot be added to users' Friends lists. Instead, communities are added as one of a user's favorites by the user clicking "Add to my Community List" from the Community page. The website may be designed such that when My Activity or Journal Entry is shared in Recent My Activities box 120 or Journal box 800 and the sharing level is set to global, the activity must be tagged to a community. The activity will be tagged and associated with either a user-selected community or, if none is selected, a community related to the subject matter of the activity.

On this page, top navigation bar 102, and global links 128 remain from the home page 100 as well as bottom global links 214. Replacing the Recent My Activities box 120 in the center of the page is Recent Scuba Activities box 420, which has the same features as the Recent My Activities box 120 except that rather than showing Activities relevant to the user, it shows Activities relevant to the Community (here, Scuba). Similarly, left My World box 104 is replaced with Scuba Community box 404, which has scuba links 406 to Community Journals, Community Dream-lists, Community Photos, Community Videos, Community Events, and Community Messages, as well as Add to My Community List button 407.

Replacing User's Calendar box 122 is a Scuba Community Calendar box 422, replacing the Featured My Products box 126 is Scuba Products box 426 with scuba-themed items for sale.

Figure 5:
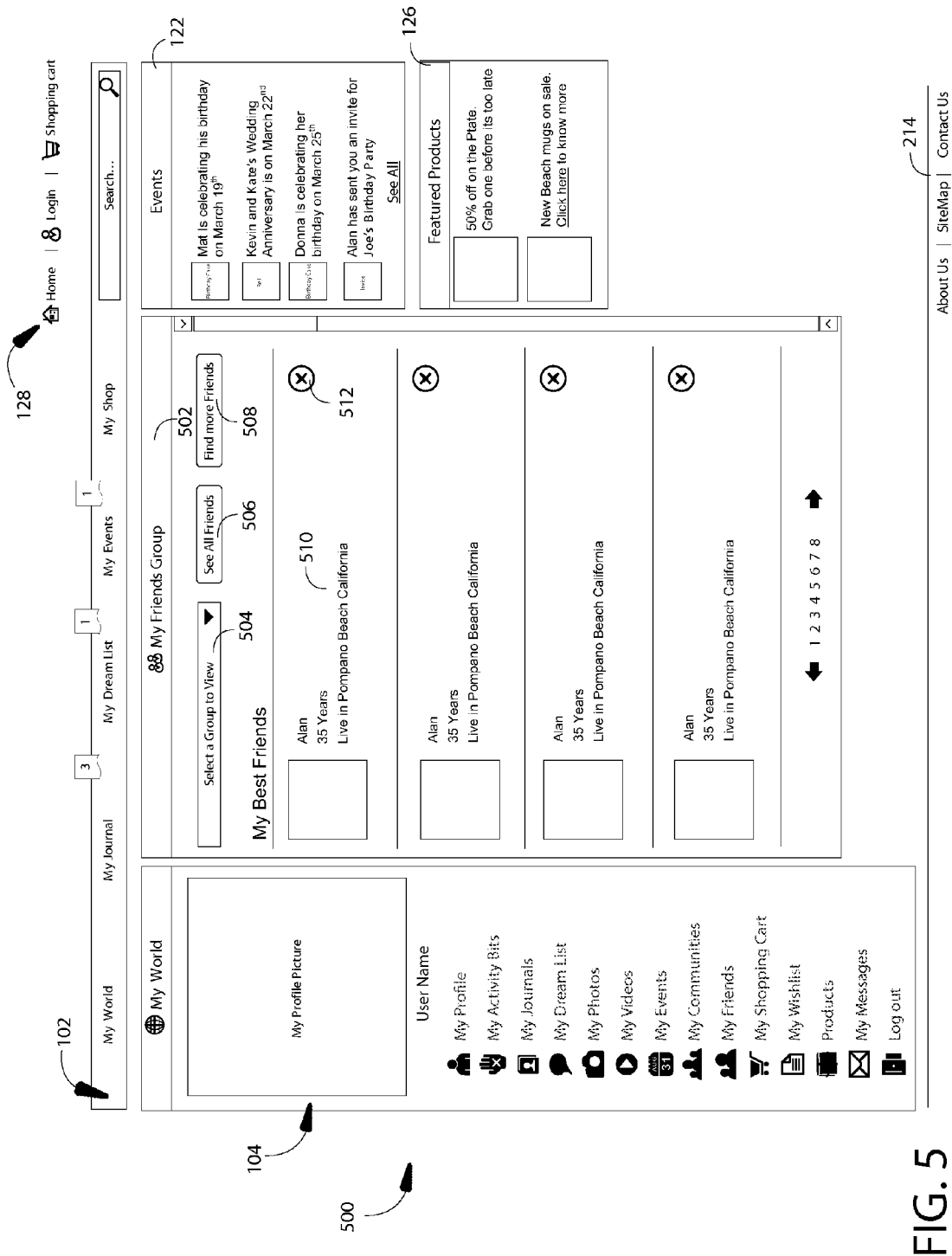
FIG. 5 is a diagram of a My Friends Group webpage, in an embodiment.

FIG. 5 is a diagram of a My Friends Group page 500, reached for example by selecting the My Friends link from the left My World box 104. The central box is now a My Friends Group box 502 which has a dropdown friends group selector 504 for viewing friends according to groups. Friends in some embodiments can be freely sorted into user-defined groups (here, a "My Best Friends" group is shown) and may also be automatically sorted into groups according to community membership or any other criteria, for example country of residence, age, hobbies, etc. See All Friends button 506 displays all friends regardless of group, and Find more Friends button 508 leads to a new interface for the user to find additional friends, for example searching by characteristics such as employment, education, activities, interests, hometown, email address, name, etc.

The list of friends shown gives some information about each friend, for example name, age, residence, profile picture. Delete button 512 allows the user to delete a given friend, removing that friend from the user's list of friends.

Figure 6:
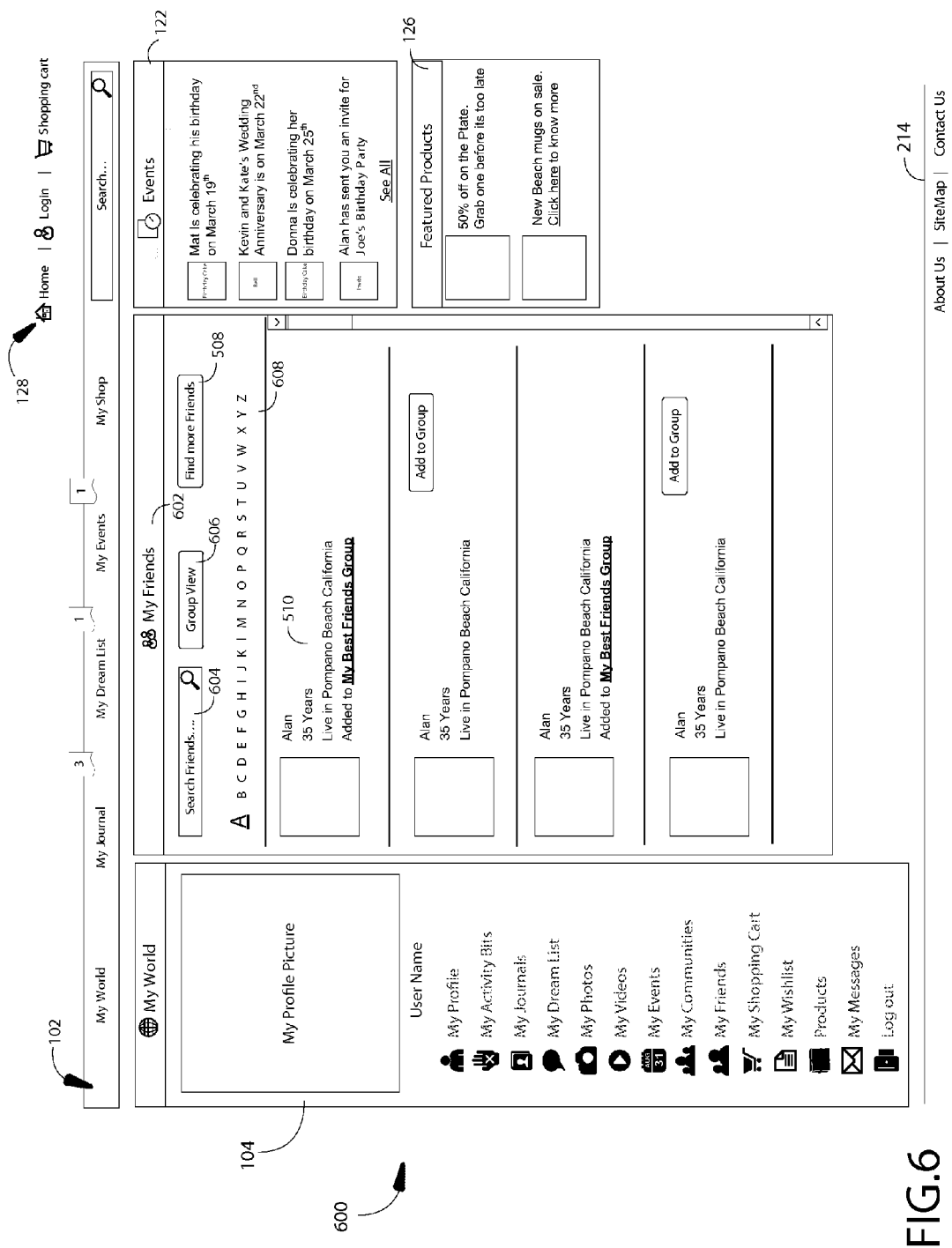
FIG. 6 is a diagram of a My Friends webpage, in an embodiment.

FIG. 6 is a diagram of a My Friends page 600, reached for example by selecting the See All Friends button 506 on My Friends Group page 500. The central box is now a My Friends box 602 that displays all the user's friends in alphabetical order. In some embodiments, the displayed friends can be sorted by various attributes—e.g. length of "friendship", age, location, community membership, etc. Search Friends button 604 allows the user to search through the friends by various attributes. Group View button 606 returns the user to the My Friends Group page 500. Alphabet bar 608 allows the user to jump to a given letter in the alphabet in the list of friends. Add to Group button 610 allows the user to add the friend, which may be a non-grouped friend, to a user-defined or automatically created friends group.

Figure 7:
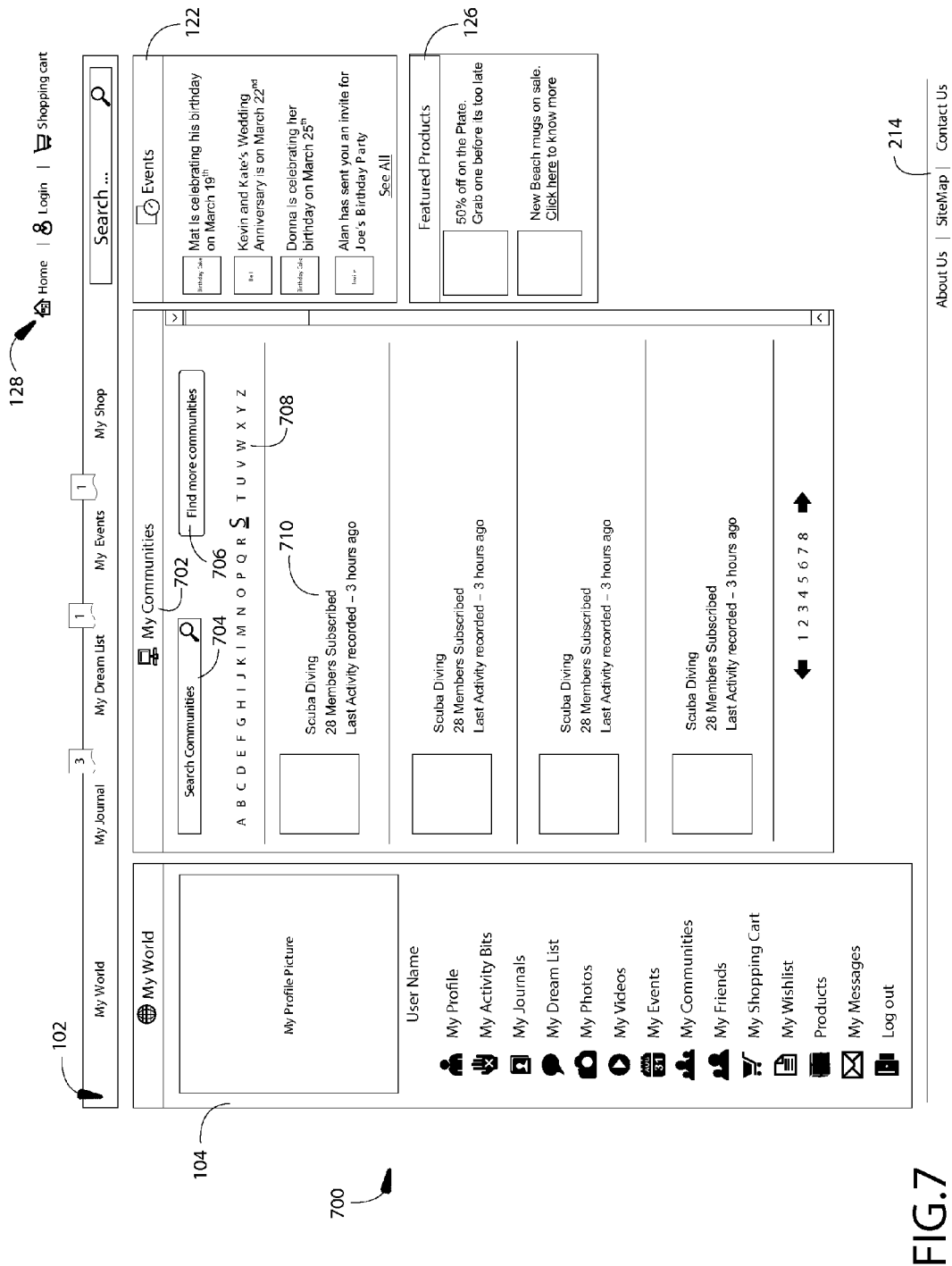
FIG. 7 is a diagram of a My Communities webpage, in an embodiment.

FIG. 7 is a diagram of a My Communities page 700, reached for example by selecting the My Communities link from the left My World box 104. The central box is now a My Communities box 702 that displays the user's favorite communities in alphabetical order. The user can jump to a given letter in the list with alphabet bar 708. Summary details 710 are shown for the listed communities, such as name, number of members, time of last activity, and community profile picture. Search communities button 704 allows the user to search through his or her favorite communities by various criteria, and Find more communities button 706 allows the user to search through all communities by various criteria for additional communities of interest.

Figure 8:
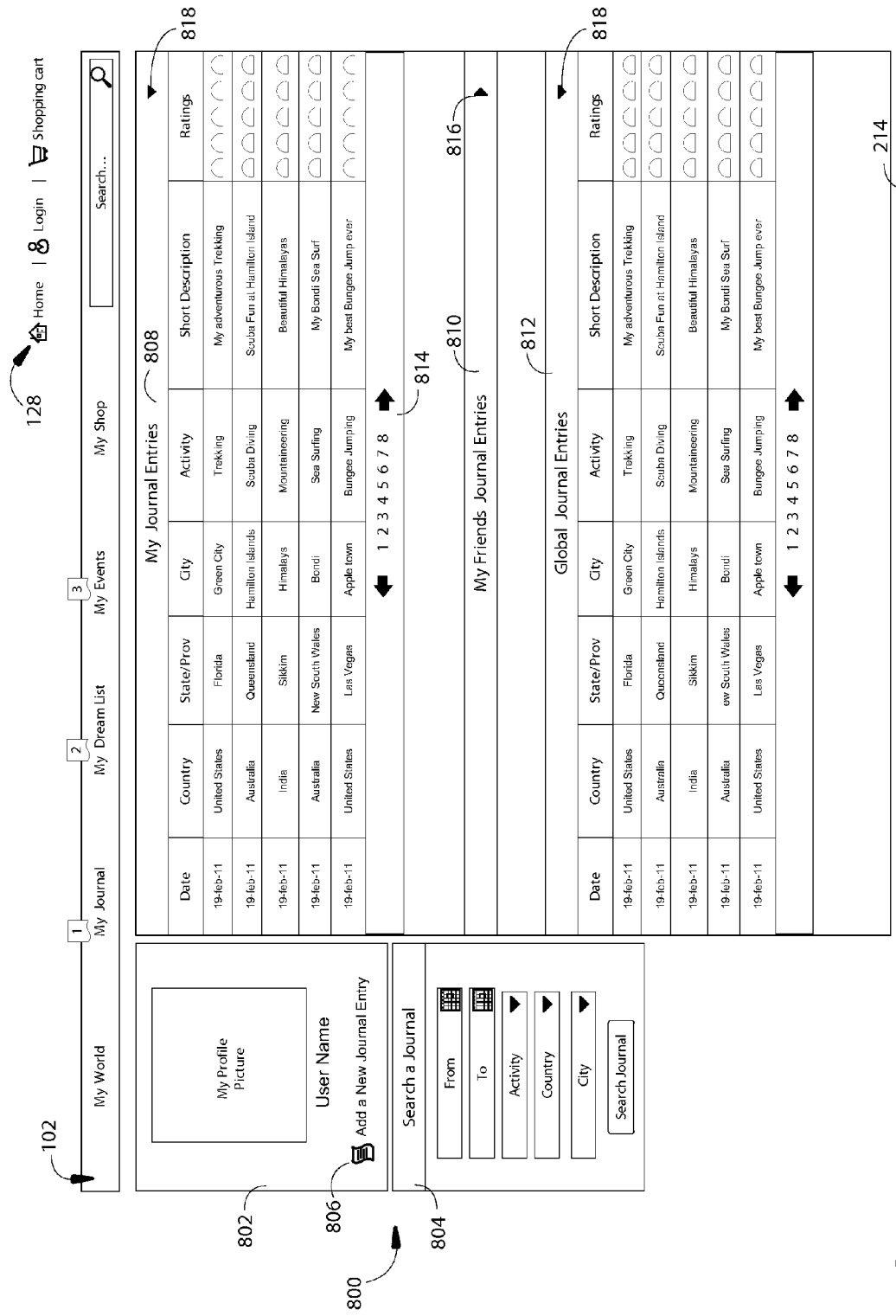
FIG. 8 is a diagram of a My Journal webpage, in an embodiment.

FIG. 8 is a diagram of a My Journal page 800, reached for example by selecting the My Journal link from the top navigation bar 102, which displays all the My Journal Entries posted by the user, in this embodiment sorted by time and date and privacy level. The central box now shows journal entries, divided into My Journal Entries 808 (journal entries submitted by the user), My Friends Journal Entries 810 (journal entries submitted by the user's friends), and Global Journal Entries 812 (journal entries submitted by other users but made available for global viewing). Expand buttons 816 and contract buttons 818 hide or display the contents of each given section, in order to provide room for the entries in the other sections.

On the left, navigation box 802 contains the user's profile picture and a link 806 for writing a new My Journal entry. Search box 804 allows a user to search through the available journals based on date ranges, activity, country, and city, and in other embodiments by other criteria as well.

Figure 9:
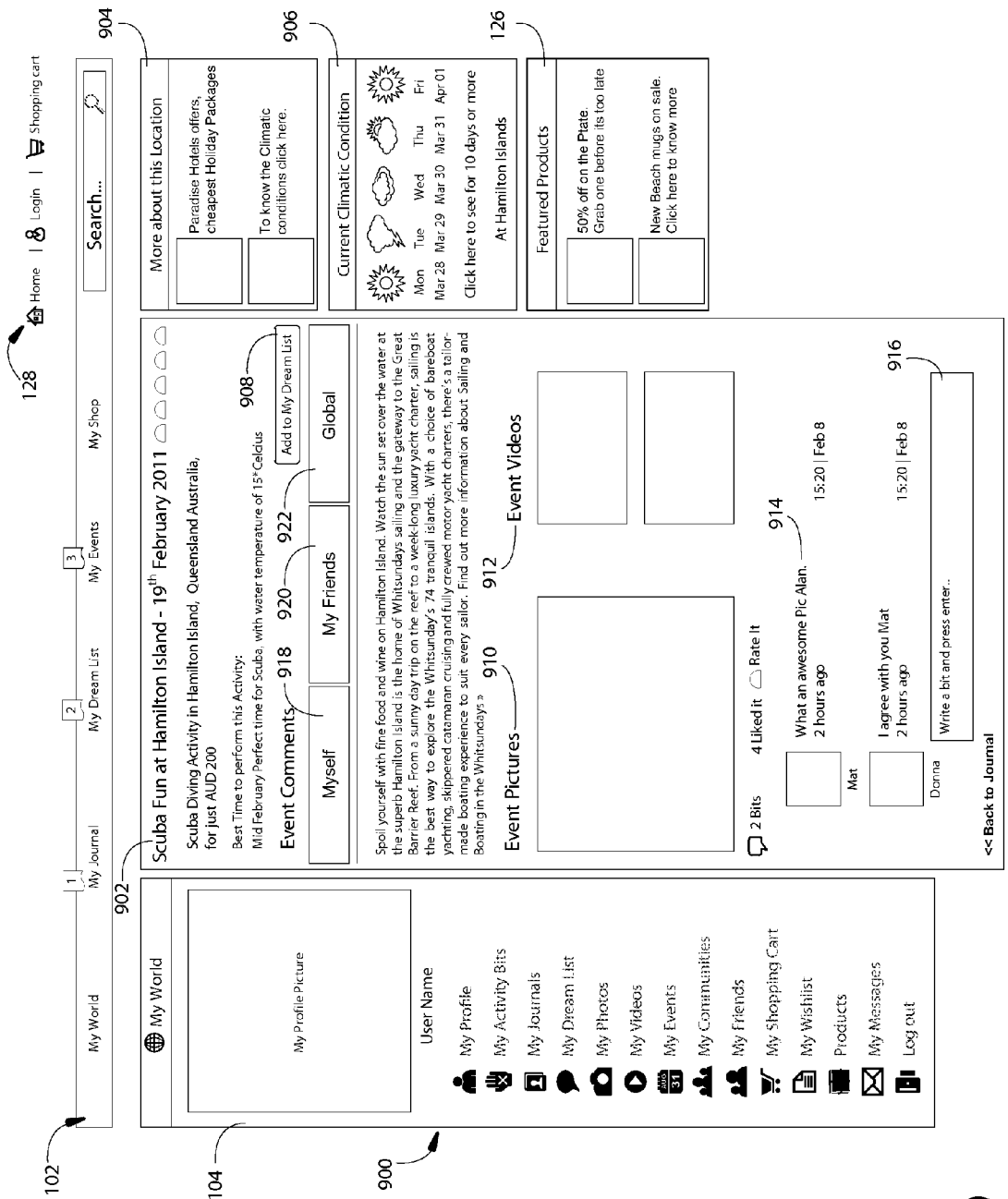
FIG. 9 is a diagram of a My Journal View webpage, in an embodiment.

FIG. 9 is a diagram of a My Journal View page 900, reached for example by clicking on one of the user's own journal entries on the My Journal page 800. The central box now provides information about the journal entry provided by the user, while on the right is a More about this Location box 904 and Current Climatic Condition box 906 with current weather information. The central box information includes entry name 902 and summary details, event pictures 910 and event videos 912 and comments 914. Comment field 916 allows the users to add a comment. Add to My Dream-List button 908 allows a user viewing and linking this journal entry to move the journal entry to his or her personal Dream-List. Tabs Myself 918, My Friends 920 and Global 922 allow the user to toggle between information (Pictures, Videos, etc.) viewable only by the user, only by the user or the user's friends, and by anyone, respectively. The privacy level can be set for the information at the time of submission. By toggling, the user can easily verify what will be seen by each type of viewer.

Figure 10:
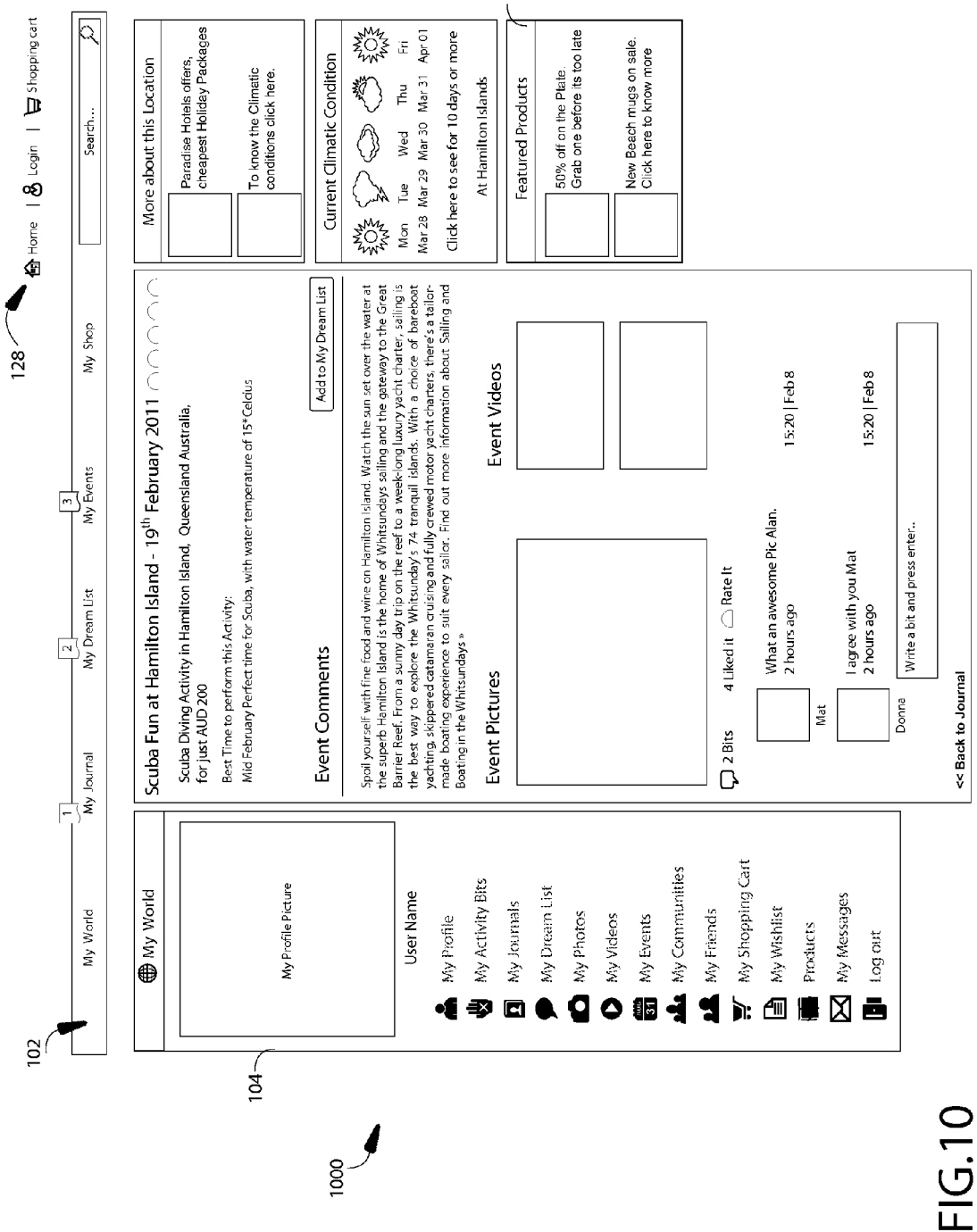
FIG. 10 is a diagram of a My Journal View webpage, in an embodiment.

FIG. 10 is a diagram of a My Journal View page 1000, reached for example by clicking on a journal entry by another user on the My Journal page 800. It differs from My Journal View page 900 in that the toggle tabs are no longer visible and the user can only see the information with a privacy setting appropriate to that user, for example if the user is a friend of the user submitting the journal entry, he or she can see the information made available to friends but not any information made available only to the submitting user.

Figure 11:
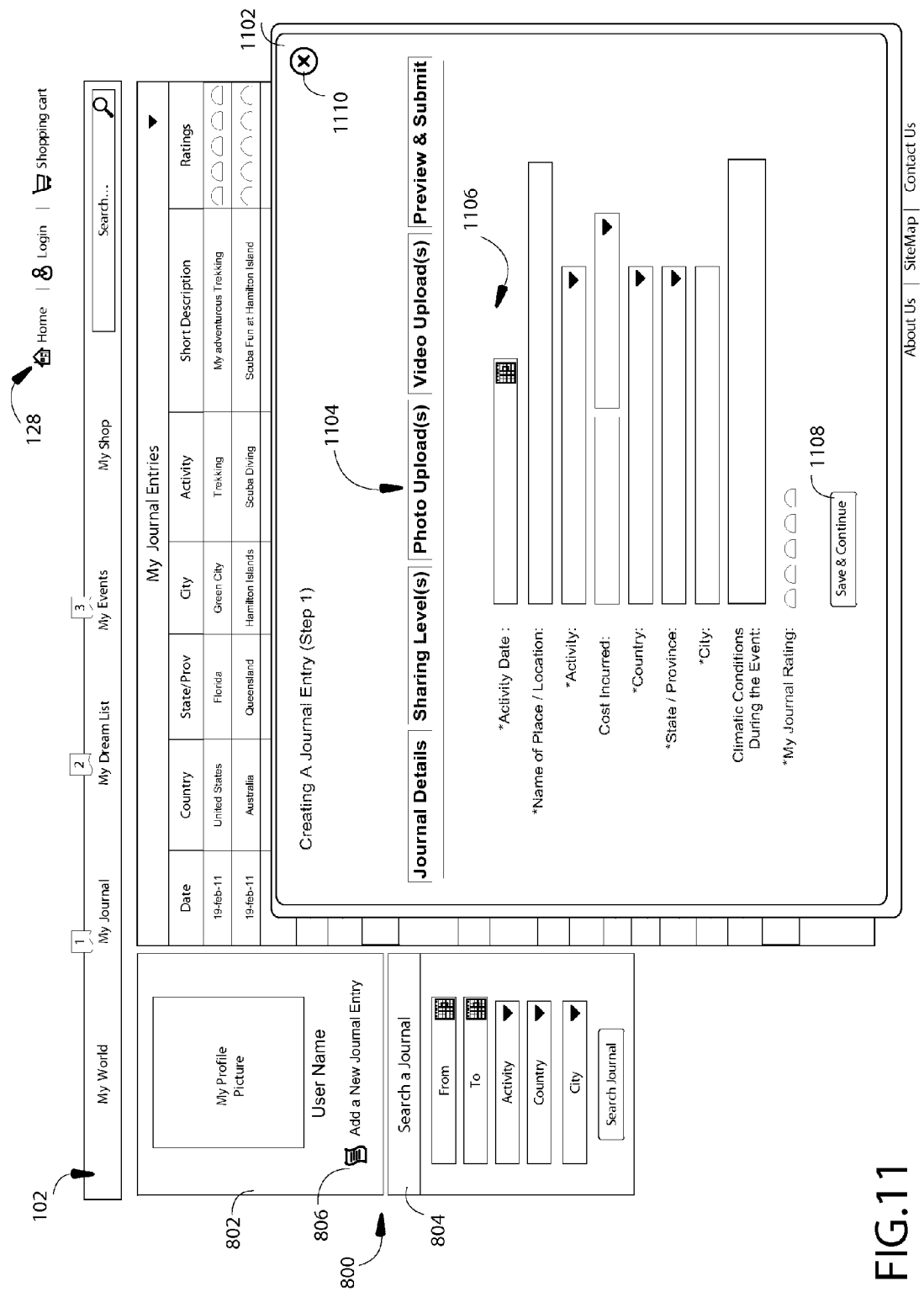
FIGS. 11-17 are diagrams showing a step-by-step process for creating a New Journal Entry, in an embodiment.

FIGS. 11-17 are diagrams showing a step-by-step process for creating a New Journal Entry. This process is initiated for example by selecting the "Add a New Journal Entry" link 806 from My Journal page 800. FIG. 11 shows the first step in the process. Pop-up Creating a My Journal Entry box 1102 appears, with process stages bar 1104, which shows the steps in creating a journal entry (entering journal details, setting sharing level(s), uploading photos, uploading videos, and previewing and submitting) and the current step. Journal details fields 1106 allow a user to enter information such as activity date, location, type of activity, cost, city, state, and country, weather conditions, and rating. Save & Continue button 1108 saves this information and continues to the next step. Cancel button 1110 closes the pop-up box and returns to the page 800.

Figure 12:
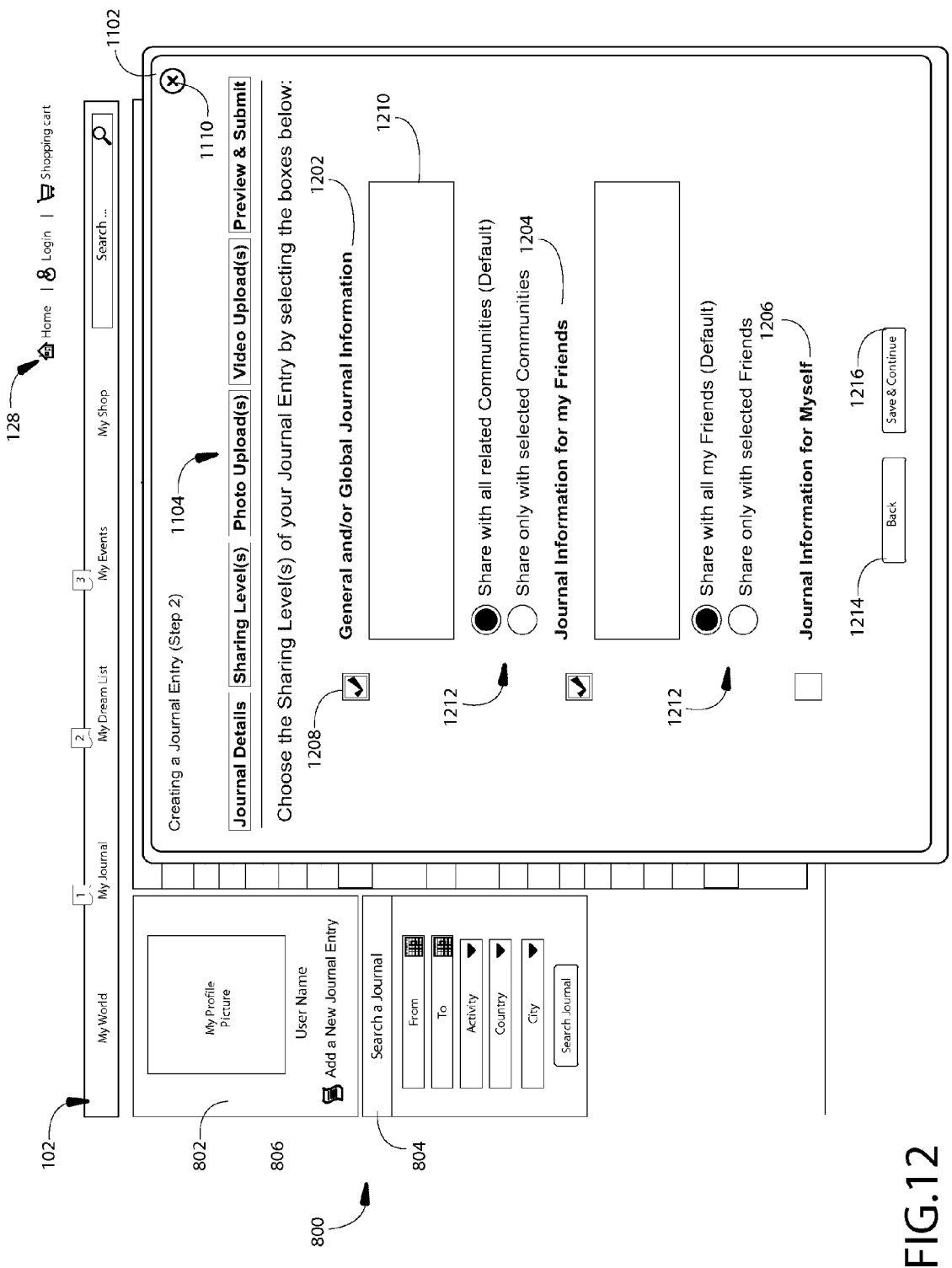

FIG. 12 shows the second step in the process. Here, the user chooses whether to add information for the general public 1202, just for friends 1204, and/or just for his or herself 1206 by checking the box 1208 next to each category he or she wishes to add. When a box 1208 is checked, a corresponding text field 1210 appears for the user to input the information. Bullet selectors 1212 allow a user to decide whether global information 1202 is shared with all the user's communities or only selected communities, and whether friends information 1203 is shared with all the user's friends or only selected friends. Back button 1214 returns the user to step 1 as shown in FIG. 11, while Save & Continue button 1216 proceeds to the next step.

Figure 13:
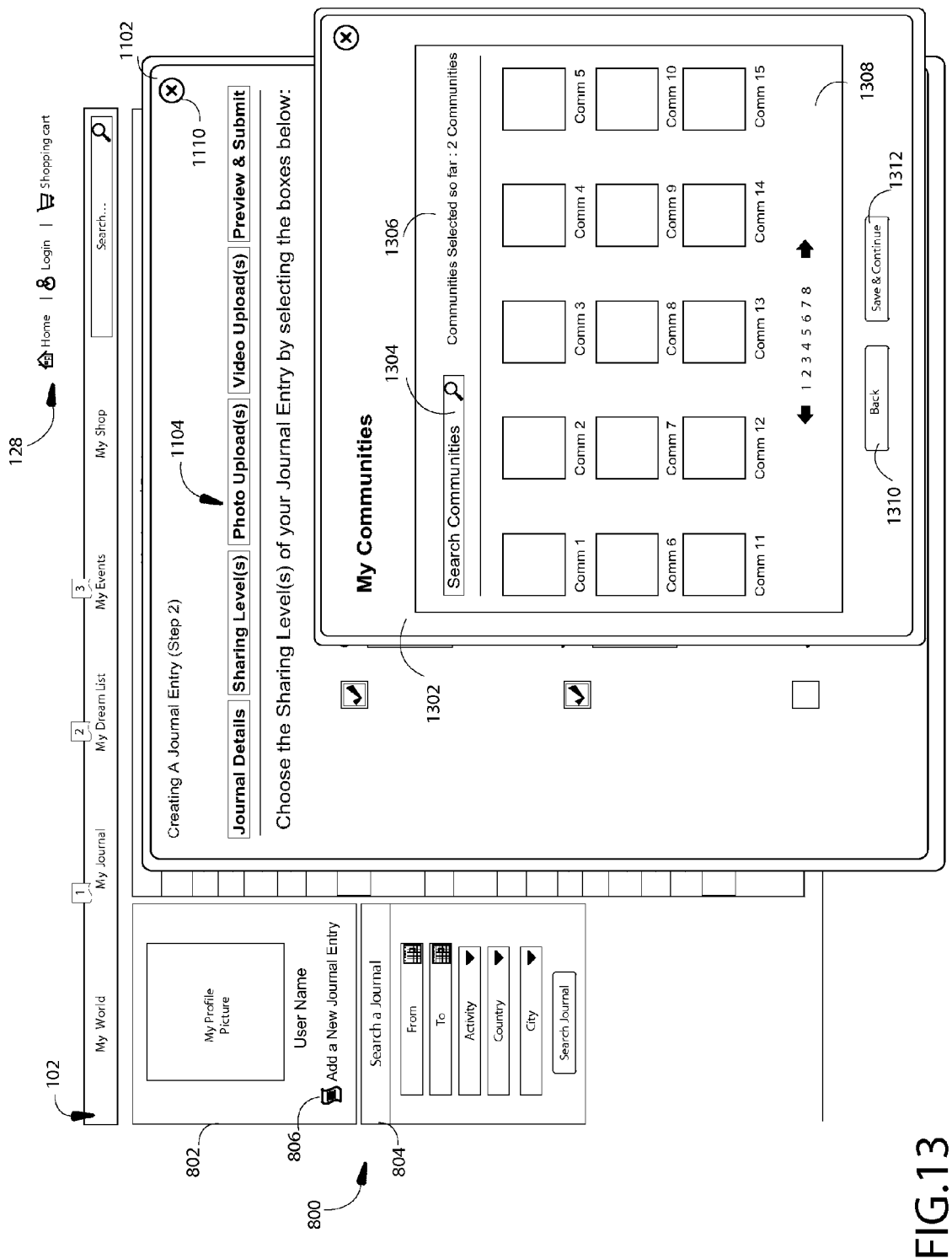

FIG. 13 shows the My Communities pop-up box 1302 that is displayed when a user indicates that the global information submitted is to be shared only with selected communities. A list of the user's communities 1308 is displayed, along with a Search Communities button 1304 for searching through the communities by various criteria and an indication 1306 of the number of communities selected so far. The Back button 1310 returns to the pop-up box of FIG. 12 while Save & Continue button 1312 proceeds.

Figure 14:
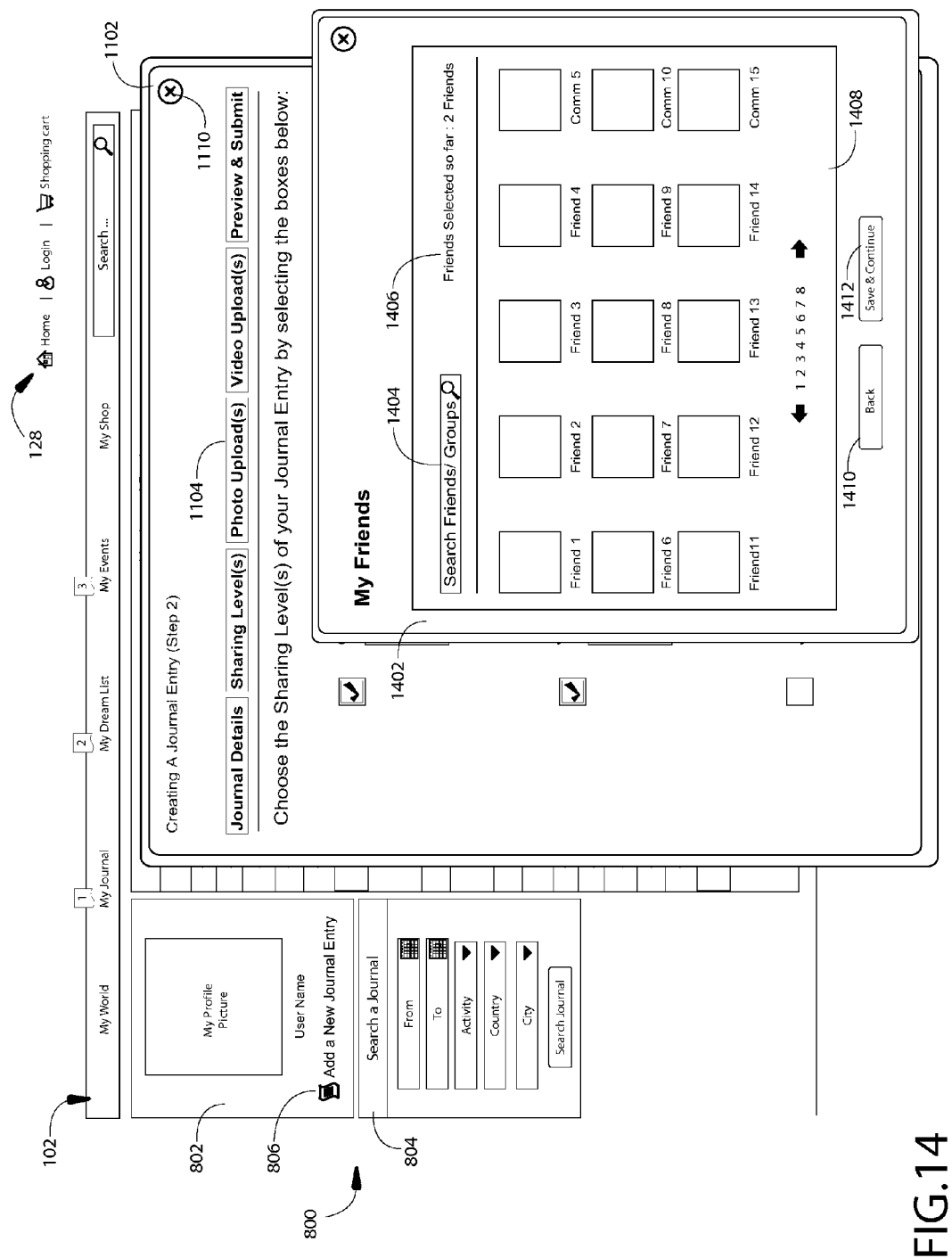

FIG. 14 shows the My Friends pop-up box 1402 that is displayed when a user indicates that the friends information submitted is to be shared only with selected friends. A list of the user's friends 1408 is displayed, along with a Search Friends button 1404 for searching through the friends or groups by various criteria and an indication 1406 of the number of friends selected so far. The Back button 1410 returns to the pop-up box of FIG. 12 while Save & Continue button 1412 proceeds.

Figure 15:
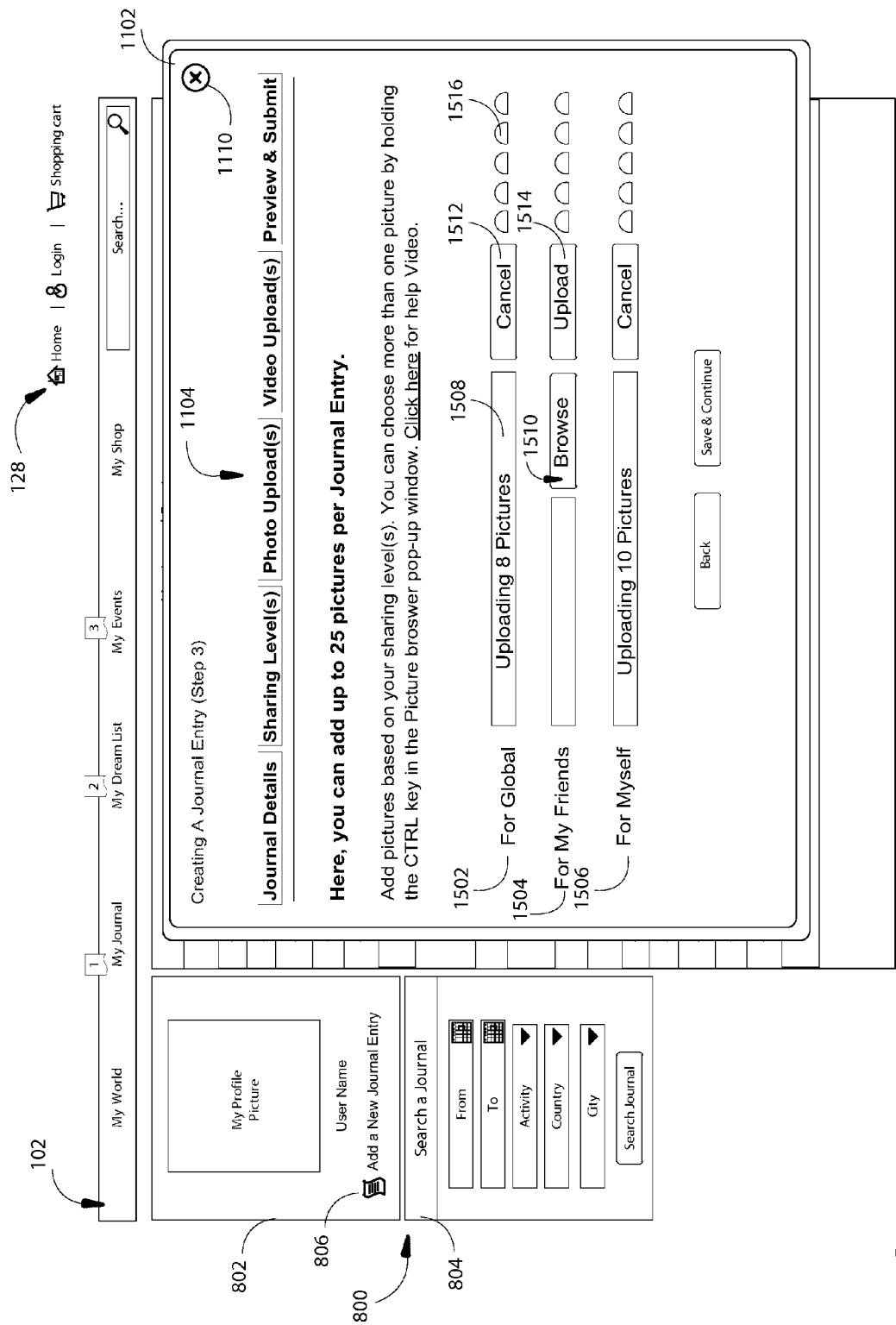

FIG. 15 shows the third step in the process. Here, the user uploads pictures for viewing globally 1502, by friends 1504, and/or only by the user 1506. The picture files are selected with input field and browse button 1510 and selecting the upload button 1514 begins the upload, at which time the input field and browse button 1510 become status bar 1508 and upload button 1514 becomes cancel button 1512 for canceling the upload in progress. Rating 1516 allows the user to give the uploaded pictures ratings.

Figure 16:
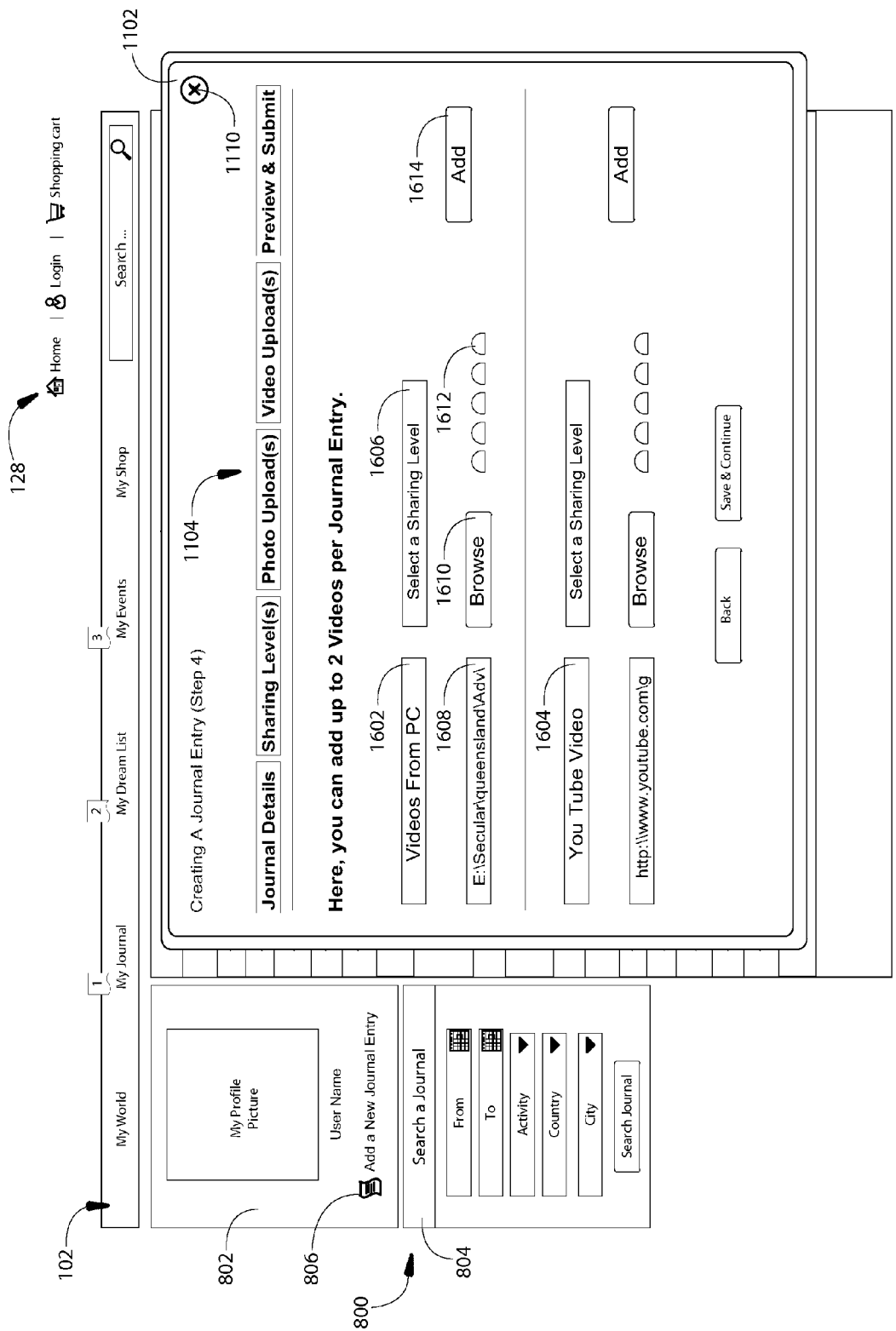

FIG. 16 shows the fourth step in the process. The user can upload videos for viewing from the user's PC 1602 or from a video sharing website 1604. The video file is selected using input field 1608 and browse button 1610, and a sharing level is selected using the Select a Sharing Level dropdown 1606 (Global, Friends, Myself). A rating is applied to the video with rating 1612 and selecting the Add button 1614 uploads the video.

Figure 17:
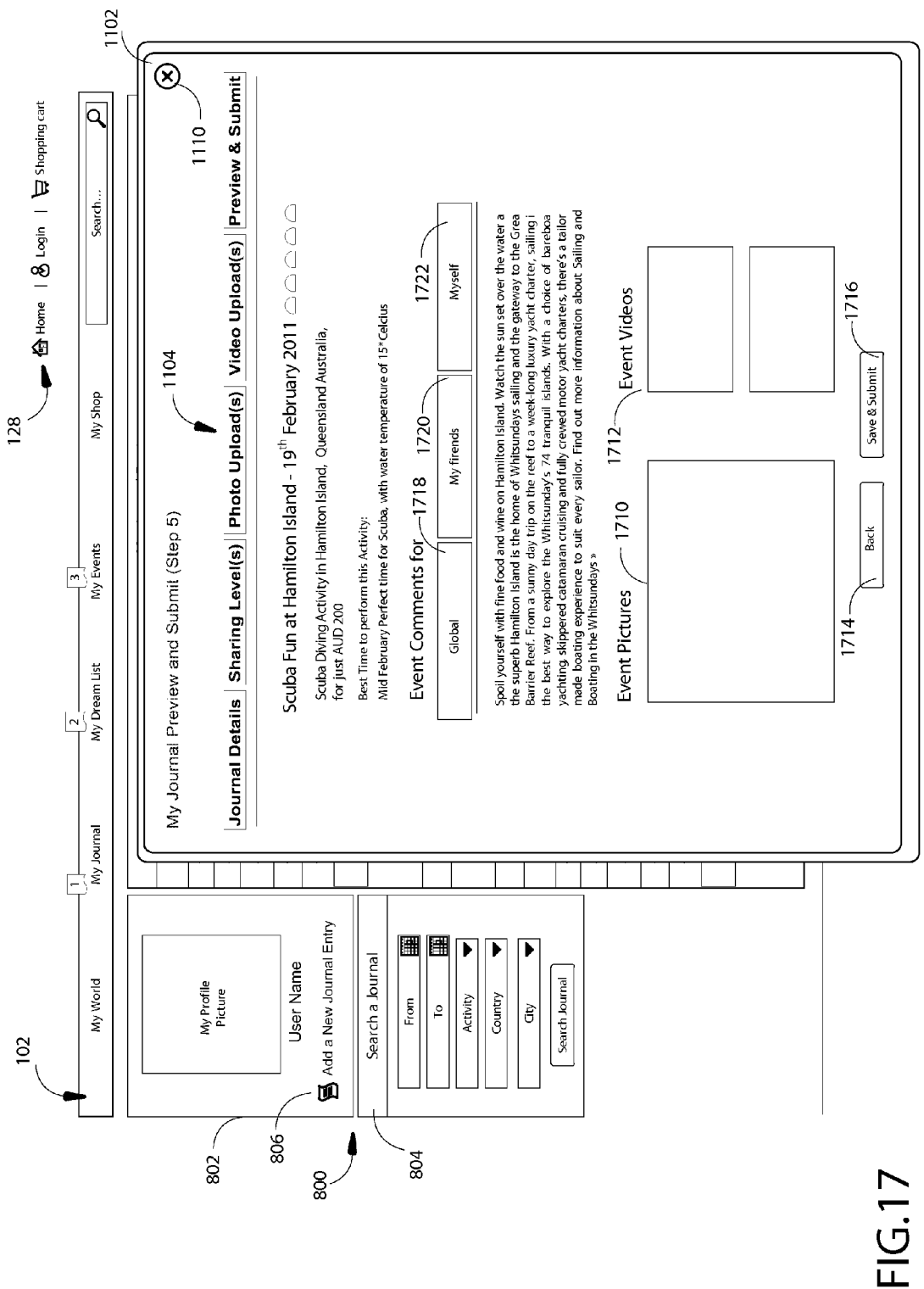

FIG. 17 shows the fifth and final step in the process, where a user can preview the journal entry as it will appear to other users, using the tabs 1718, 1720, 1722 to toggle between viewers at different privacy levels. Finally clicking on 1716 Saves and Submits/Distributes the entire Journal Entry in one easy step.

FIGS. 18-24 are diagrams showing a step-by-step process for creating My Dream entry. These steps are generally synonymous to the steps for creating a My Journal entry shown in FIGS. 11-17. Users place experiences/activities of interest on their dream list in order to remember what they are for future reference. For example, a user browsing the site may come across an interesting activity, but may not be planning a vacation for six months or more, during which time they might normally forget the activity they had read about. By clicking 908 and placing it on the dream-list, they would be able to remember the experiences when the time comes to plan an activity. Having interesting experiences gathered in a list also makes it easier for the user to see new information submitted by users about those experiences.

Figure 18:
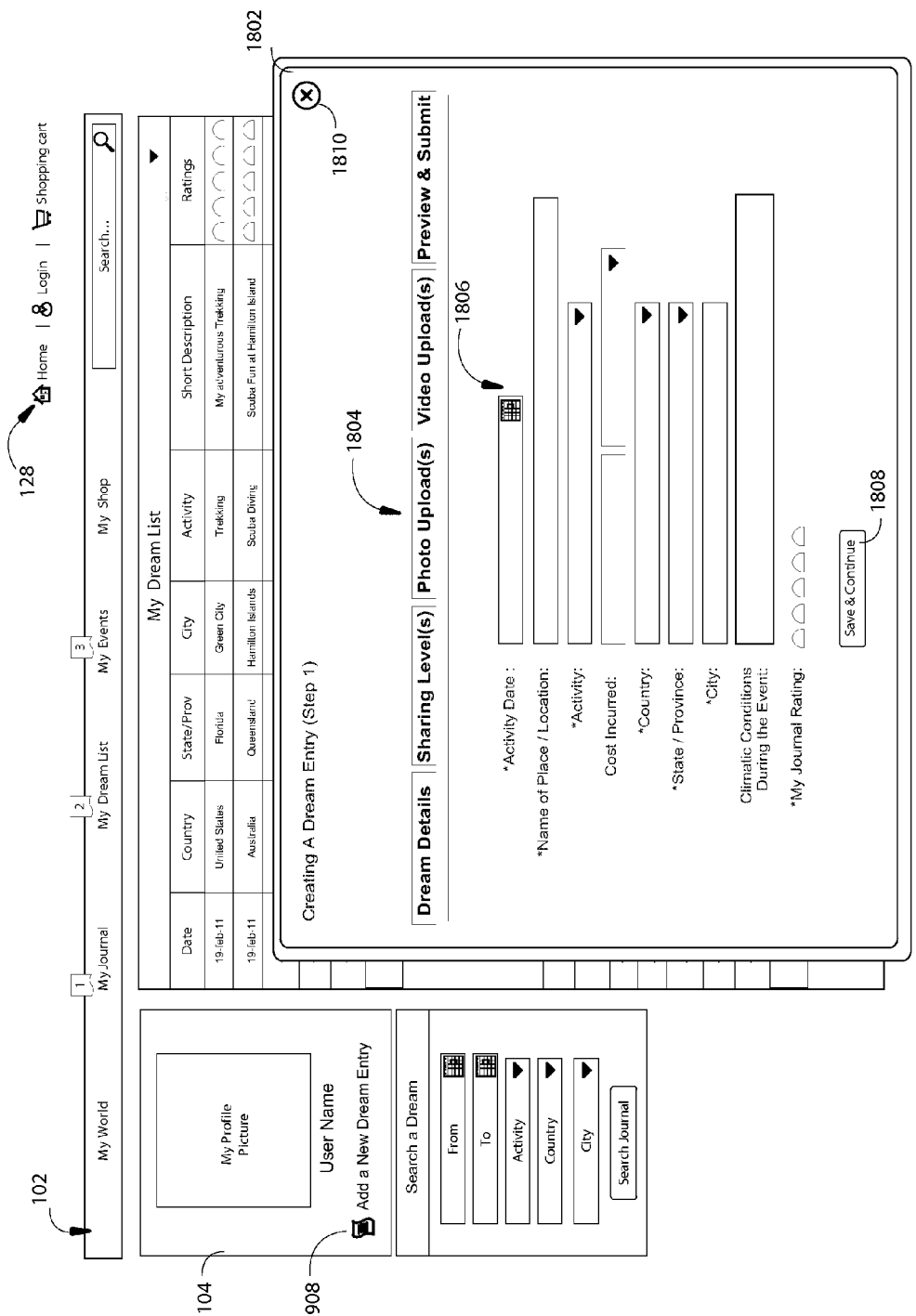
FIGS. 18-24 are diagrams showing a step-by-step process for creating a Dream entry, in an embodiment.

FIG. 18 shows the first step in the process. Pop-up Creating a My Dream Entry box 1802 appears, with process stages bar 1804, which shows the steps in creating a dream entry (entering dream details, setting sharing level(s), uploading photos, uploading videos, and previewing and submitting) and the current step. Dream details fields 1806 allow a user to enter information such as activity date, location, type of activity, cost, city, state, and country, weather conditions, and rating. Save & Continue button 1808 saves those details and continues to the next step. Cancel button 1810 closes the pop-up box and returns to the page.

Figure 19:
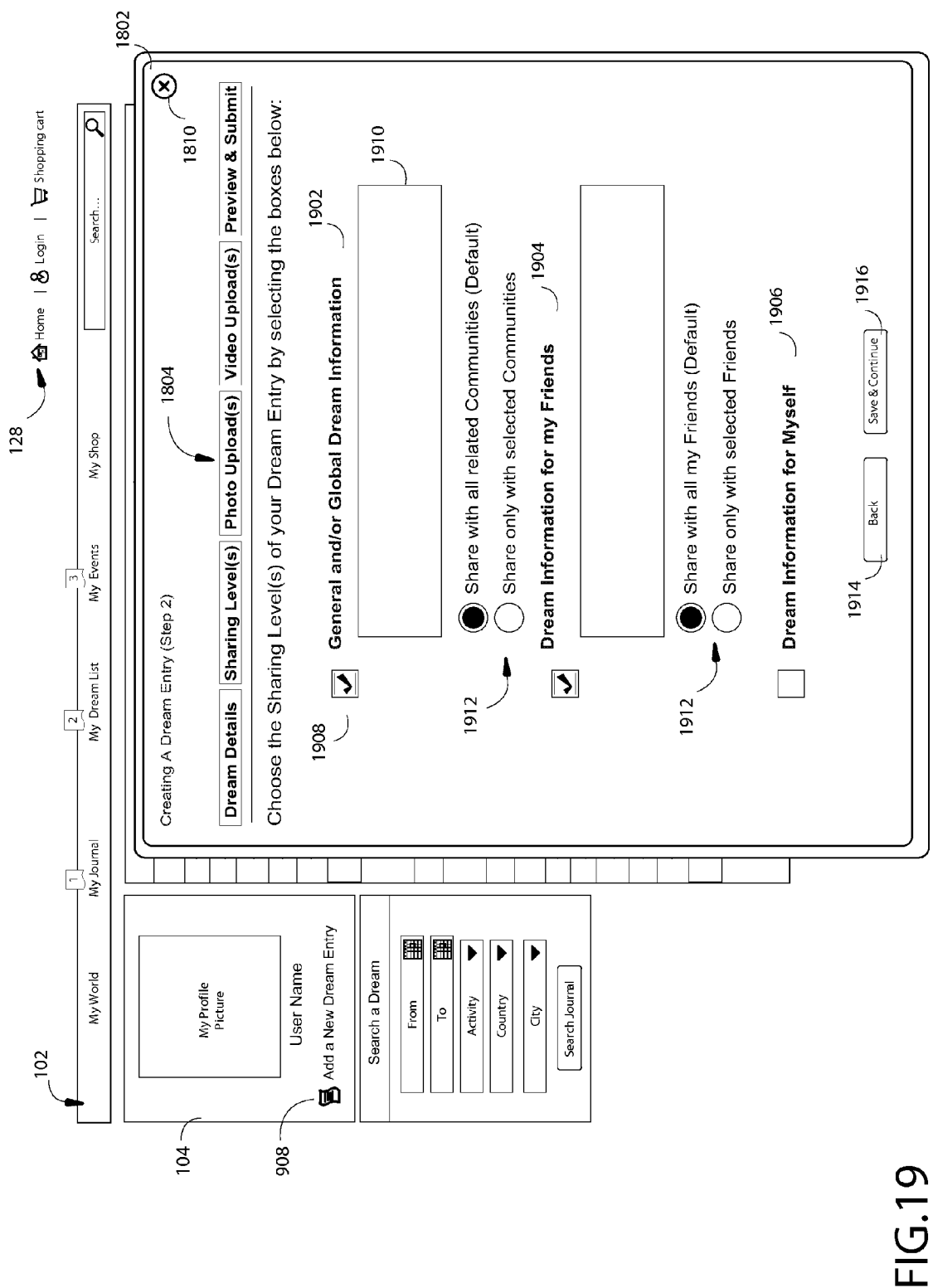

FIG. 19 shows the second step in the process. Here, the user chooses whether to add information for the general public 1902, just for friends 1904, and/or just for his or herself 1906 by checking the box 1908 next to each category he or she wishes to add. When a box 1908 is checked, a corresponding text field 1910 appears for the user to input the information. Bullet selectors 1912 allow a user to decide whether global information 1902 is shared with all the user's communities or only selected communities, and whether friends information 1904 is shared with all the user's friends or only selected friends. Back button 1914 returns the user to step 1 as shown in FIG. 18, while Save & Continue button 1916 proceeds to the next step.

Figure 20:
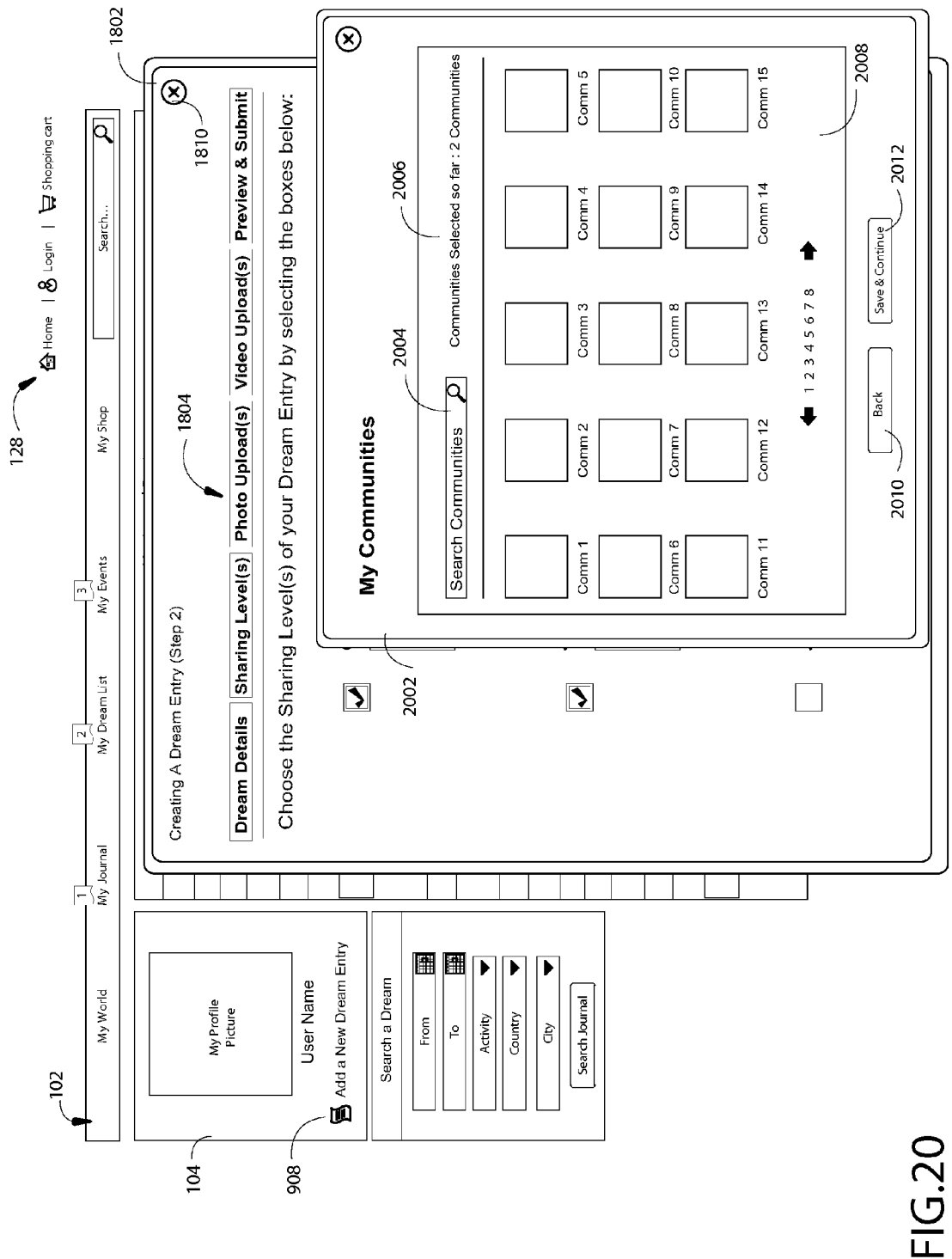

FIG. 20 shows the My Communities pop-up box 2002 that is displayed when a user indicates that the global information submitted is to be shared only with selected communities. A list of the user's communities 2008 is displayed, along with a Search Communities button 2004 for searching through the communities by various criteria and an indication 2006 of the number of communities selected so far. The Back button 2010 returns to the pop-up box of FIG. 19 while Save & Continue button 2012 proceeds.

Figure 21:
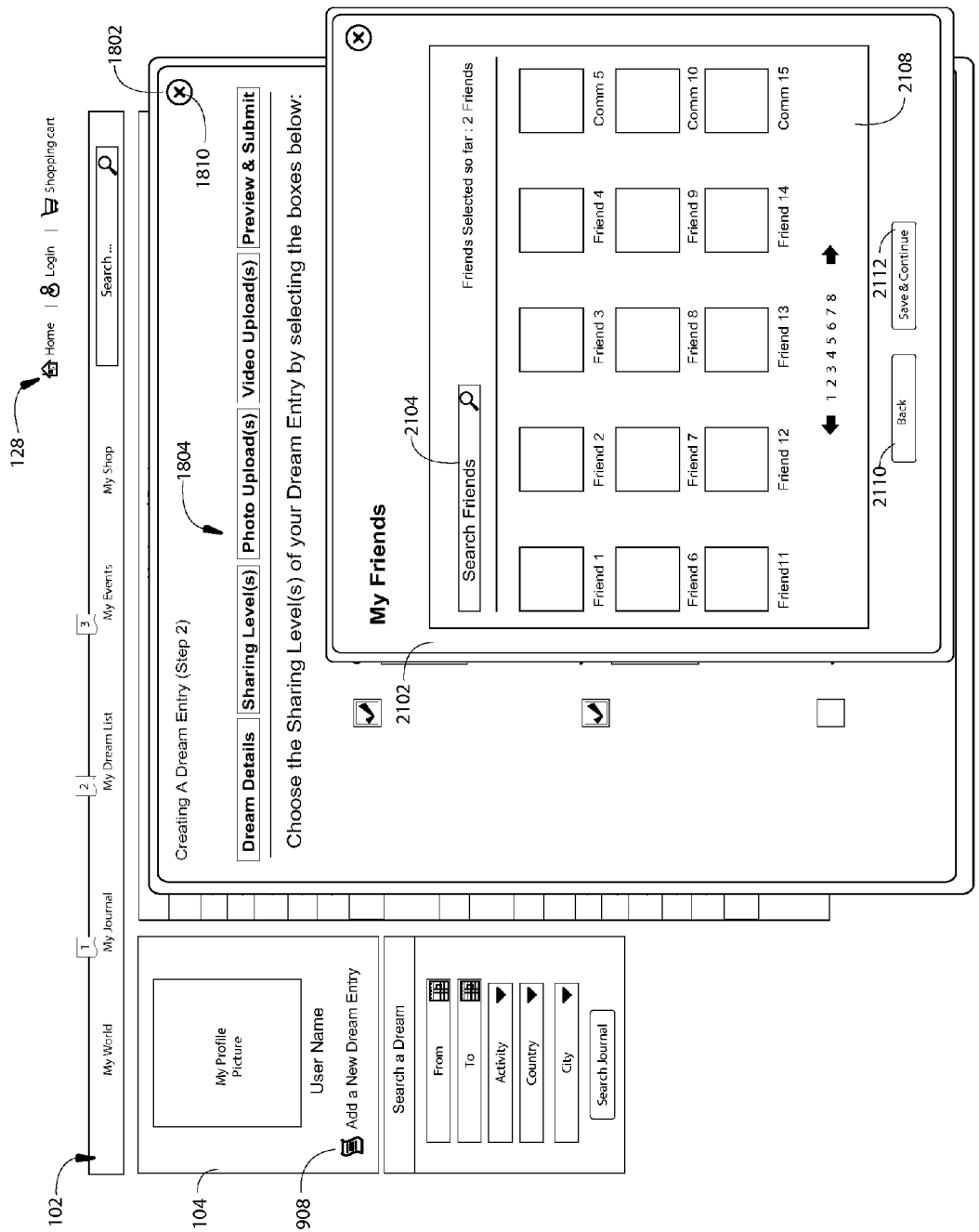

FIG. 21 shows the My Friends pop-up box 2102 that is displayed when a user indicates that the friends information submitted is to be shared only with selected friends. A list of the user's friends 2108 is displayed, along with a Search Friends button 2104 for searching through the friends by various criteria and an indication 2106 of the number of friends selected so far. The Back button 2110 returns to the pop-up box of FIG. 19 while Save & Continue button 2112 proceeds.

Figure 22:
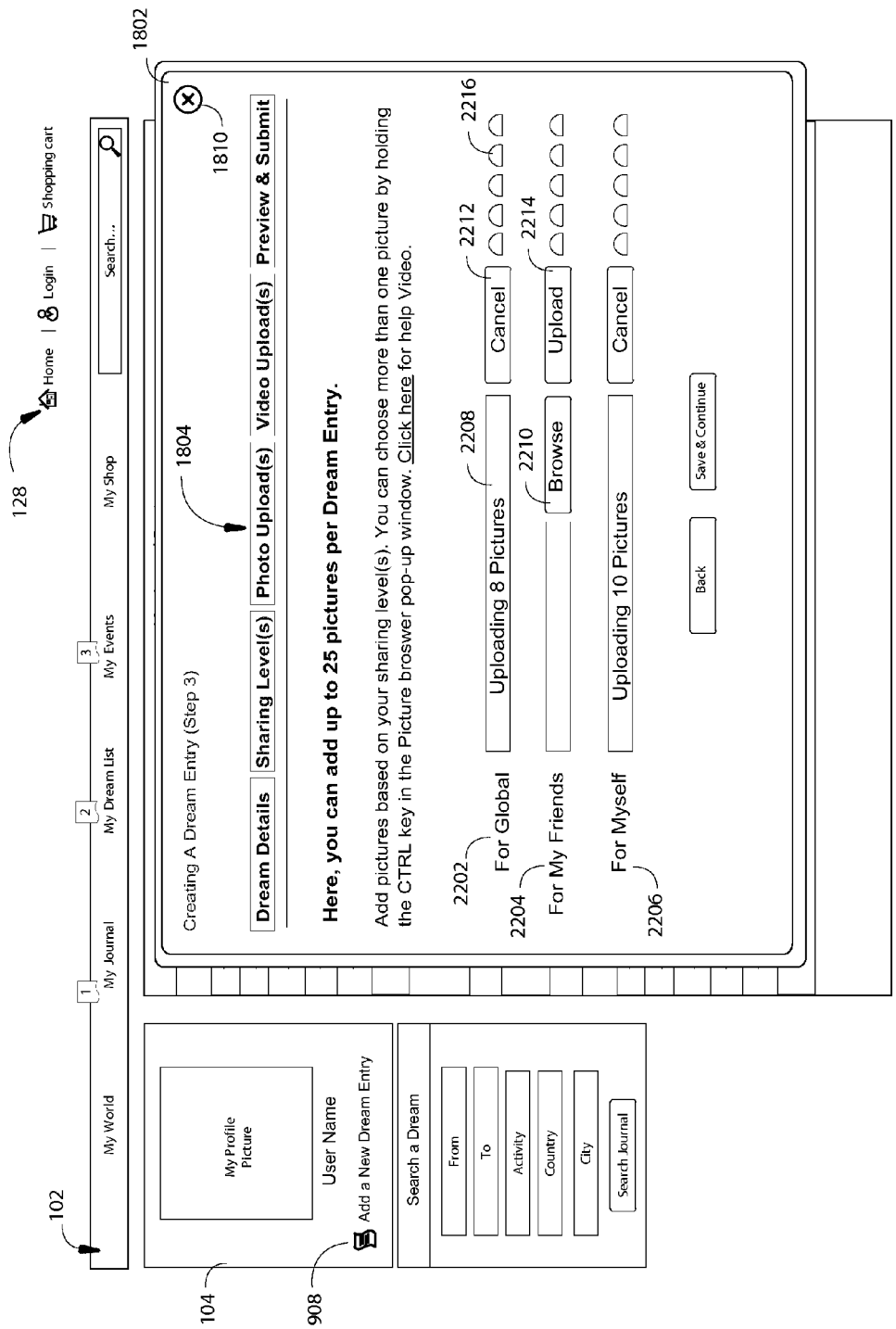

FIG. 22 shows the third step in the process. Here, the user uploads pictures for viewing globally 2202, by friends 2204, and/or only by the user 2206. The picture files are selected with input field and browse button 2210 and selecting the upload button 2214 begins the upload, at which time the input field and browse button 2210 become status bar 2208 and upload button 2214 becomes cancel button 2212 for canceling the upload in progress. Rating 2216 allows the user to give the uploaded pictures ratings.

Figure 23:
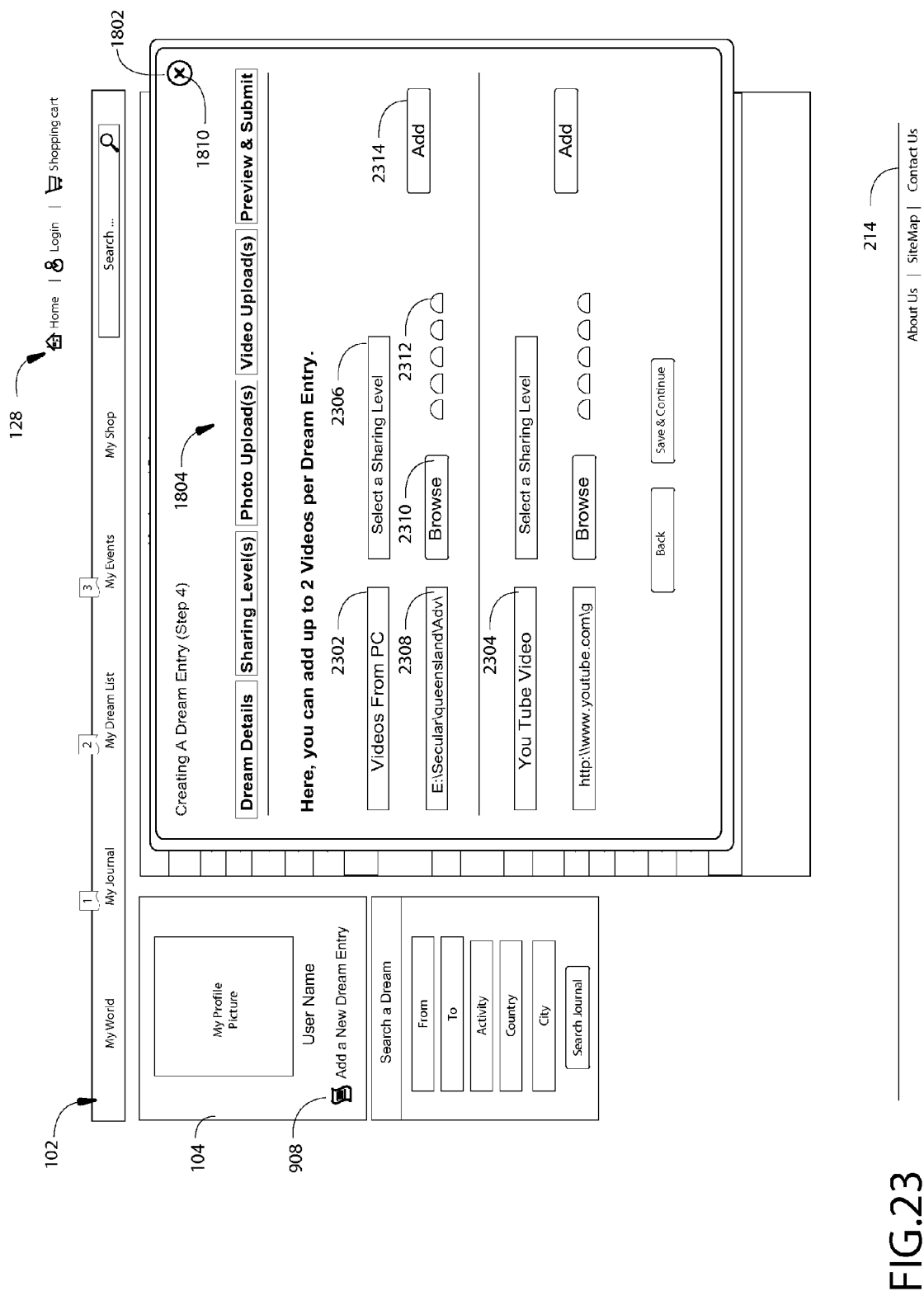

FIG. 23 shows the fourth step in the process. The user can upload videos for viewing from the user's PC 2302 or from a video sharing website 2304. The video file is selected using input field 2308 and browse button 2310, and a sharing level is selected using the Select a Sharing Level dropdown 2306 (Global, Friends, Myself). A rating is applied to the video with rating 2312 and selecting the Add button 2314 uploads the video.

Figure 24:
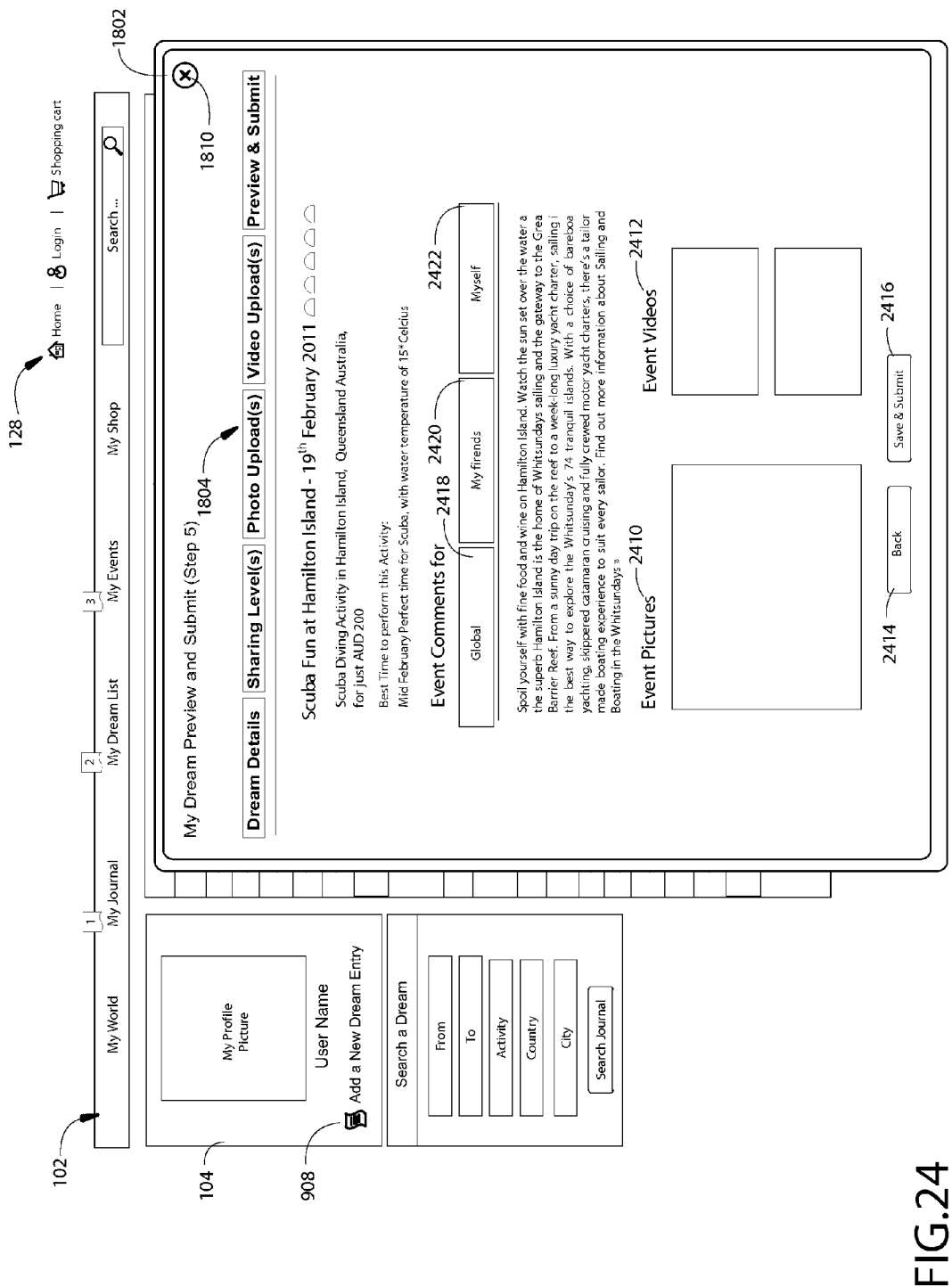

FIG. 24 shows the fifth and final step in the process, where a user can preview the dream entry as it will appear to other users, using the tabs 2418, 2420, 2422 to toggle between viewers at different privacy levels, and submit the dream entry to the website. Finally clicking on 2416 Saves and Submits/Distributes the entire Dream Entry in one easy step.

Figure 25:
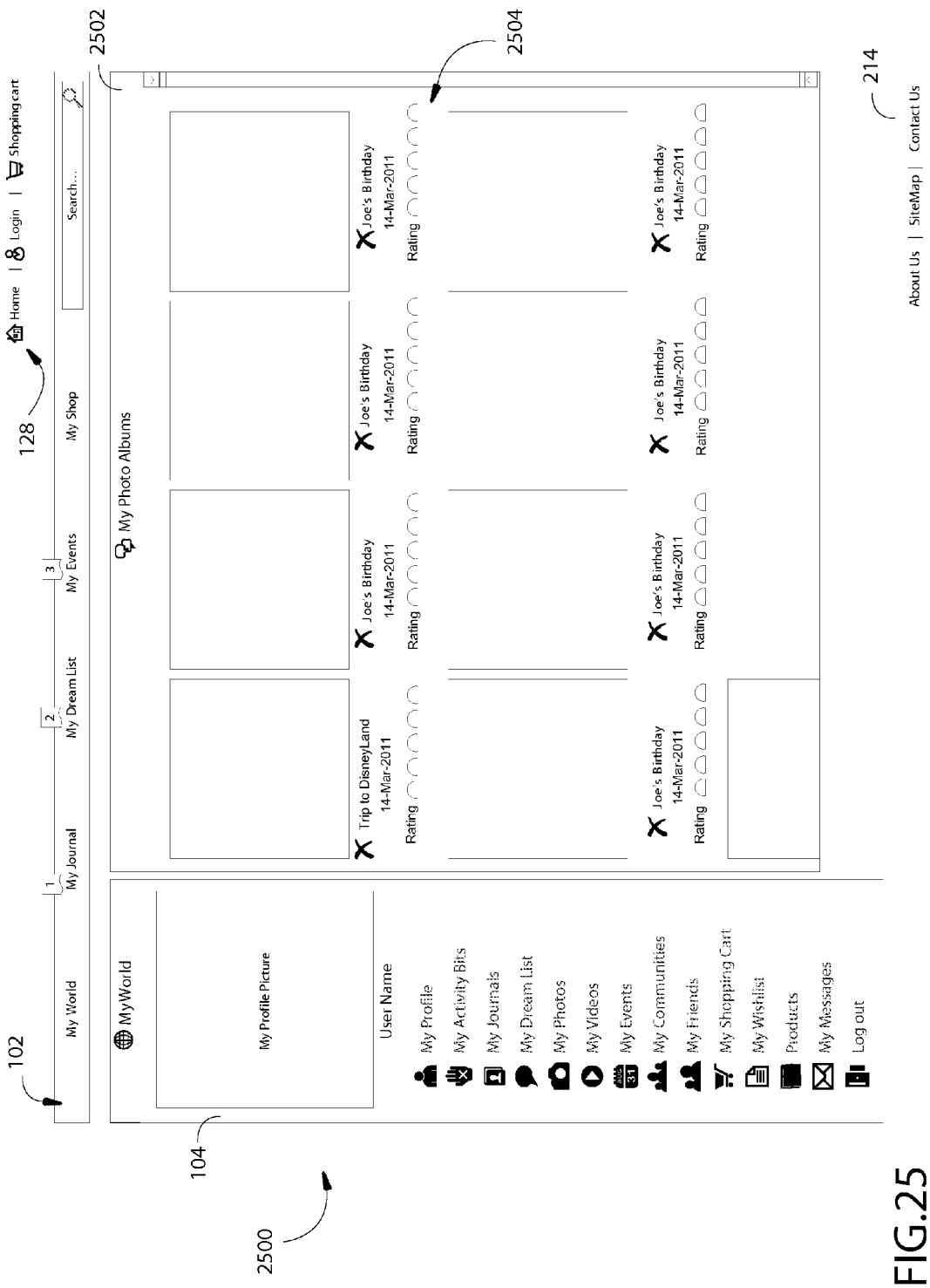
FIG. 25 shows a My Photo Albums View webpage, in an embodiment.

FIG. 25 shows a My Photo Albums View page 2500, reached for example by selecting the My Photos link from the left My World box 104. The main box is now My Photo Albums box 2502, showing the user's photo albums 2504 with summary information such as name, date, rating, and a representative picture for each album. In this figure, the user is viewing his or her own photo albums, so each album has a delete button for removing the album. When viewing another user's photo albums, this option is not available. In this embodiment, photo albums are associated with alpha journal entries—each album corresponds to a journal entry and is named for the alpha journal it corresponds to. In some embodiments, photo albums may also be created outside of the journal entry creation process.

Figure 26:
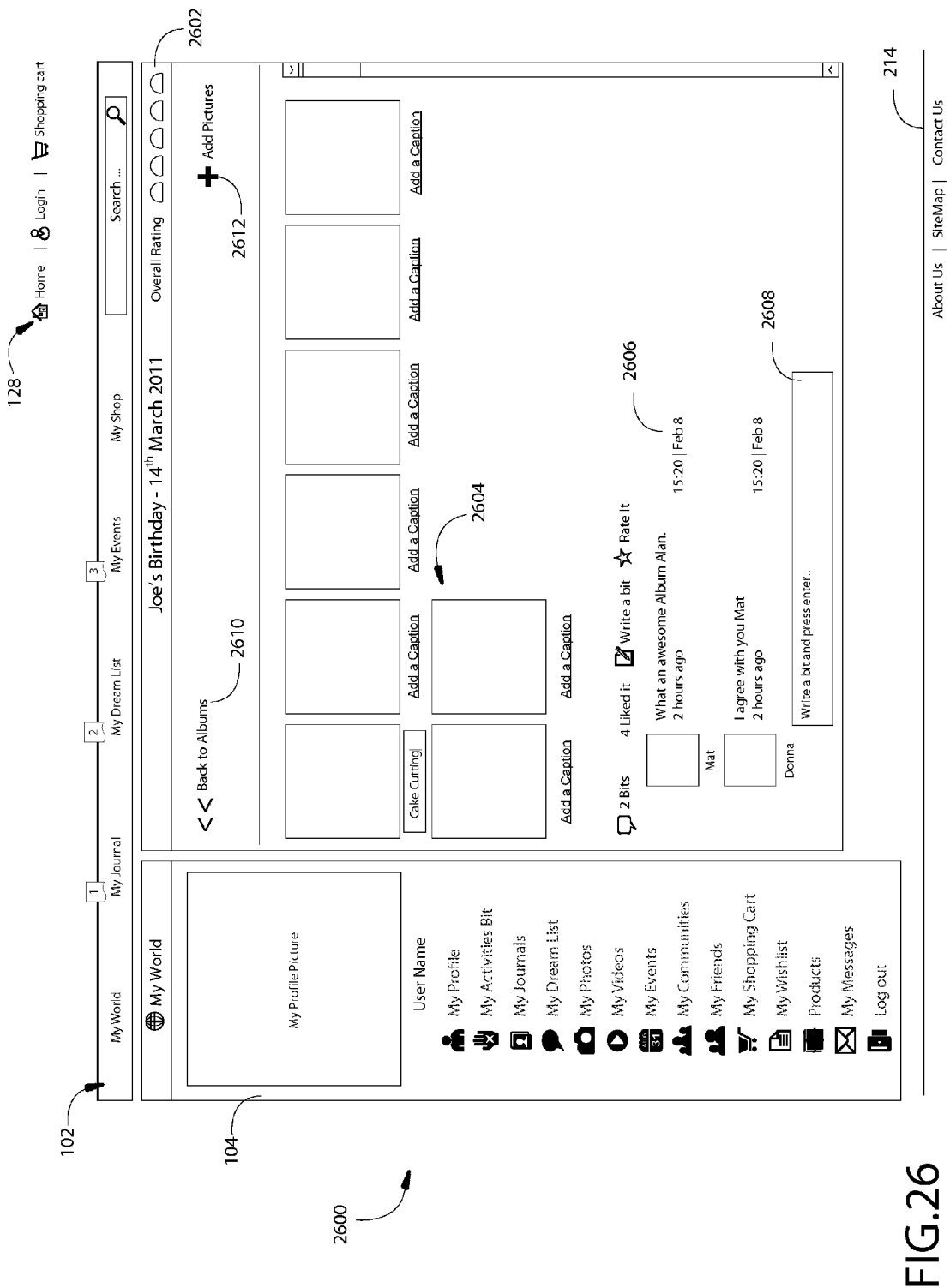
FIG. 26 shows a My Photos View webpage, in an embodiment.

FIG. 26 shows a My Photos View page 2600, reached for example by clicking on a photo album on the My Album View page 2500. The main box becomes a box 2602 named after the album selected, and shows thumbnail images of the photos in the photo album 2604 with captions or an Add a Caption link. Comments 2606 on the photo album as a whole can be made here as in previous figures, using the comment entry field 2608. Back to Album button 2610 returns to the My Album View page 2500 and Add Pictures button 2612 allows a user to add additional pictures to the photo album. In this figure, the user is viewing his or her own photo album—when viewing another user's photo album; the page is the same but does not include Add Pictures button 2612 or Add a Caption links.

Figure 27:
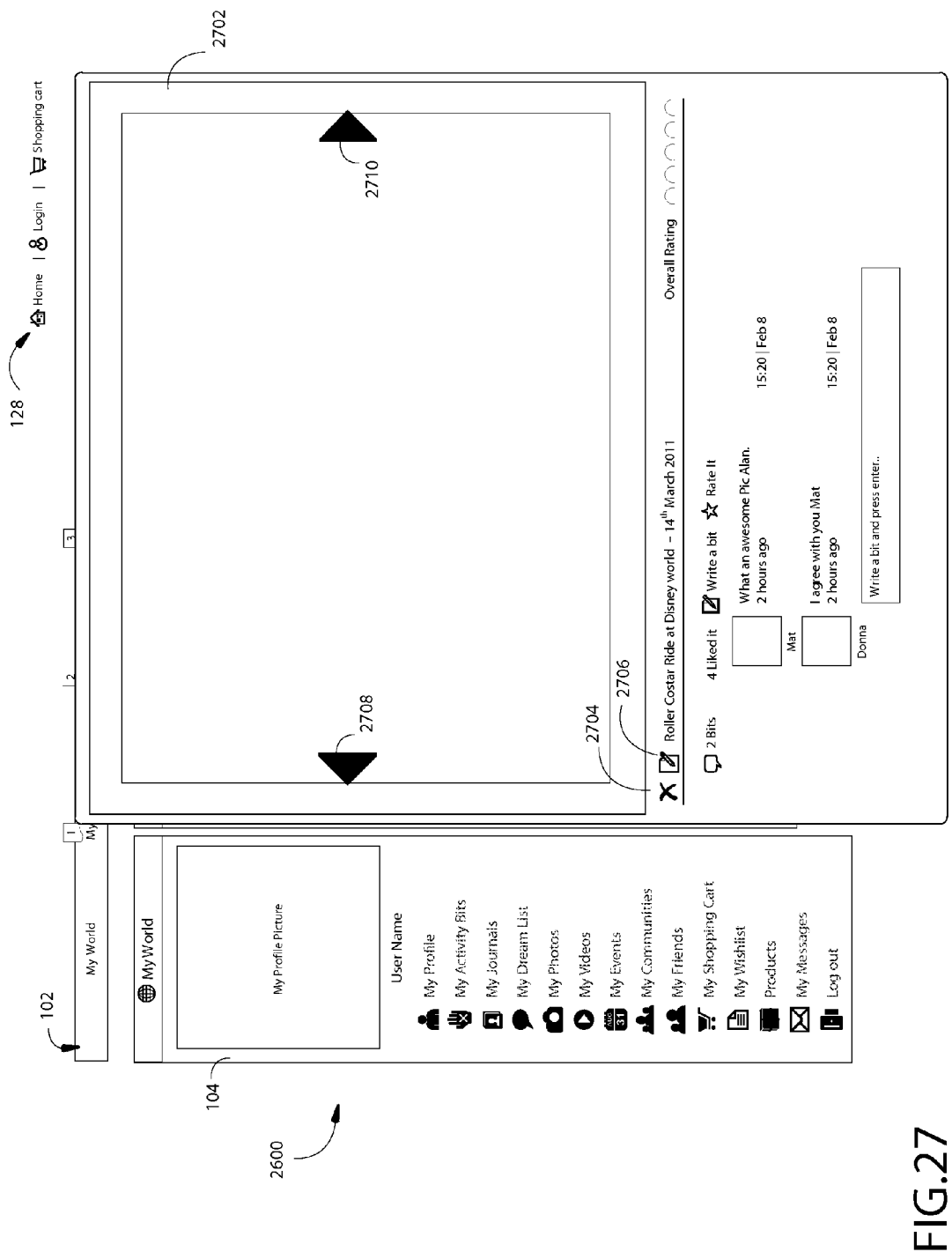
FIG. 27 shows a journal photo slide show website pop-up, in an embodiment.

FIG. 27 shows a journal photo slide show pop-up 2702, which appears when a user selects a photo thumbnail from a My Photos View page 2600. The pop-up shows the photo selected and has left and right arrows 2708, 2710, respectively, for scrolling through the other pictures in the same photo album. Delete and edit buttons 2704, 2706 appear for a user viewing his or her own photo and allows the user to delete the photo or edit the caption.

Figure 28:
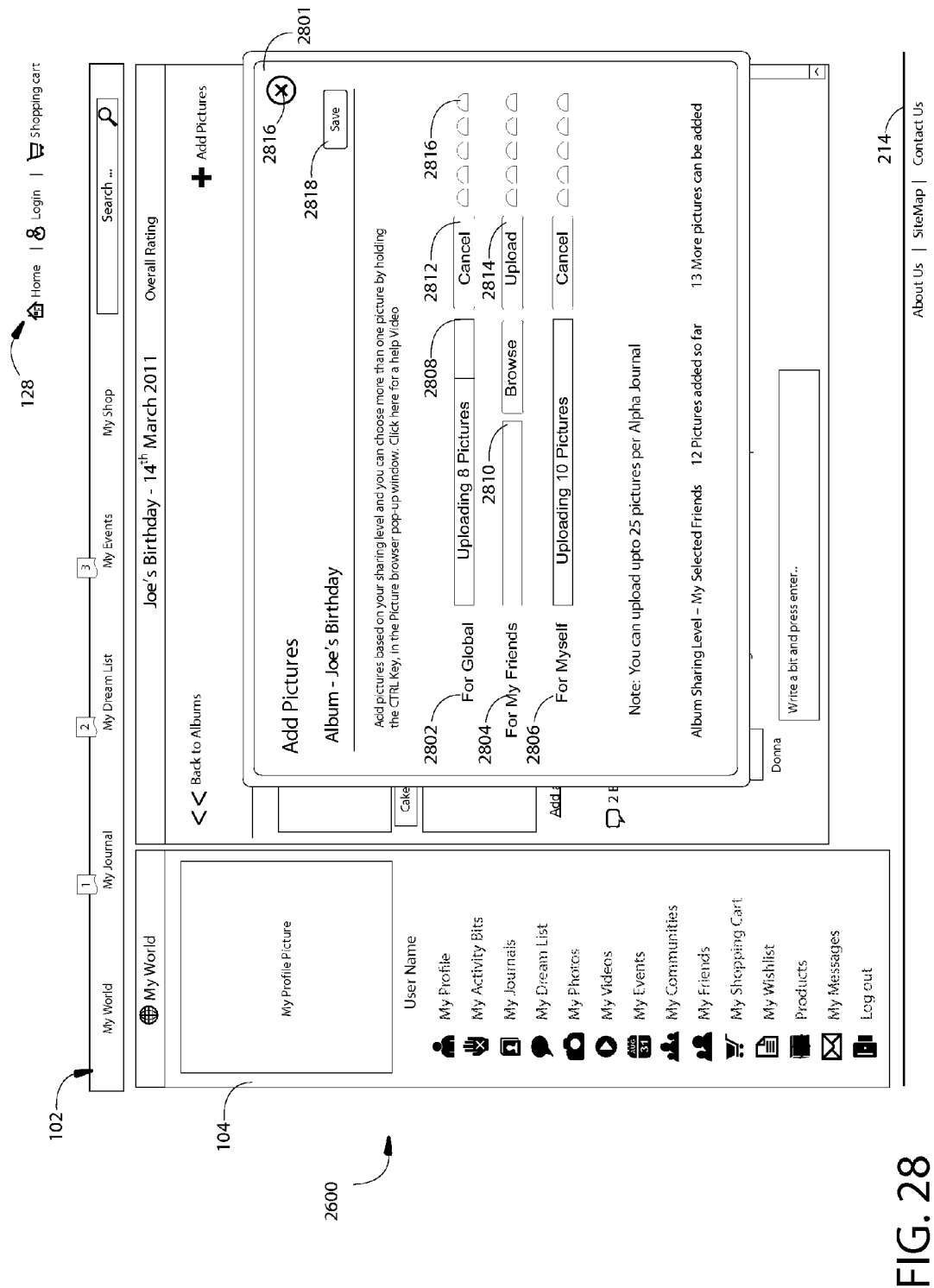
FIG. 28 shows an Add Pictures website pop-up, in an embodiment.

FIG. 28 shows an Add Pictures pop-up 2801 that appears when a user selects the Add Pictures button 2612 on the My Photos View page 2600. It is equivalent to the step of adding pictures in the journal entry creation process. The user uploads pictures for viewing globally 2802, by friends 2804, and/or only by the user 2806. The picture files are selected with input field and browse button 2810 and selecting the upload button 2814 begins the upload, at which time the input field and browse button 2810 become status bar 2808 and upload button 2814 becomes cancel button 2812 for canceling the upload in progress. Rating 2816 allows the user to give the uploaded pictures ratings.

Figure 29:
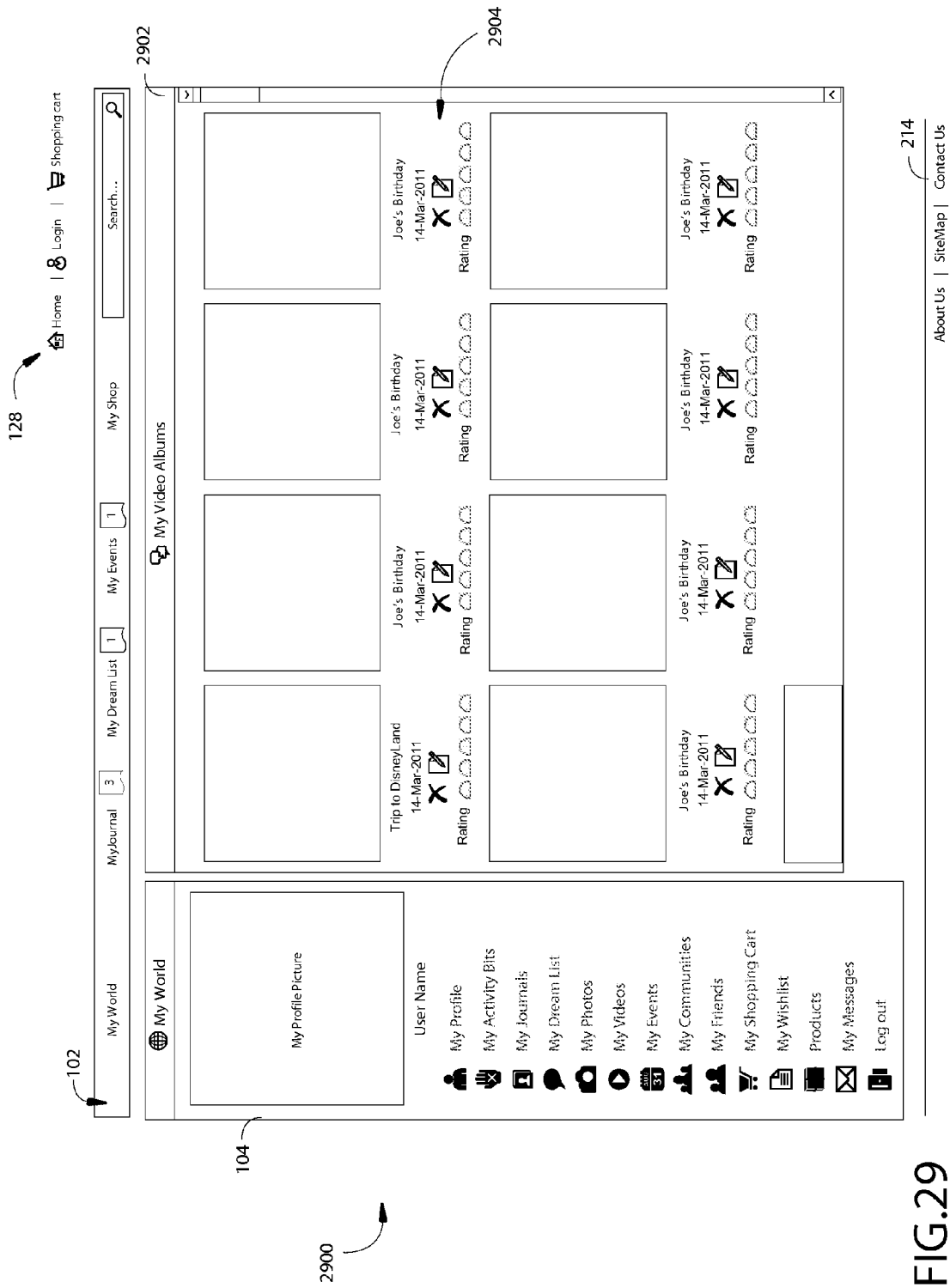
FIG. 29 shows a My Video Albums View webpage, in an embodiment.

FIG. 29 shows a My Video Albums View page 2900, reached for example by selecting the My Videos link from the left My World box 104. My Video Albums box 2902 displays the user's video albums 2904 using summary information such as representative still, title, date, and rating, along with delete buttons and edit caption buttons, which are available only when the user is viewing his or her own video albums.

Figure 30:
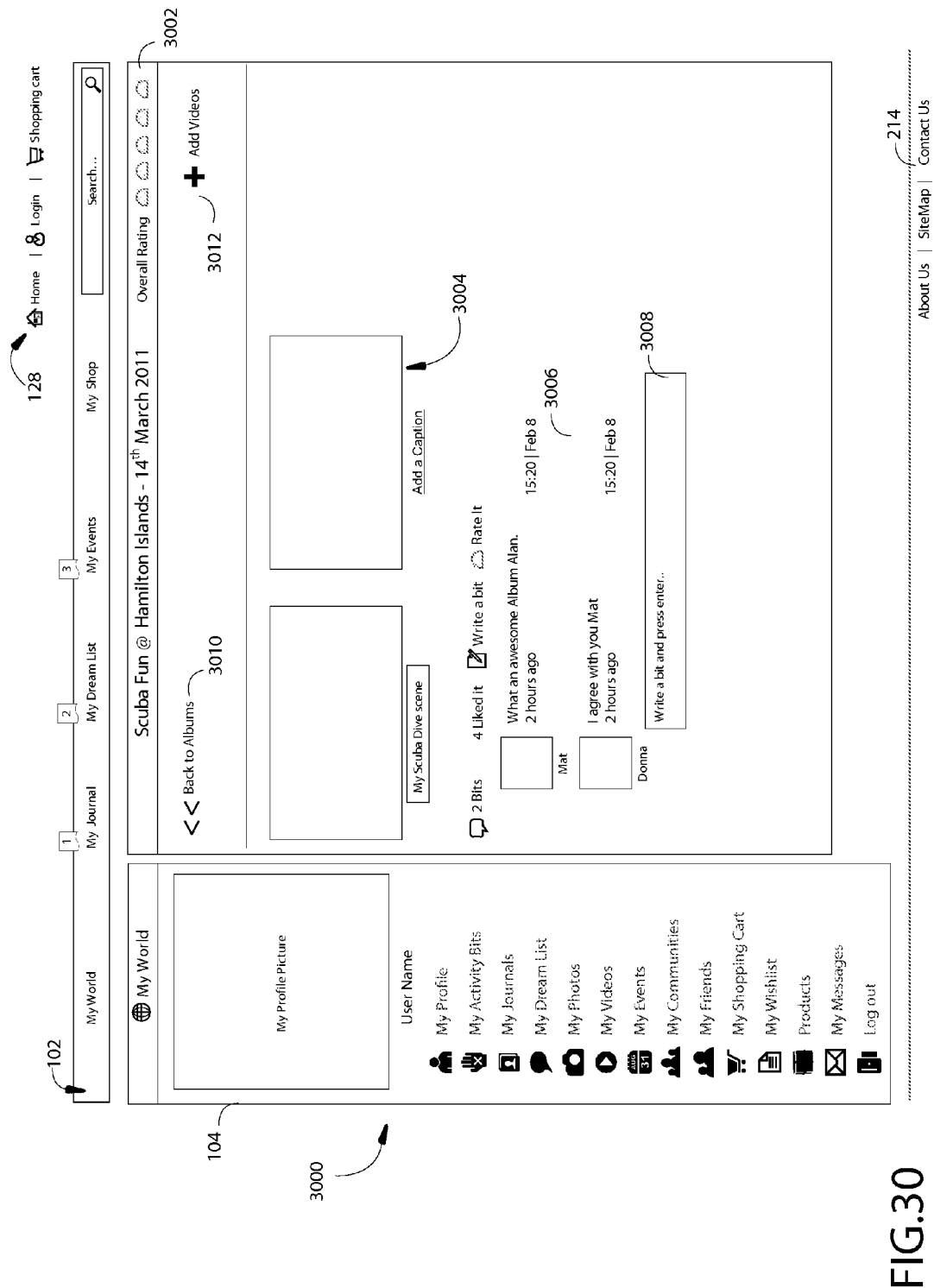
FIG. 30 shows a My Videos View webpage, in an embodiment.

FIG. 30 shows a My Videos View page 3000, reached for example by selecting a video album 2904 from the My Video Albums page 2900. The main box becomes a box 3002 named after the album selected, and shows thumbnail stills of the videos in the video album 3004 with captions or Add a Caption links Comments 3006 on the video album as a whole can be made here as in previous figures, using the comment entry field 3008. Add Videos button 3012 allows a user to add additional videos to the video album. In this figure, the user is viewing his or her own video album—when viewing another user's video album; the page is the same but does not include Add Videos button 3012 or Add a Caption links. It should be noted that when bits or comments are entered, they will be seen or viewed only according to the security level in which the initial entry was made (so a comment on a photo visible only to friends is also visible only to friends).

Figure 31:
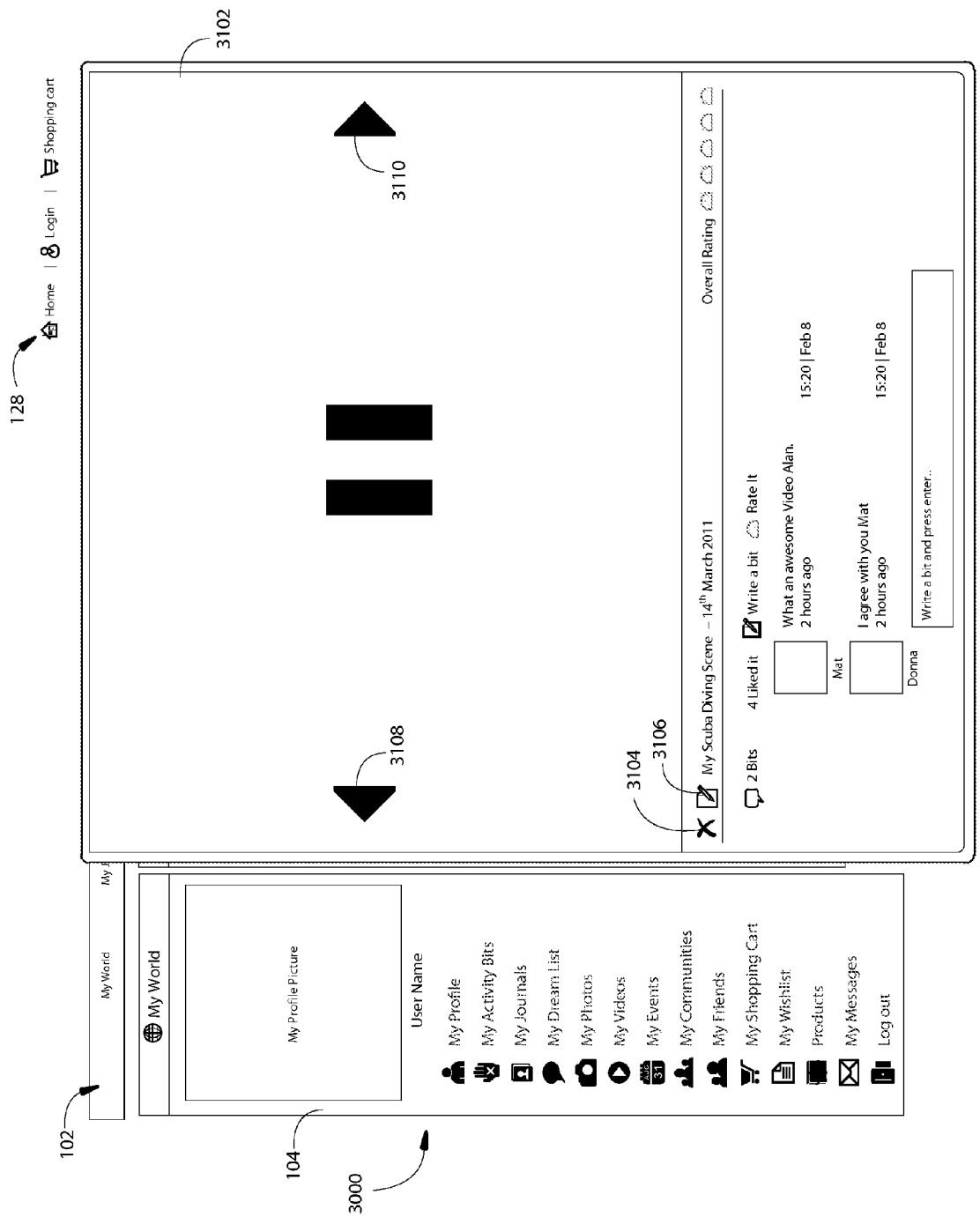
FIG. 31 shows a journal video view website pop-up, in an embodiment.

FIG. 31 shows a journal video view pop-up 3102, which appears when a user selects a video thumbnail still from a My Videos Albums View page 3000. The pop-up shows the video selected and has left and right arrows 3108, 3110, respectively, for scrolling through the other videos in the same video album. Delete and edit buttons 3104, 3106 appear for a user viewing his or her own videos and allows the user to delete the video or edit the caption.

Figure 32:
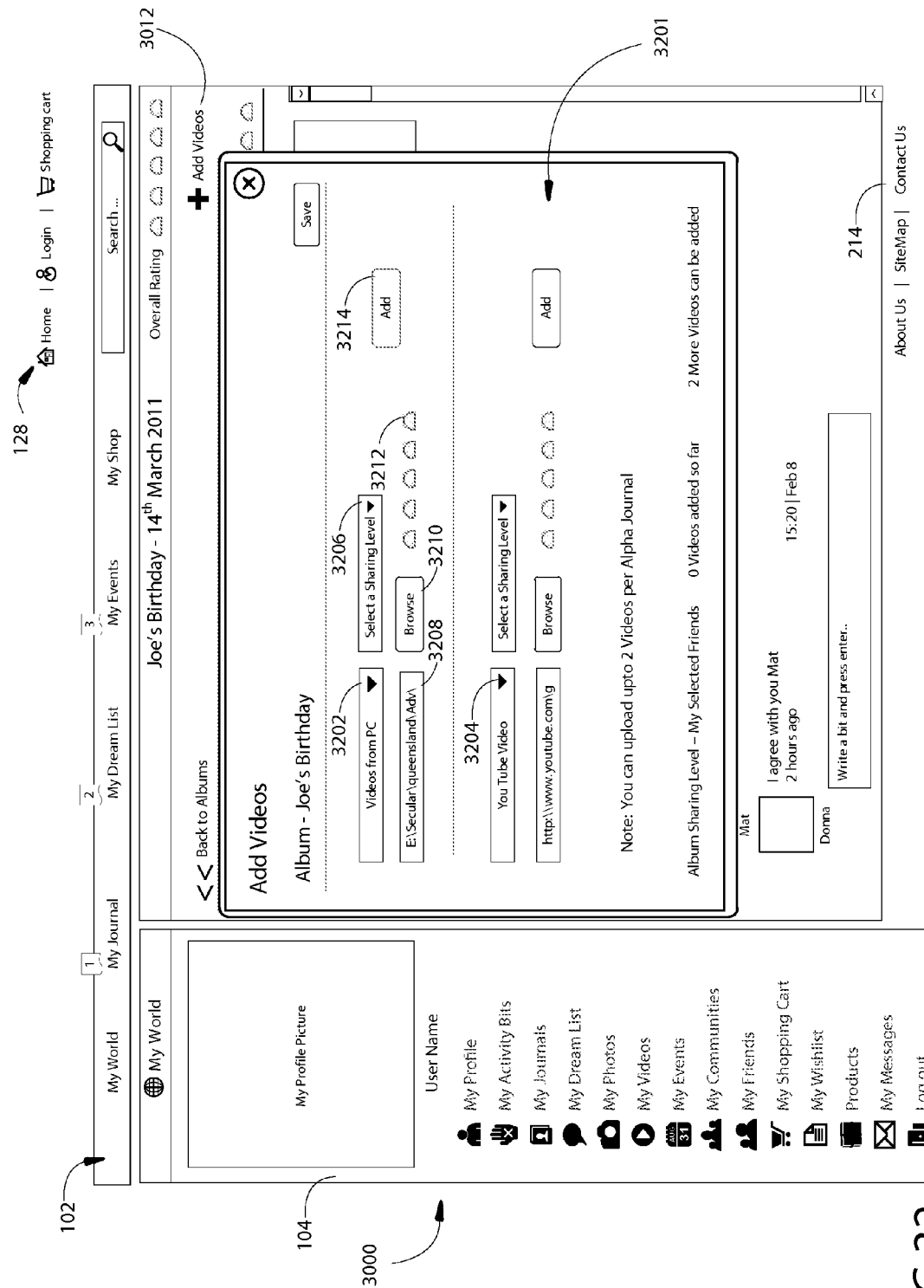
FIG. 32 shows an Add Videos website pop-up, in an embodiment.

FIG. 32 shows an Add Videos pop-up 3201 that appears when a user selects the Add Videos button 3012 on the My Video Album View page 3000. It is equivalent to the step of adding videos in the journal entry creation process. The user can upload videos for viewing from the user's PC 3202 or from a video sharing website 3204. The video file is selected using input field 3208 and browse button 3210, and a sharing level is selected using the Select a Sharing Level dropdown 3206 (Global, Friends, Myself). A rating is applied to the video with rating 3212 and selecting the Add button 3214 uploads the video.

Figure 33:
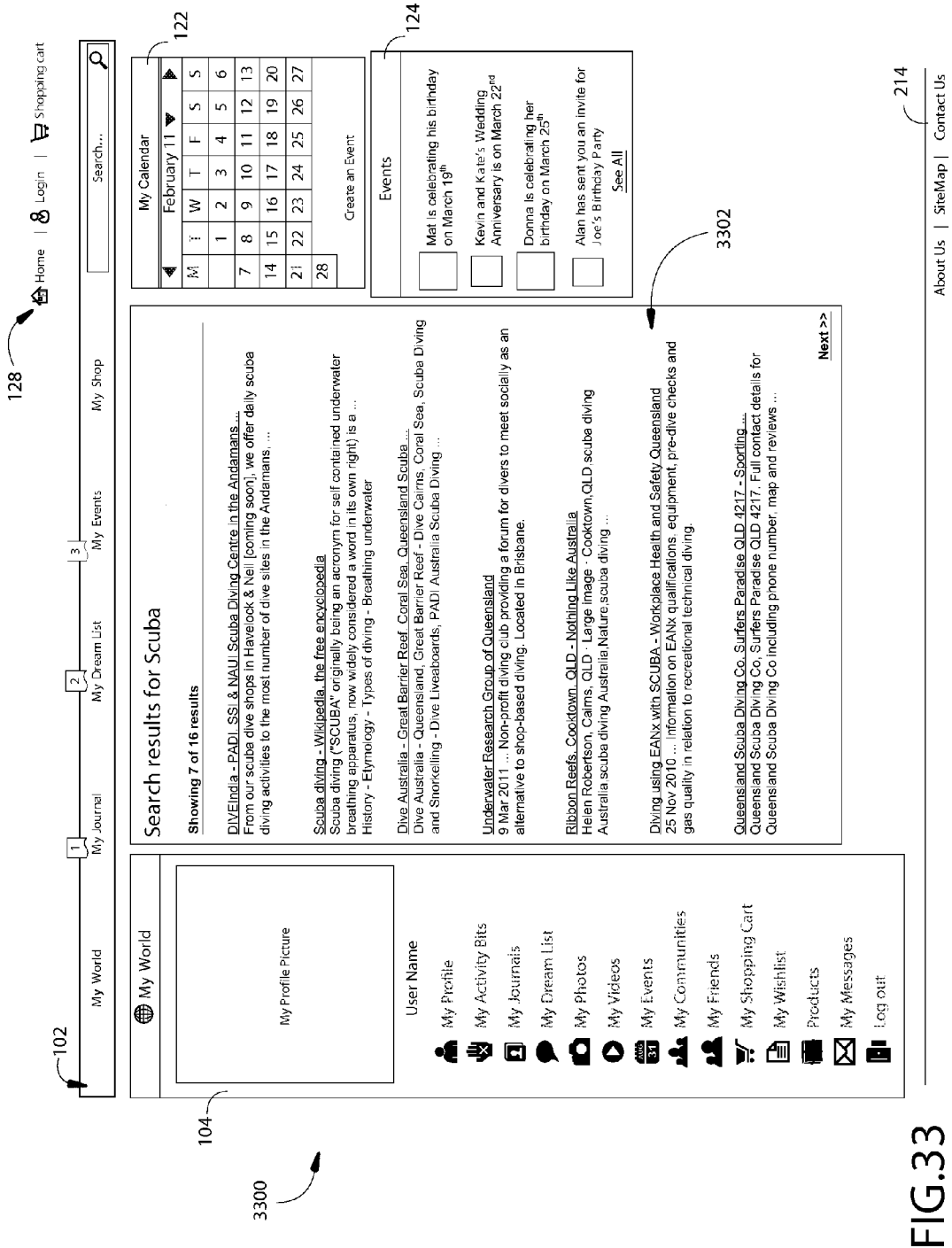
FIG. 33 shows a Search webpage, in an embodiment.

FIG. 33 shows a My Search page 3300, which displays a list of search results 3302, here for the search term "scuba". This page is reached, for example, by entering a search term into the search box in the top navigation bar 102. The user may set an option to search the Internet globally, or only the local website. Local website search results include relevant journal entries, videos and pictures.

Figure 34:
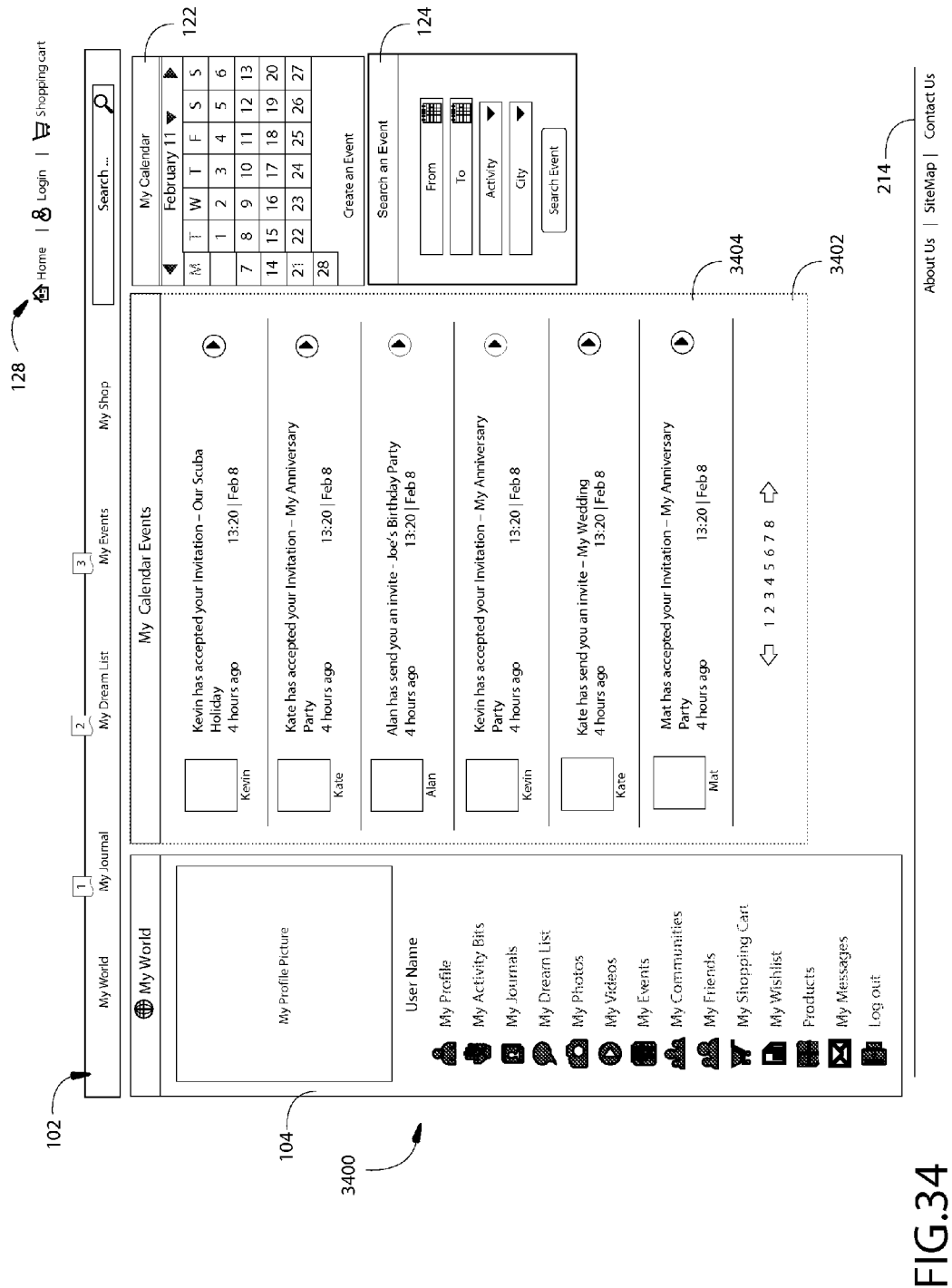
FIG. 34 shows a My Calendar Events home webpage, in an embodiment.

FIG. 34 shows a My Calendar Events home page 3400, reached for example by selecting the Events link in the top navigation bar 102, which has a feed 3404 of recent event activity in My Recent Calendar Events box 3402. Event activity includes invitations to events sent, received and accepted (described in FIG. 36 etc.).

Figure 35:
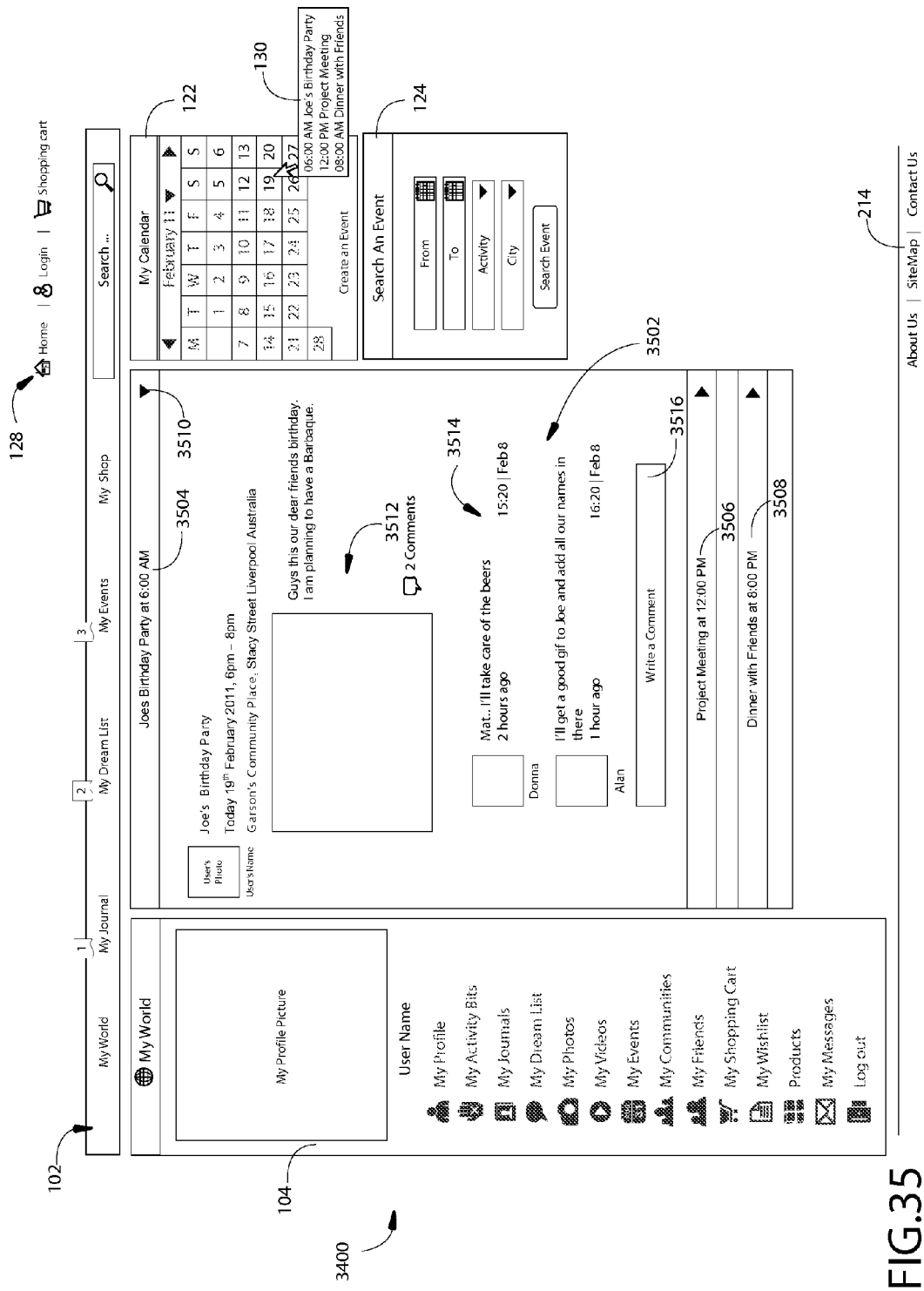
FIG. 35 shows a My Event Calendar Day webpage, in an embodiment.

FIG. 35 shows a My Event Calendar Day page 3500, reached for example by clicking on a highlighted day in the calendar box 122. Highlighted days indicate days with activities recorded. The page 3500 shows the events/invitations happening on the day that was clicked on in box 3502. Here, three events 3504, 3506, 3508 are shown, each having a title, time, and expand/compress button 3510. When expanded, additional information 3512 about the event is displayed, such as title, description, date and time, photo of the user who posted the event, and representative picture, as well as comments 3514 and Write a Comment button 3516 for the user to add a comment.

FIGS. 36-42 shows a My Event Creation pop-up 3602 displaying process stages bar 3604, which shows the steps in creating a My Event (entering event details, setting sharing level(s), uploading photos, uploading videos, and previewing and submitting) and the current step. Event details fields 3606 allow a user to enter information such as activity date, location, type of activity, cost, city, state, and country, weather conditions, and rating. Save & Continue button 3608 saves and continues to the next step. Cancel button 3610 closes the pop-up box and returns to the page.

Figure 36:
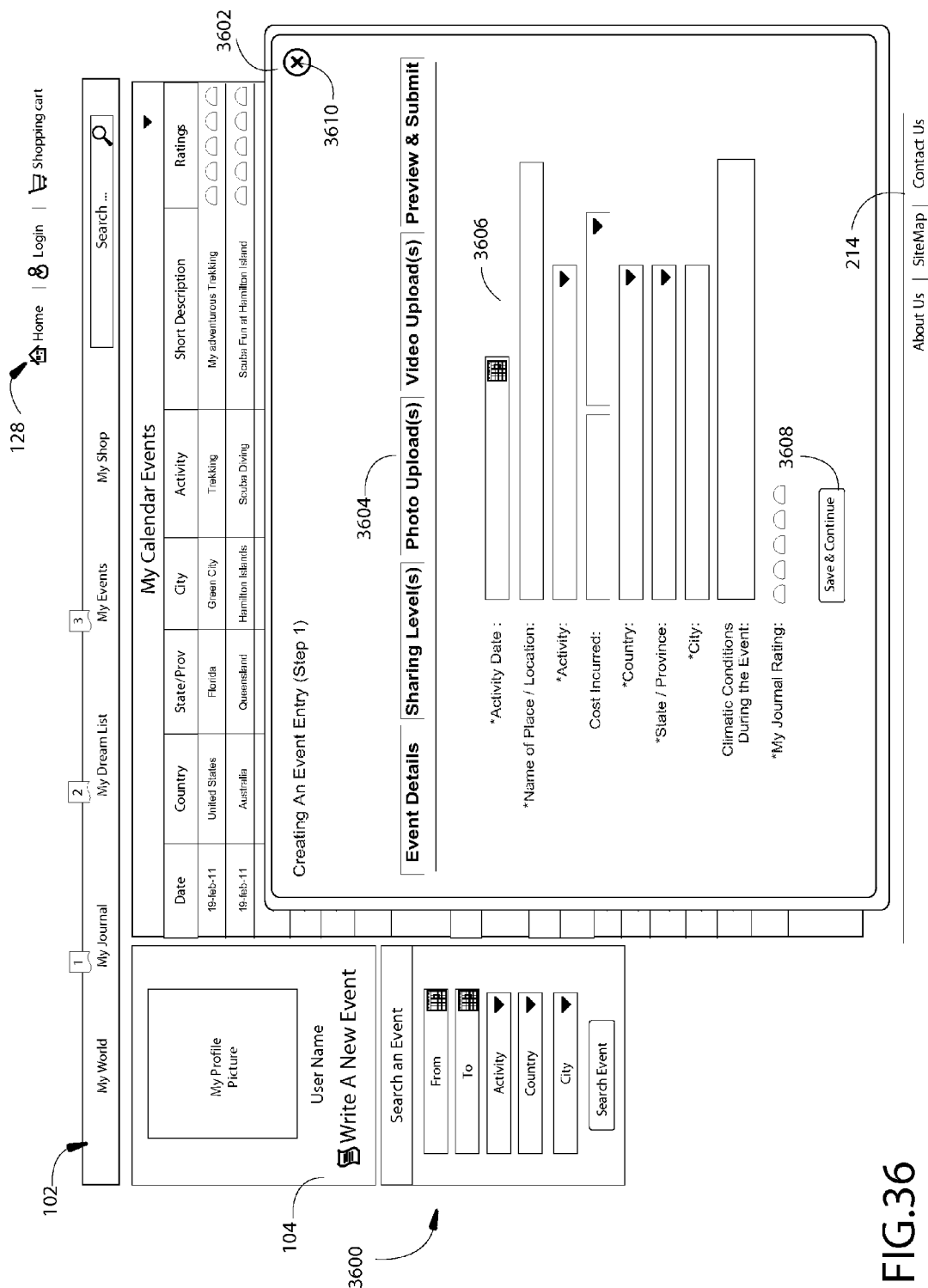
FIGS. 36-42 show an Event Creation website pop-up, in an embodiment.
Figure 37:
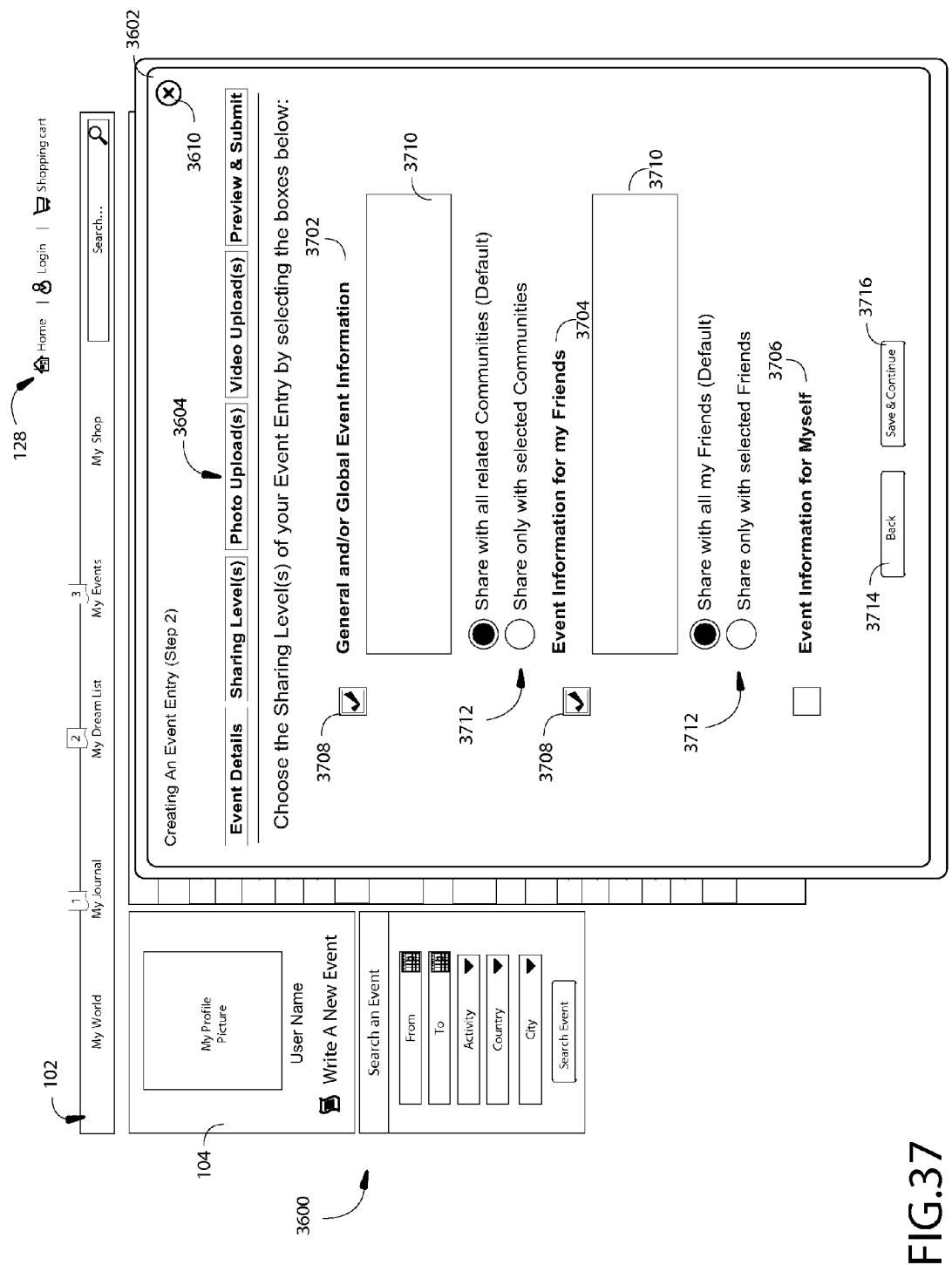

FIG. 37 shows the second step in the process. Here, the user chooses whether to add information for the general public 3702, just for friends 3704, and/or just for his or herself 3706 by checking the box 3708 next to each category he or she wishes to add. When a box 3708 is checked, a corresponding text field 3710 appears for the user to input the information. Bullet selectors 3712 allow a user to decide whether global information 3702 is shared with all the user's communities or only selected communities, and whether friends information 3704 is shared with all the user's friends or only selected friends. Back button 3714 returns the user to step 1 as shown in FIG. 36, while Save & Continue button 3716 proceeds to the next step.

Figure 38:
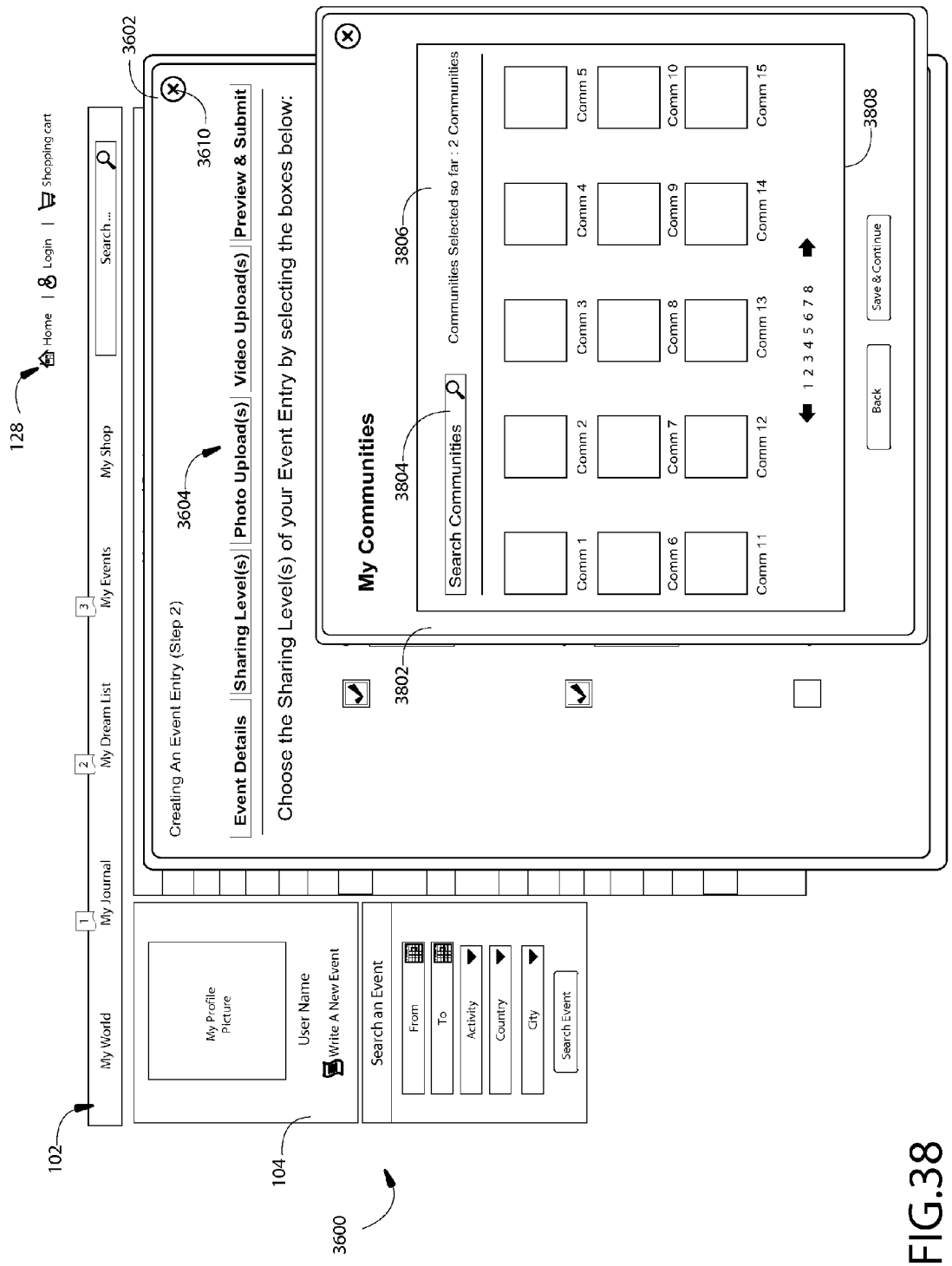

FIG. 38 shows the My Communities pop-up box 3802 that is displayed when a user indicates that the global information submitted is to be shared only with selected communities. A list of the user's communities 3808 is displayed, along with a Search Communities button 3804 for searching through the communities by various criteria and an indication 3806 of the number of communities selected so far.

Figure 39:
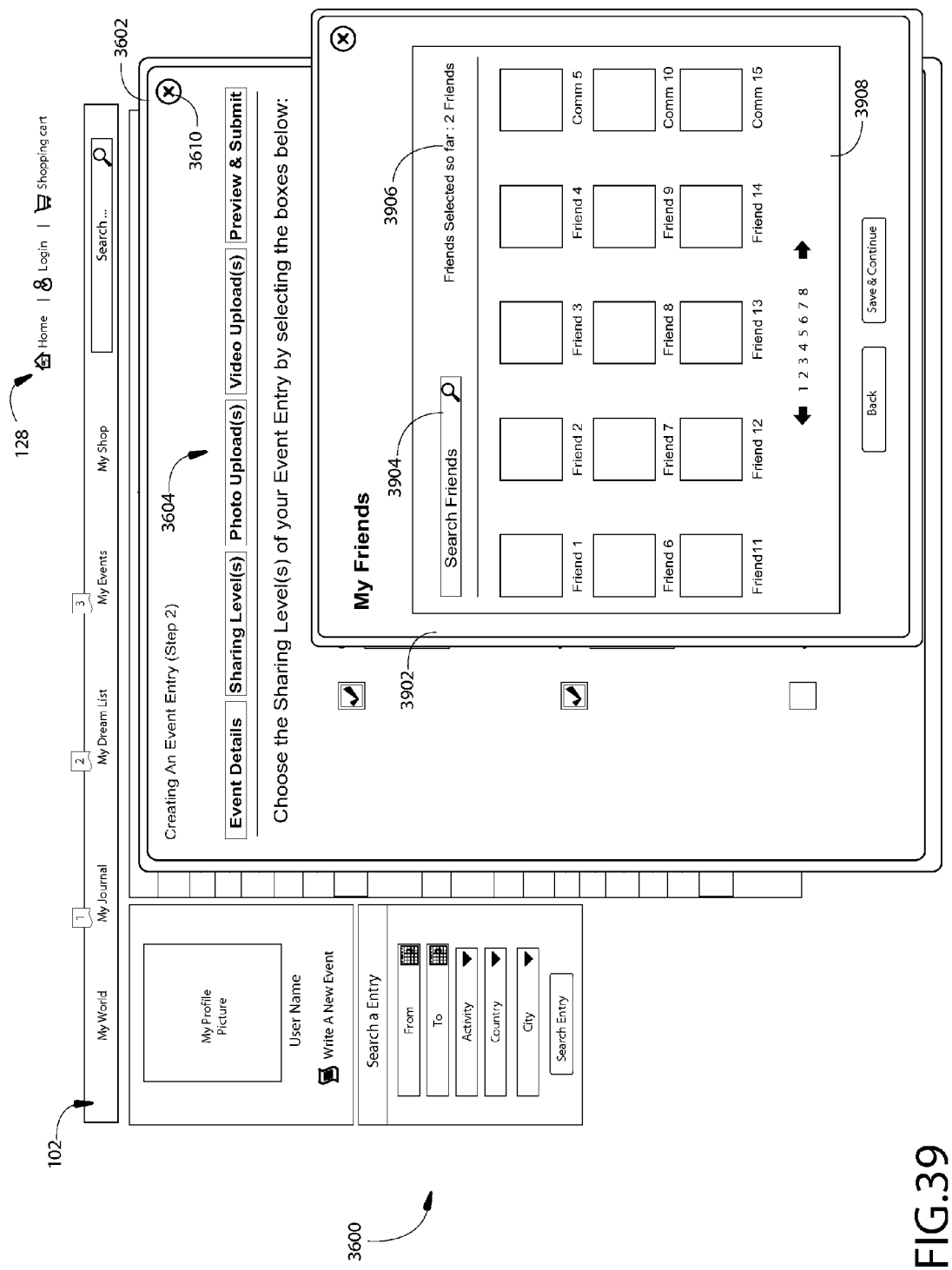

FIG. 39 shows the My Friends pop-up box 3902 that is displayed when a user indicates that the friends information submitted is to be shared only with selected friends. A list of the user's friends 3908 is displayed, along with a Search Friends button 3904 for searching through the friends by various criteria and an indication 3906 of the number of friends selected so far.

Figure 40:
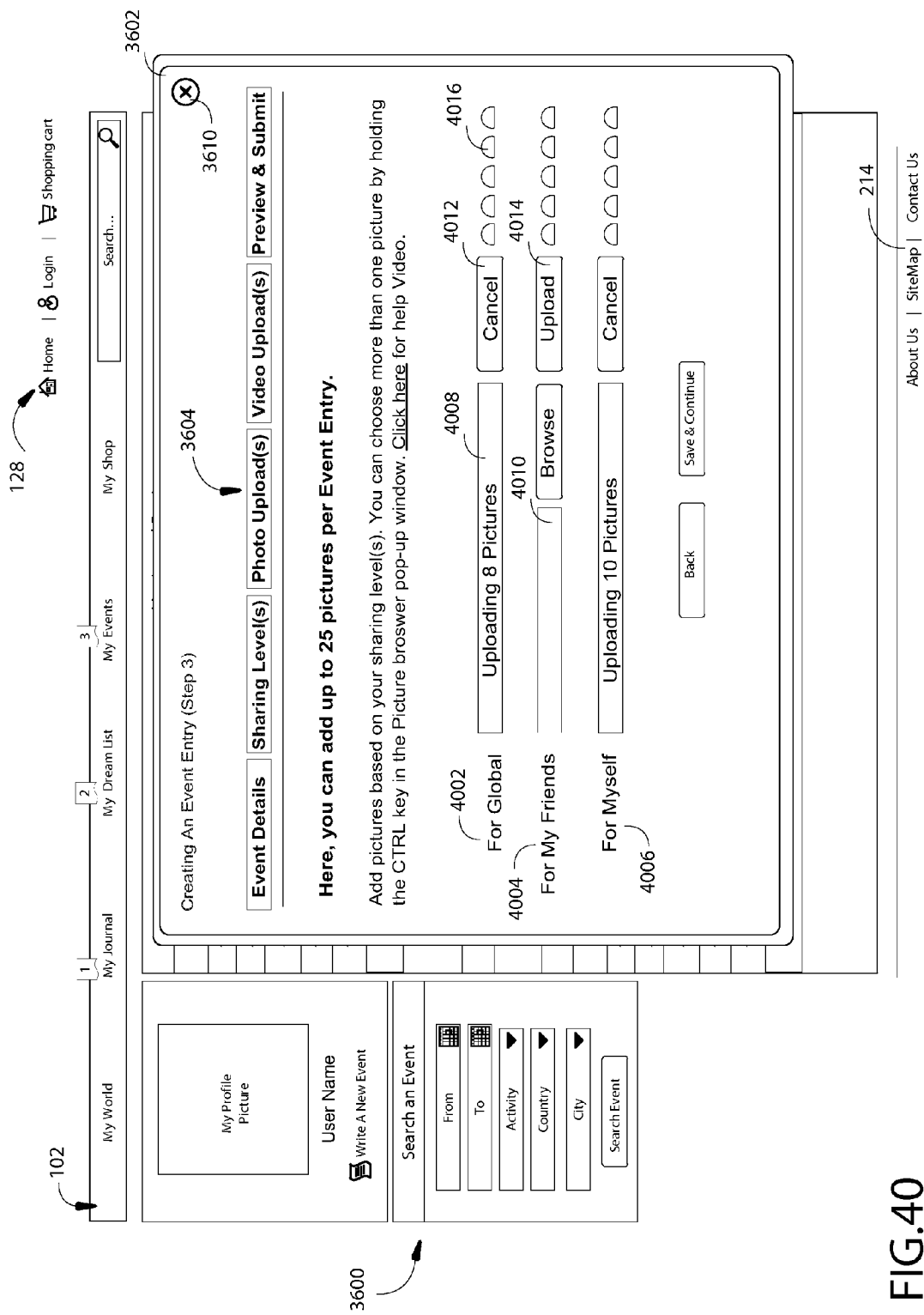

FIG. 40 shows the third step in the process. Here, the user uploads pictures for viewing globally 4002, by friends 4004, and/or only by the user 4006. The picture files are selected with input field and browse button 4010 and selecting the upload button 4014 begins the upload, at which time the input field and browse button 4010 become status bar 4008 and upload button 4014 becomes cancel button 4012 for canceling the upload in progress. Rating 4016 allows the user to give the uploaded pictures ratings.

Figure 41:
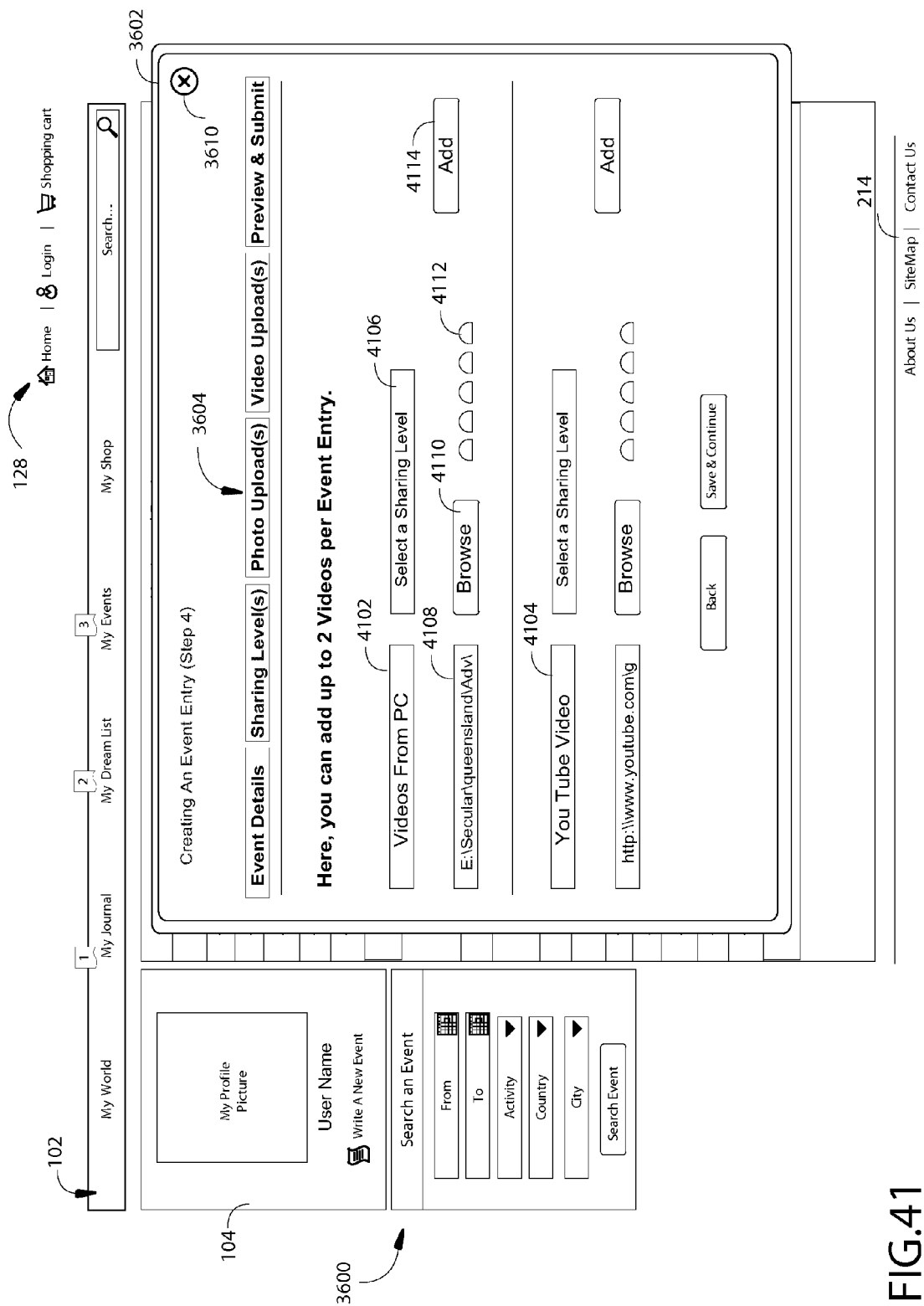

FIG. 41 shows the fourth step in the process. The user can upload videos for viewing from the user's PC 4102 or from a video sharing website 4104. The video file is selected using input field 4108 and browse button 4110, and a sharing level is selected using the Select a Sharing Level dropdown 4106 (Global, Friends, Myself). A rating is applied to the video with rating 4112 and selecting the Add button 4114 uploads the video.

Figure 42:
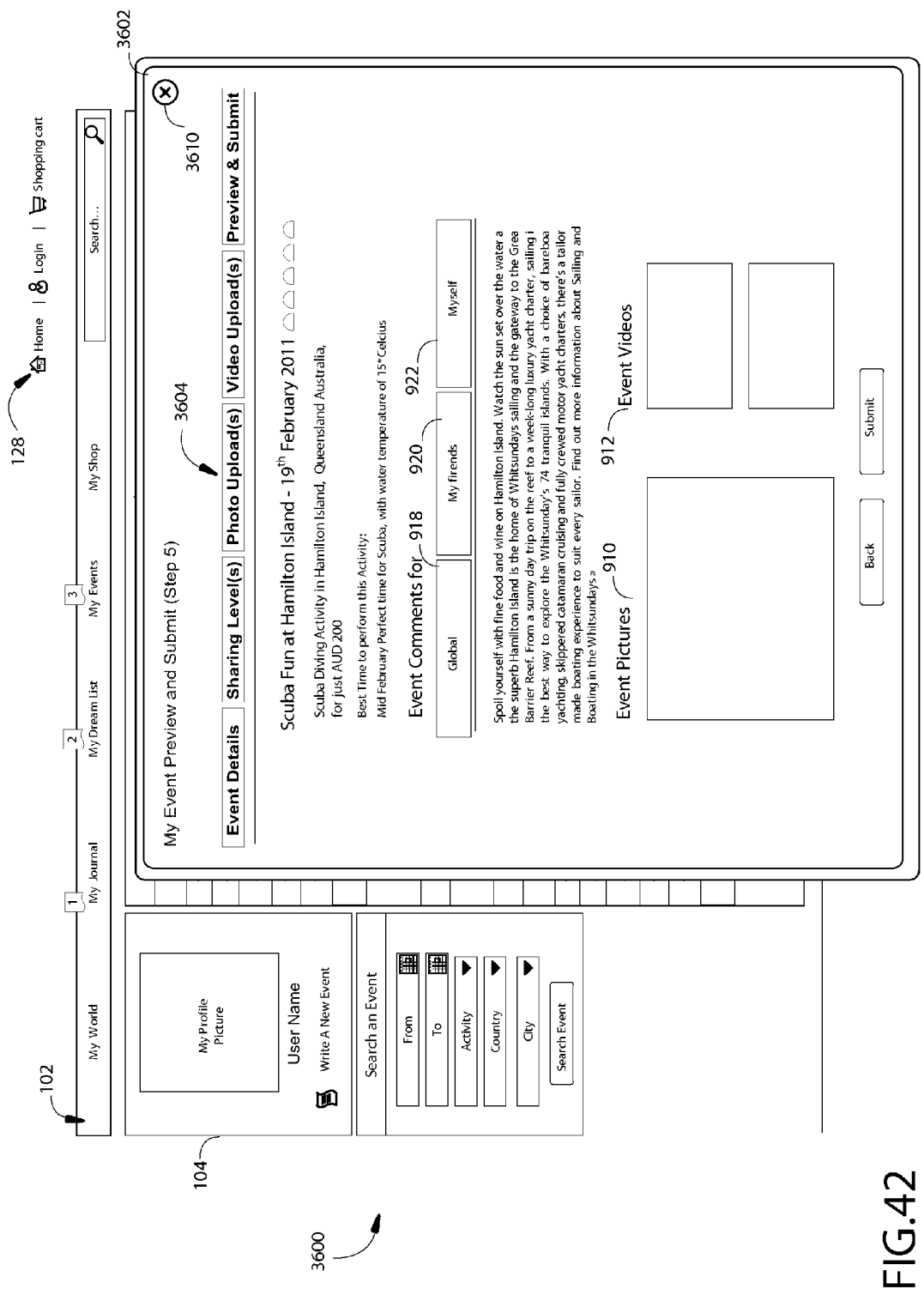

FIG. 42 shows the fifth and final step in the process, where a user can preview the event entry as it will appear to other users, using the tabs 918, 920, 922 to toggle between viewers at different privacy levels, and submit the event entry to the website in one easy step.

Figure 43:
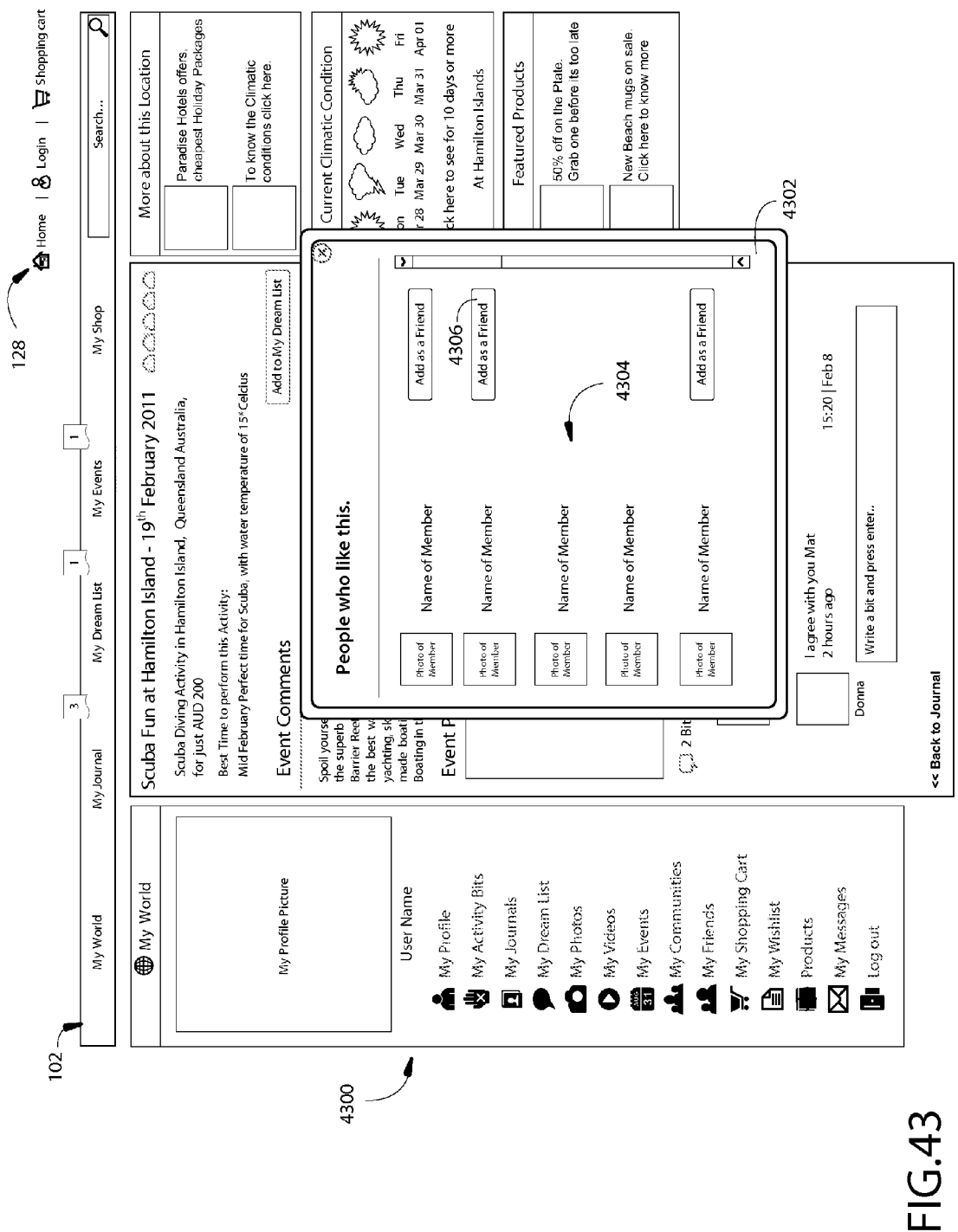
FIG. 43 shows a Likes View website pop-up box, in an embodiment.

FIG. 43 shows a Likes View pop-up box 4302, reached for example by clicking on the indication of the number of people who like a submission such as an event. The box 4302 shows a list of members 4304 with summary details such as name and profile picture/avatar, and any users in the list who are not friends of the user have an Add as a Friend button 4306 next to their name, by which the user can invite them to become friends.

The processing and decision blocks in FIGS. 44-71 represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routing program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 44:
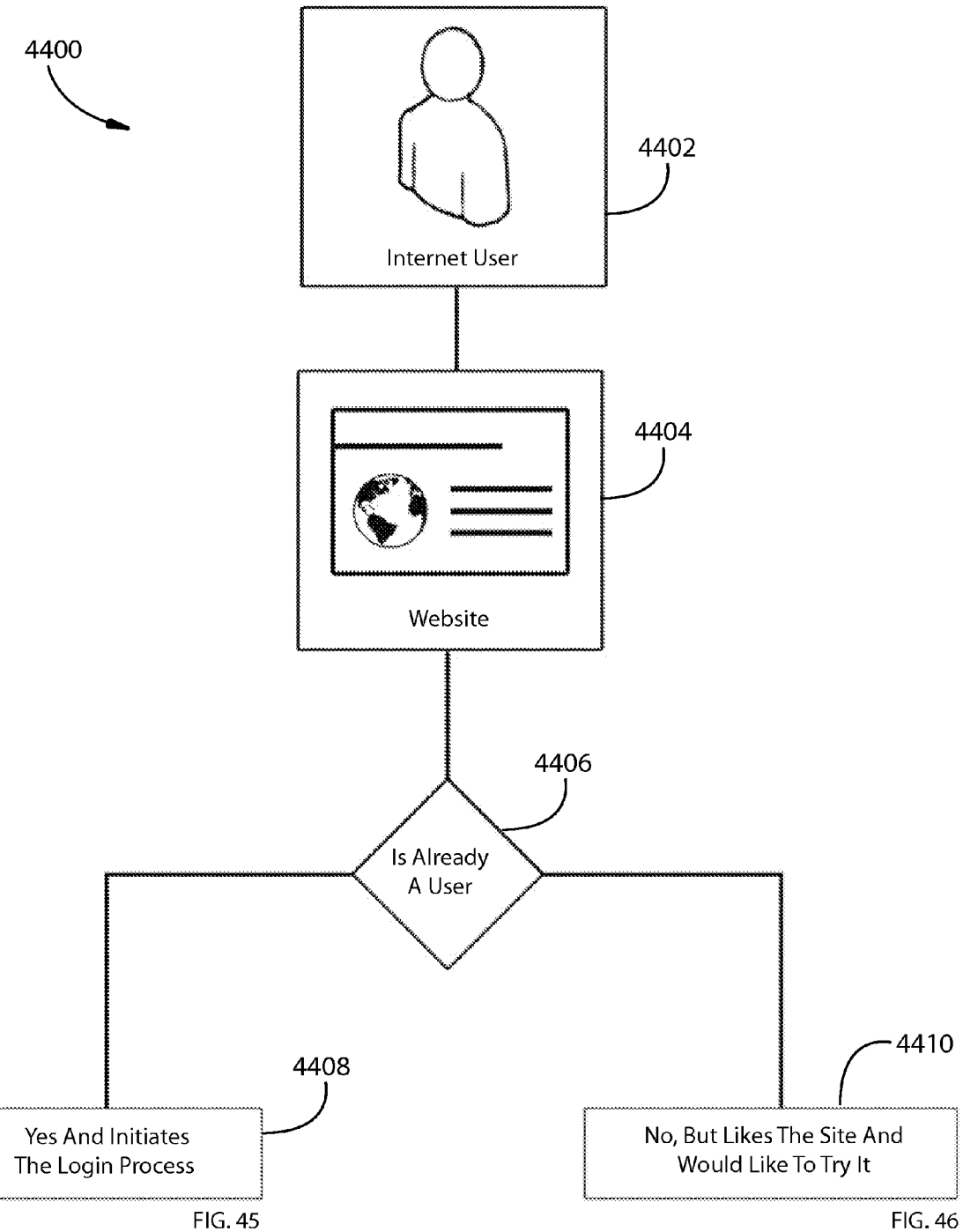
FIG. 44 is a flowchart illustrating a login webpage process, in an embodiment.
Figure 45:
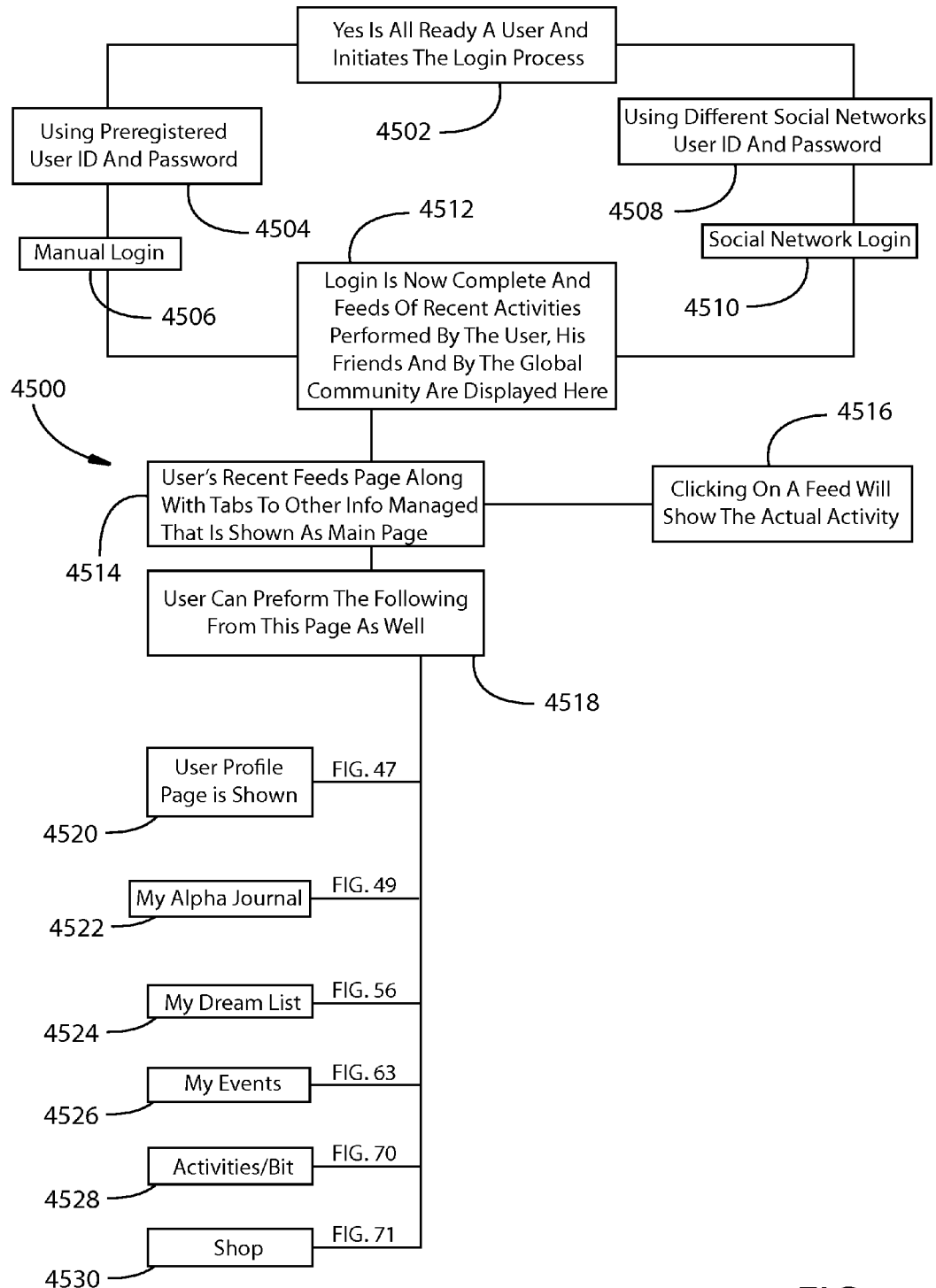

FIG. 44 is a flowchart illustrating a login webpage process 4400, in an embodiment. An Internet user 4402 navigates to the website 4404, for example using a browser on a PC, and the website determines 4406 whether the user is already a user of the website. If the user is determined to be an existing website user, the login process is initiated 4408 and is shown in FIG. 45. If not, but the user indicated that it likes the site and would like to try it 4410, the user is taken to the registration process as shown in FIG. 46.

FIG. 45 is a flowchart illustrating a website process for logging in 4500. The login process is initiated 4502 and the user chooses to login using a registered user ID and password for the site 4504, in which case the user is given the opportunity to manually login 4506, or using an ID and password from a different social networking site 4508, in which case the user is given the opportunity to login using their login credentials for the other social network 4510. When login is complete, feeds of recent activities (such as comments from other users, posted photos or videos, upcoming events, etc.) are displayed 4512. Tabs to other information are also displayed 4514. Clicking on a feed shows the activities within the feed 4516. Options are also displayed 4518 for a user to navigate to its user profile page 4520, described in FIG. 48, a My Journal page 4522, described in FIG. 50, a My Dream List page 4526, described in FIG. 57, a My Events page, described in FIG. 64, or an Alpha Shop page 4530, described in FIG. 71, or share a Bit 4528, as described in FIG. 70.

Figure 46:
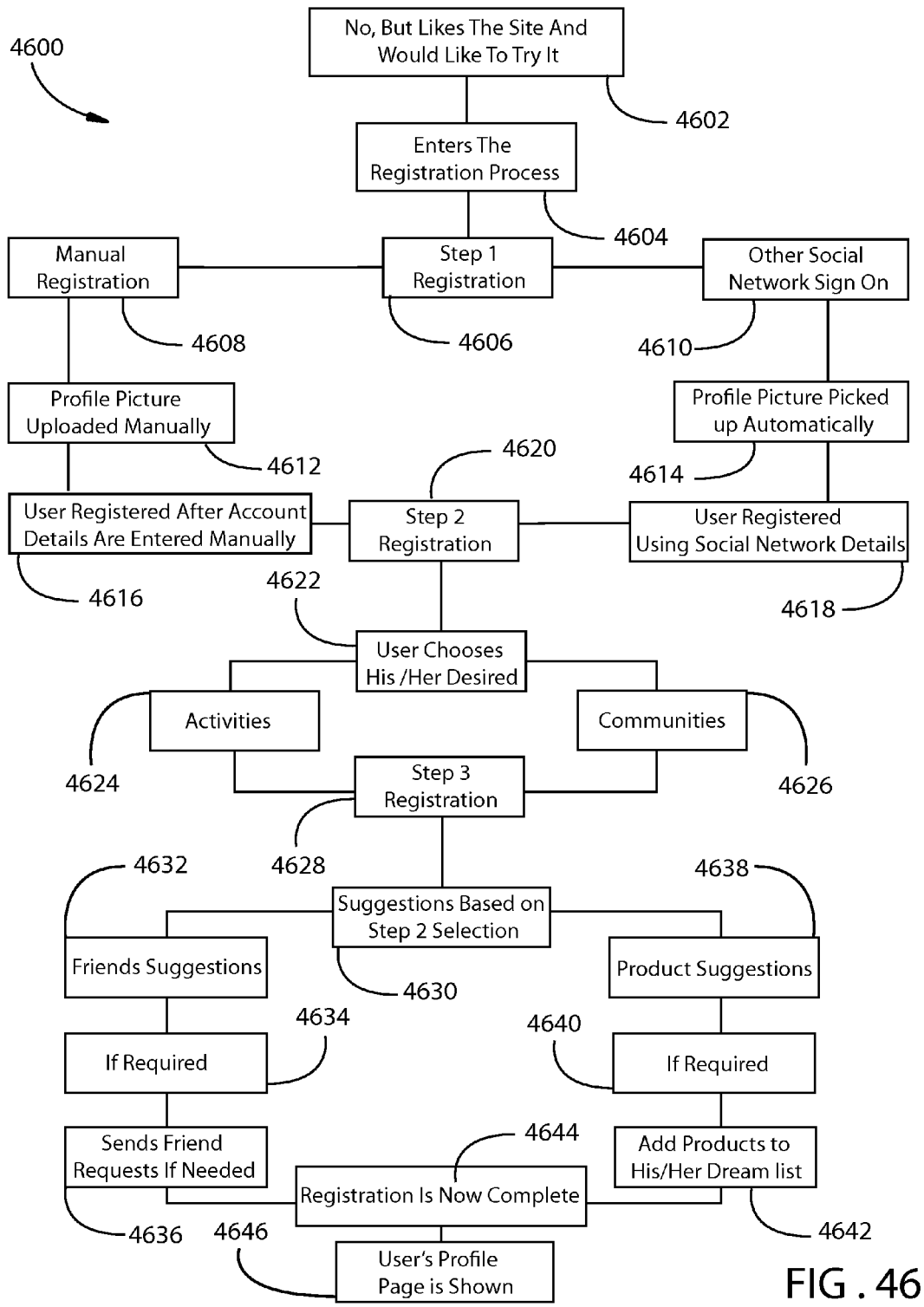
FIG. 46 is a flowchart illustrating a website registration process, in an embodiment.

FIG. 46 is a flowchart illustrating a website registration process 4600, in an embodiment. After the user is determined not to be a site member, but to be interested in using the site 4602, the registration process 4604 begins, displaying step 1 page elements 4606. The user chooses manual registration 4608 and manually enters a profile picture 4612 and account details 4616, or chooses another social network sign-in 4610, entering login details for another social network, from which a profile picture is automatically taken 4614 as well as account details 4618. Step 2 page elements are then displayed 4620 and a user makes selections 4622 of desired activities 4624 and communities 4626. Step 3 page elements are then displayed 4628, including suggestions 4630 based on the user's selection in Step 2. Suggestions for other website users the user might wish to friend are displayed 4632 and, if any are selected 4634, friend requests are sent 4636. Suggestions for products the user might want to buy are displayed 4638 and, if any are selected the products are added 4262 to the user's wish list. An indication of completed registration is then displayed 4644 and the user's profile page is shown 4646 as described in FIG. 47.

Figure 47:
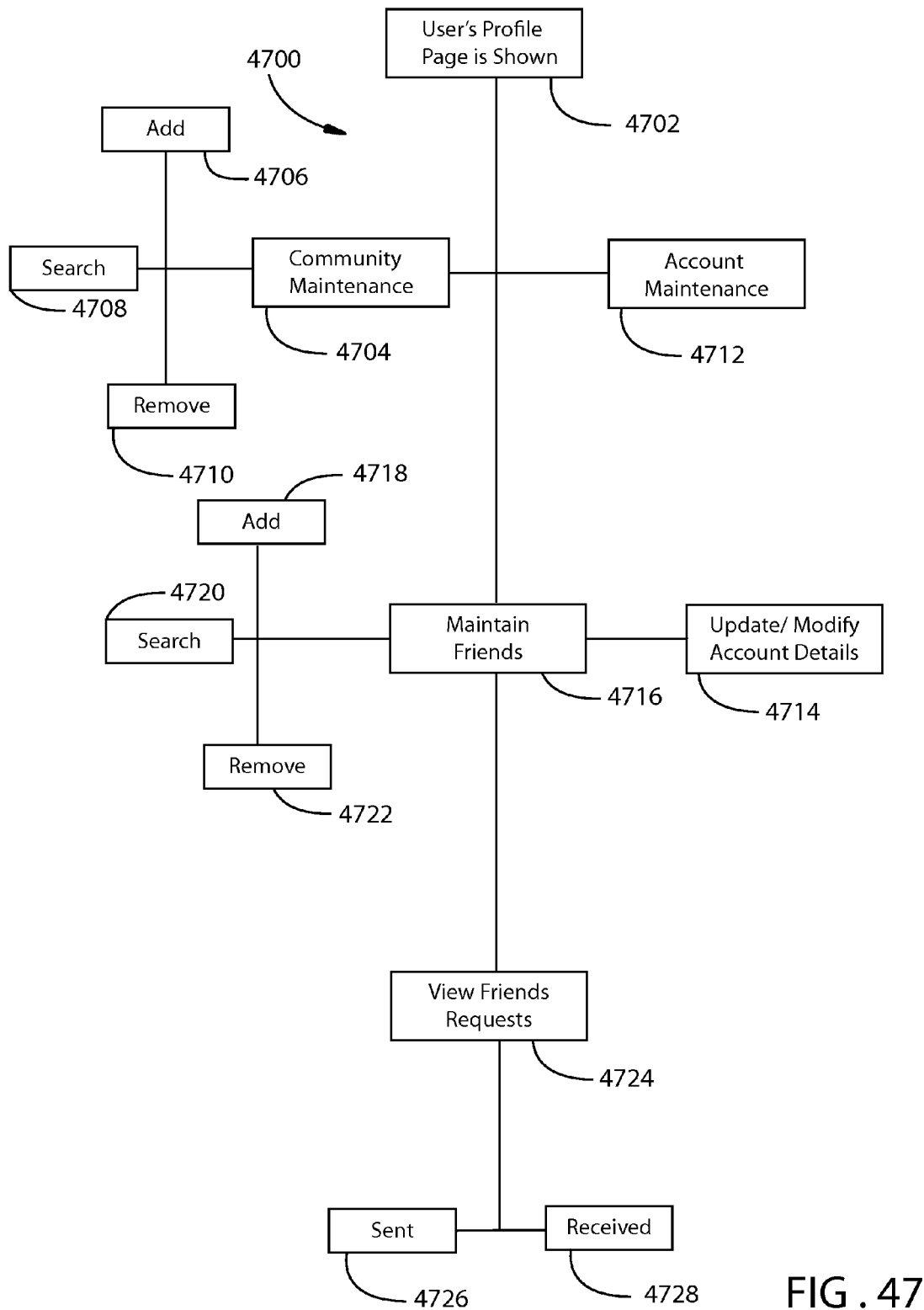
FIG. 47 is a flowchart illustrating a website user profile page process, in an embodiment.

FIG. 47 is a flowchart illustrating a website user profile page process 4700, in an embodiment. The user's profile page is shown 4702 and options for community maintenance an account maintenance displayed 4704, 4712, respectively. If community maintenance is selected, the user is given the option to add 4706 or remove 4710 communities to the user's list of favorites, or search 4708 for communities. If account maintenance is selected, options for updating/modifying account details and for maintaining friends 4714, 4716 respectively, are presented. If the user selects the maintain friends option, the user is given the option to add 4718 or remove 4722 friends, to search for friends 4720, or to view friend requests 4724. When the user elects to view friend requests, both sent requests and received requests are displayed 4726, 4728, respectively.

Figure 48:
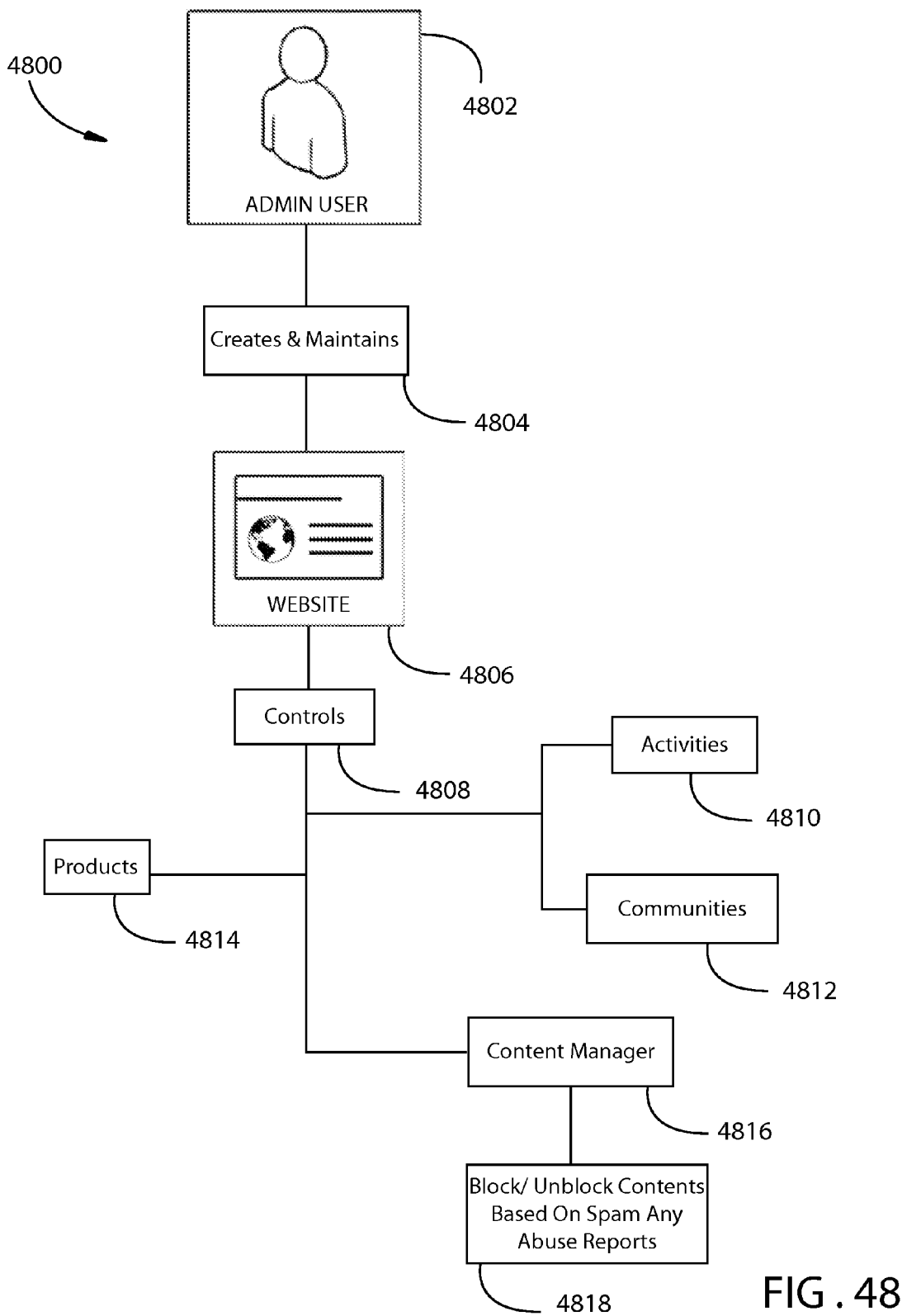
FIG. 48 is a flowchart illustrating a process for a website back-end administration, in an embodiment.

FIG. 48 is a flowchart illustrating a process for a website back-end administration 4800, in an embodiment. An administrative user 4802 creates and maintains 4804 the website 4806 and controls 4808 what products are listed for sale 4814, and what activities and communities are allowed 4810, 4812, respectively. The admin uses a content manager 4816 to block or unblock website contents based on abuse reports or spam determinations.

Figure 49:
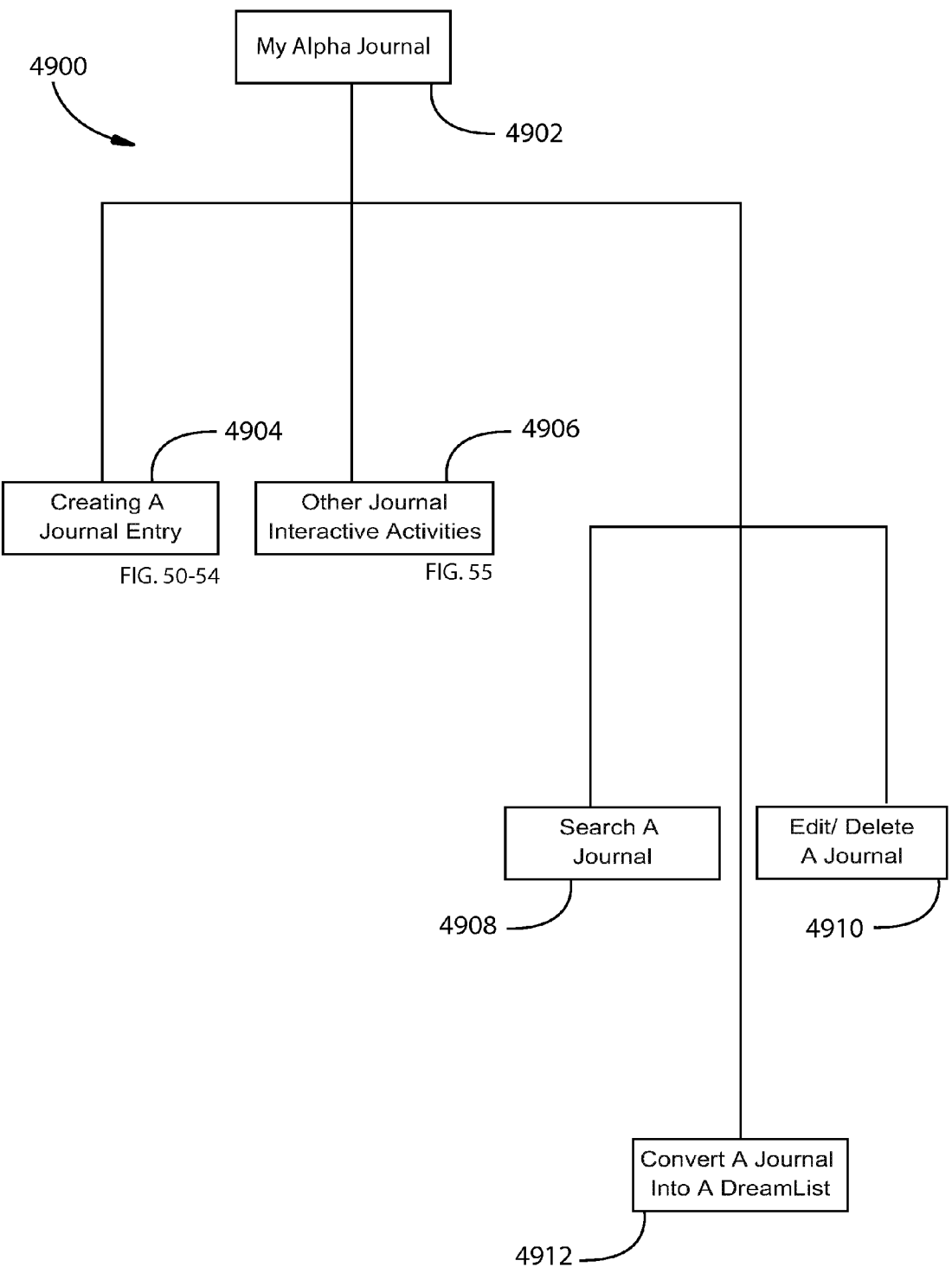
FIG. 49 is a flowchart illustrating a website My Journal process, in an embodiment.
Figure 50:
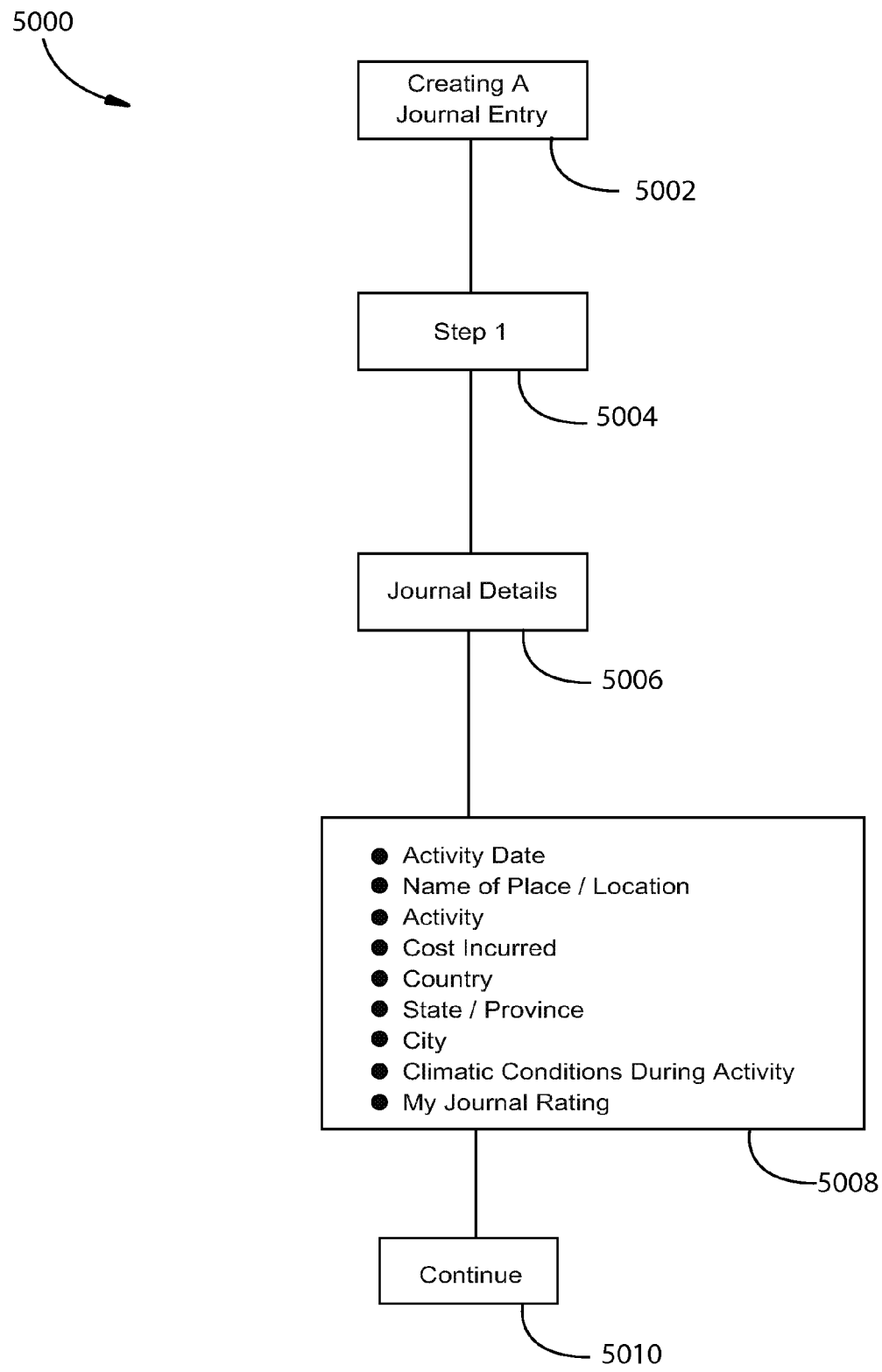
FIGS. 50-54 are flowcharts illustrating a website process for creating a journal entry, in an embodiment.

FIG. 49 is a flowchart illustrating a website My Journal process 4900, in an embodiment. The My Journal page is displayed 4902 with options for a user to create a journal entry 4904, the process of which is described in FIGS. 50-54, search for a journal 4908, convert a journal into a dream-list entry 4912, edit/delete a journal 4910, or conduct other journal interactive activities 4906 such as commenting.

FIGS. 50-54 are flowcharts illustrating a website process for creating a journal entry 5000, 5100, 5200, 5300, 5400, in an embodiment. In step 1 of creating a journal entry 5000, step 1 objects are displayed 5004, including journal details 5006, which here include displaying 5008 activity date, name of place/location, activity, cost incurred, country, state/province, city, climatic conditions during activity, and my journal rating, as well as continue button 5010 which takes the user to the next step shown in FIG. 51.

In step 2 of creating a journal entry 5100, step 2 objects are displayed 5102, including a selector for the user to select individual journal sharing level(s) 5104, which here include displaying fields for general/global journal information, friends journal information, and journal information only for the user, along with options to share with all related communities or only selected communities and all friends or only selected friends. At least one sharing level must be selected and some information entered. There is a back button 5108 which takes the user to the previous step in FIG. 50 and save & continue button 5110 which takes the user to the next step shown in FIG. 52.

Figure 51:
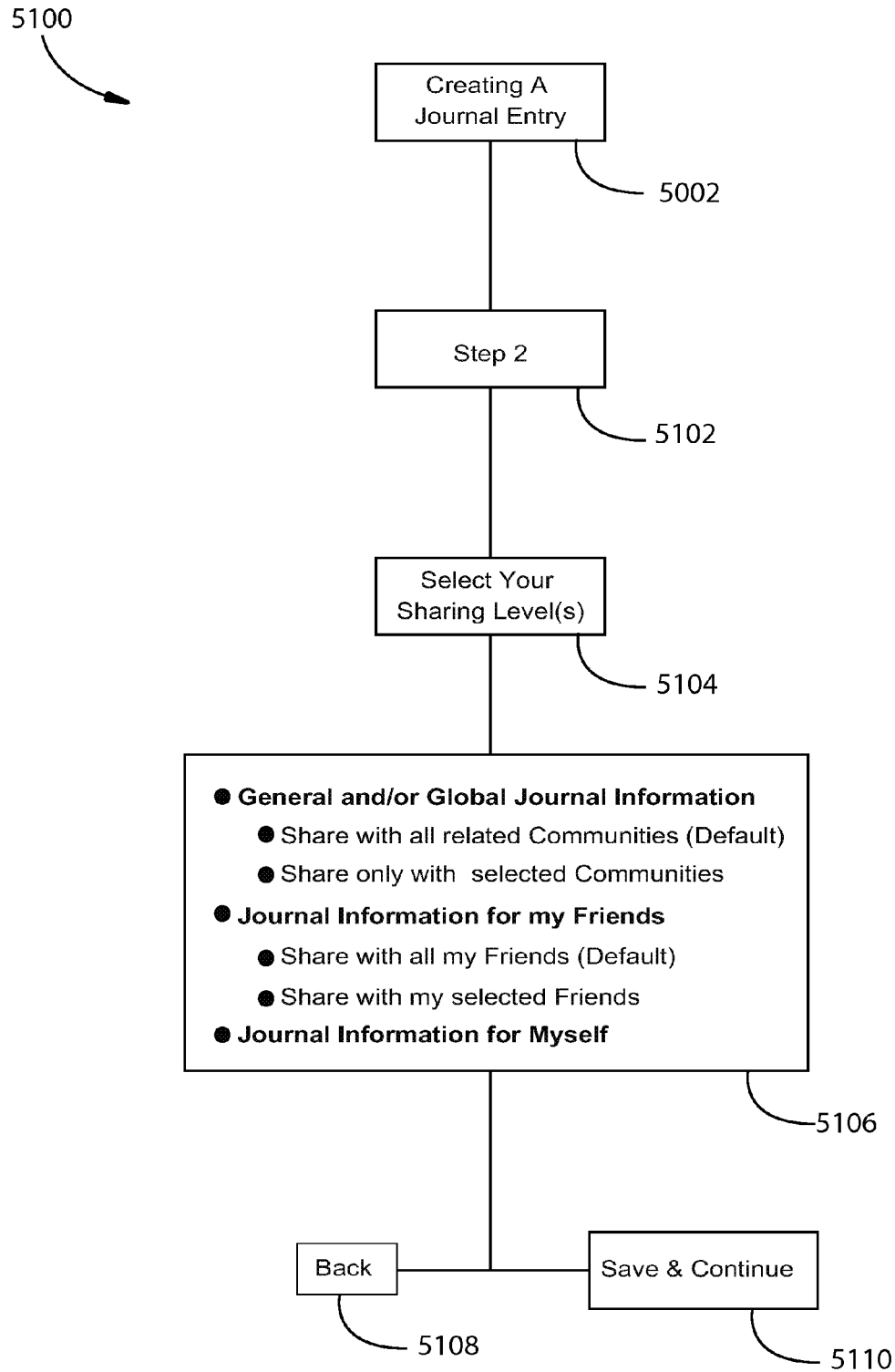
Figure 53:
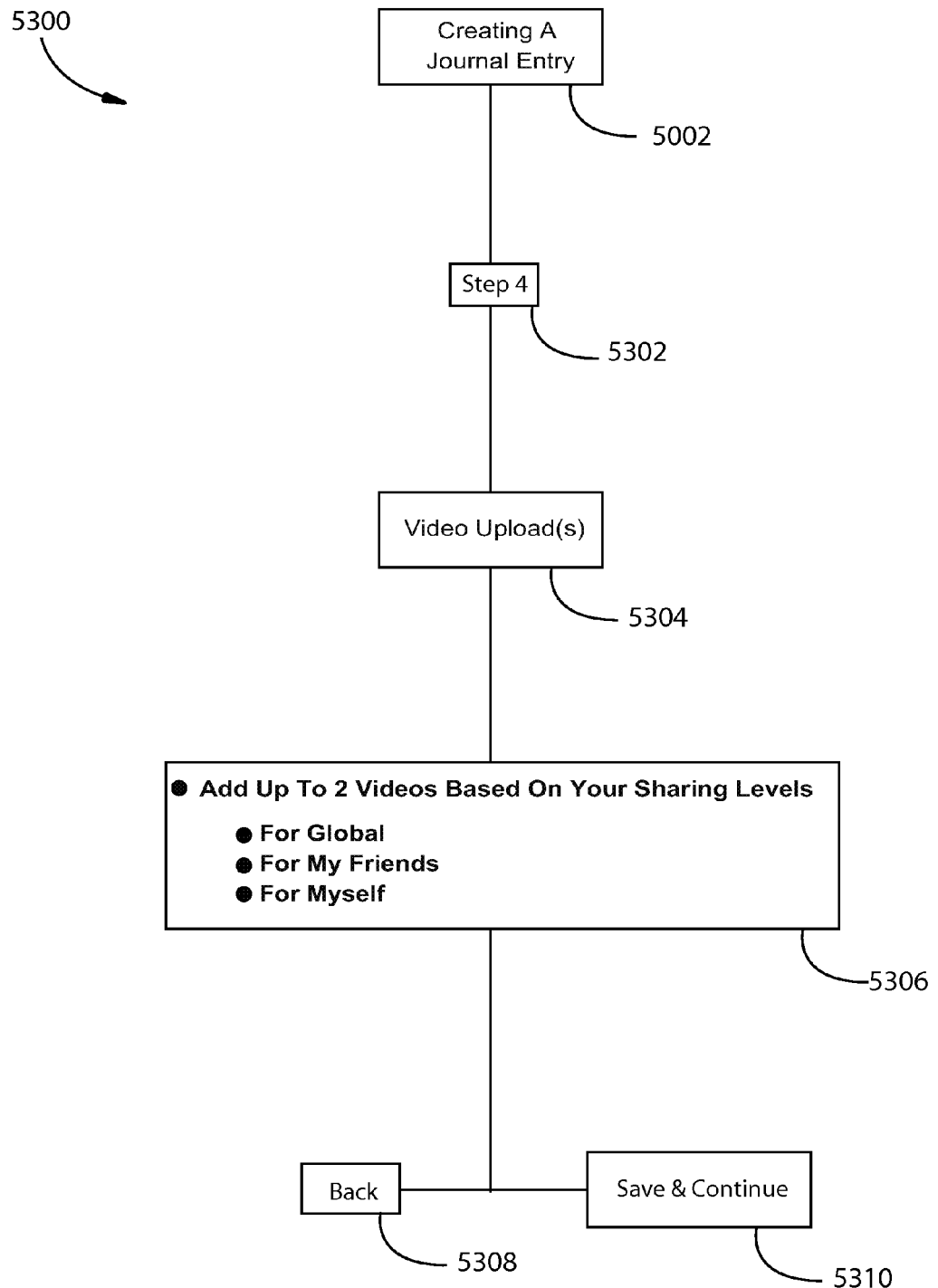

In step 3 of creating a journal entry 5200, step 3 objects are displayed 5202, including a photo upload interface 5204 for the user to select photos to share, which here includes options for uploading pictures for sharing globally, with friends, and only with the user, and instructions 5206, as well as back button 5208 which takes the user to the previous step in FIG. 51 and save & continue button 5210 which takes the user to the next step shown in FIG. 53.

Figure 52:
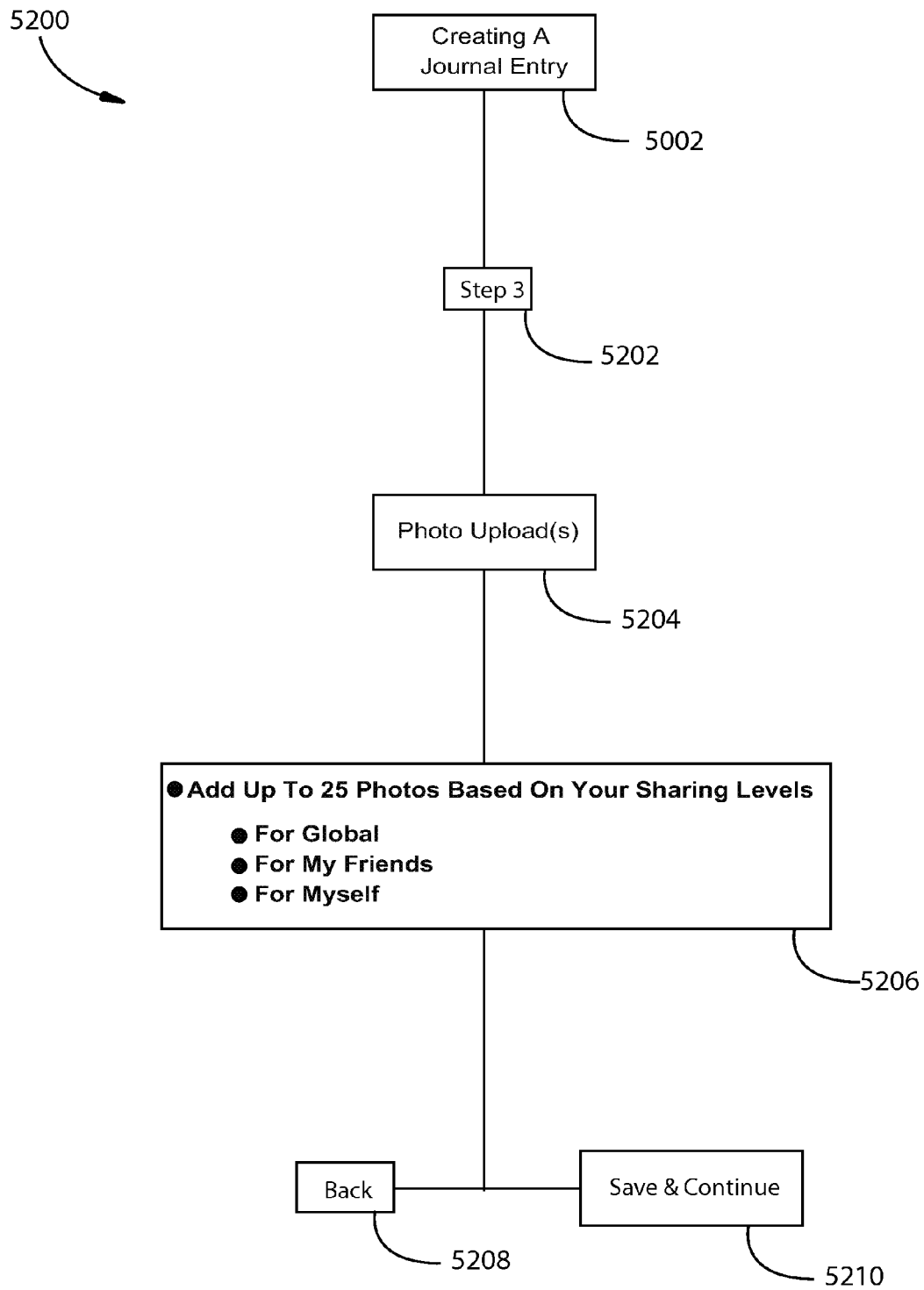
Figure 54:
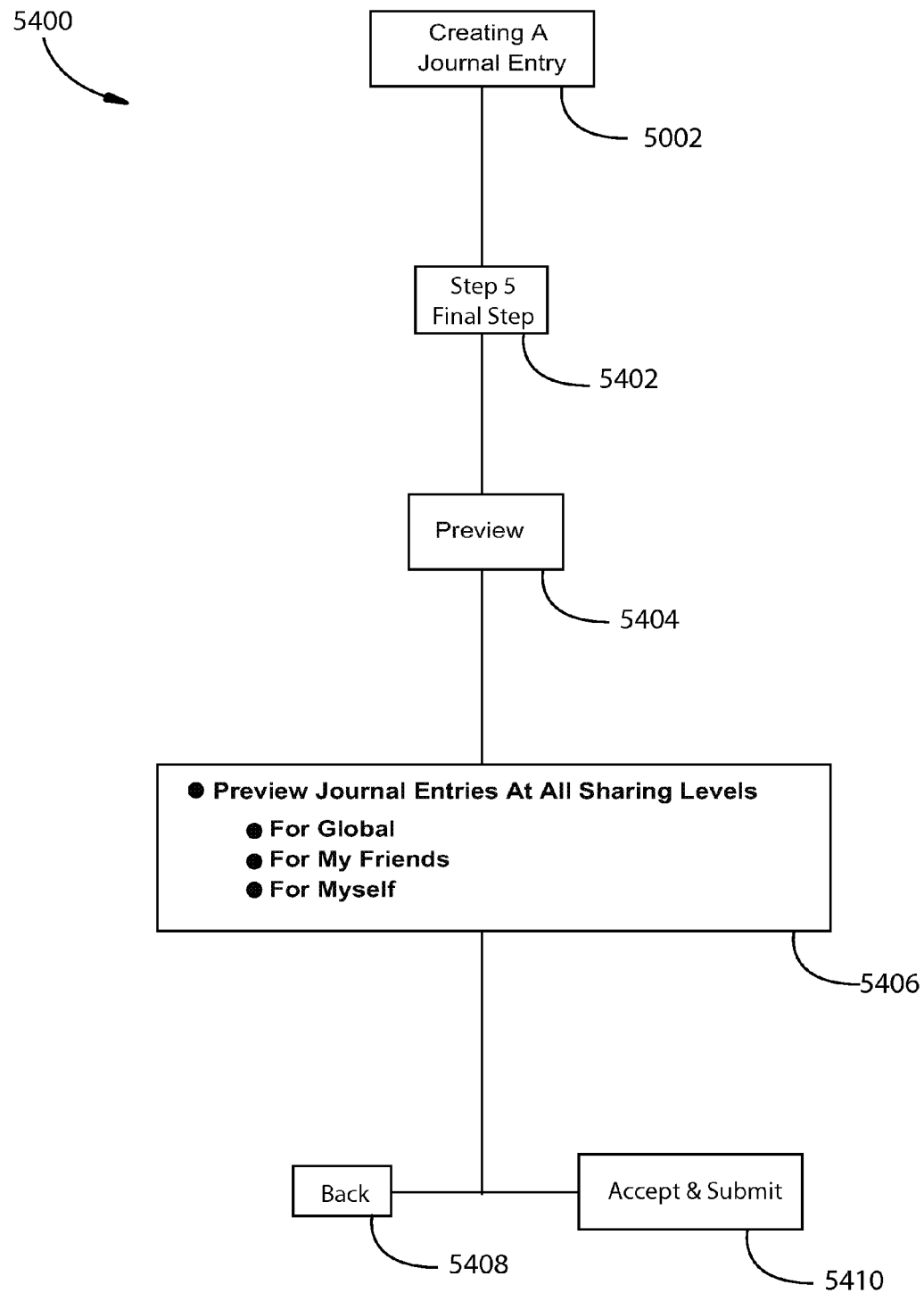

In step 4 of creating a journal entry 5300, step 4 objects are displayed 5302, including a video upload interface 5304 for the user to select videos to share, which here includes options for uploading videos for sharing globally, with friends, and only with the user, and instructions 5306, as well as back button 5308 which takes the user to the previous step in FIG. 52 and save & continue button 5310 which takes the user to the next step shown in FIG. 54.

In step 5 of creating a journal entry 5400, step 5 objects are displayed 5402, including a preview and submit interface 5404, which here includes options 5406 for previewing information shared globally, for friends, and for the user only before submission, as well as back button 5408 which takes the user to the previous step in FIG. 53 and accept & submit button 5410 which submits the input information to the website for sharing with other users (as specified by the user's privacy settings) in one easy step.

Figure 55:
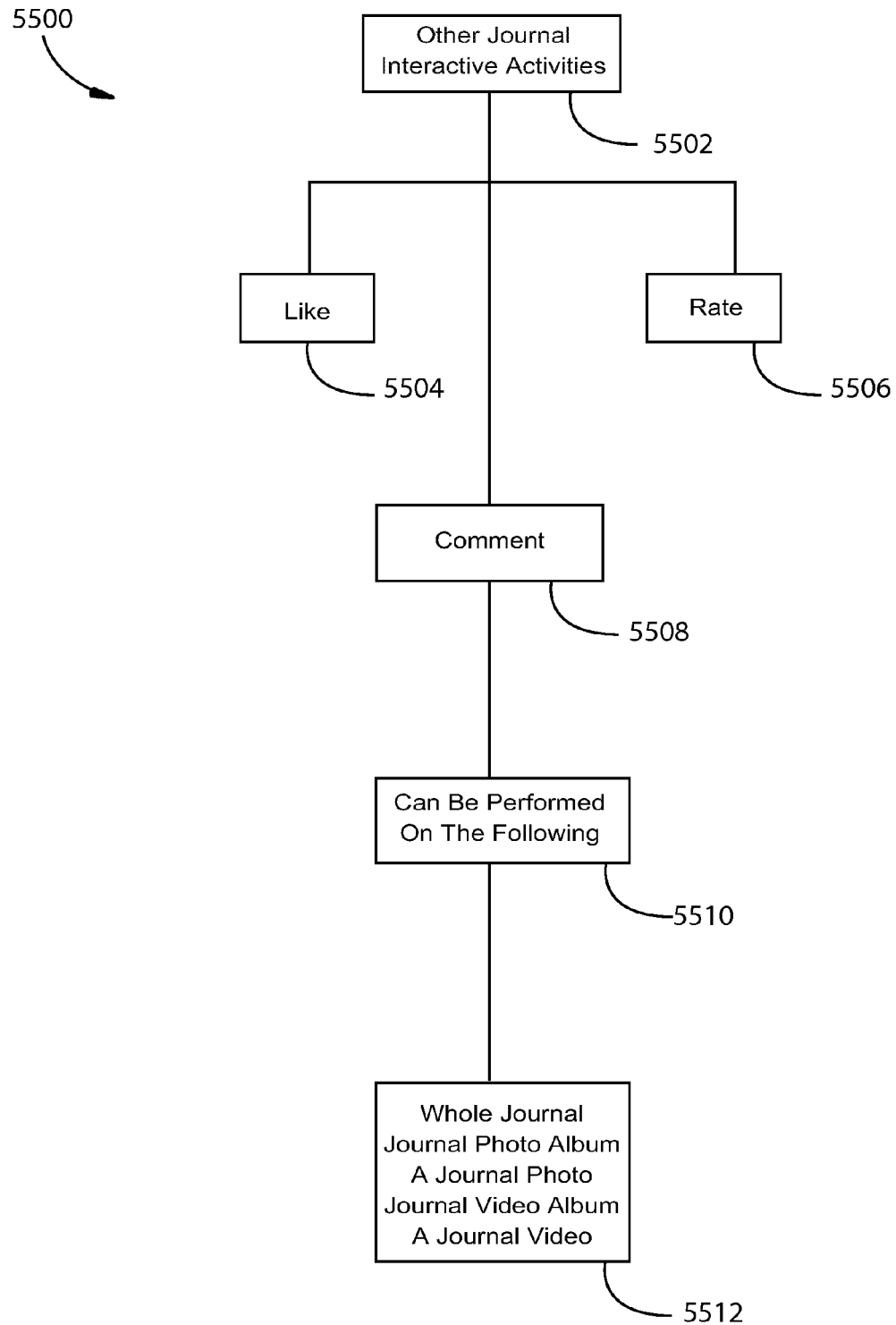
FIG. 55 is a flowchart illustrating a website process for other interactive activities 5500, in an embodiment.

FIG. 55 is a flowchart illustrating a website process for other interactive activities 5500, in an embodiment. Other journal interactive activities objects are displayed 5502, including Like object 5504 for a user to indicate that they like a journal entry or element, Rate object 5506 for a user to rate the journal entry or element, and Comment object 5508 which allows a user to comment on a journal entry or element. These objects are displayed 5510 with an entire journal, journal photo album, journal photo, journal video album, or journal video 5512.

Figure 56:
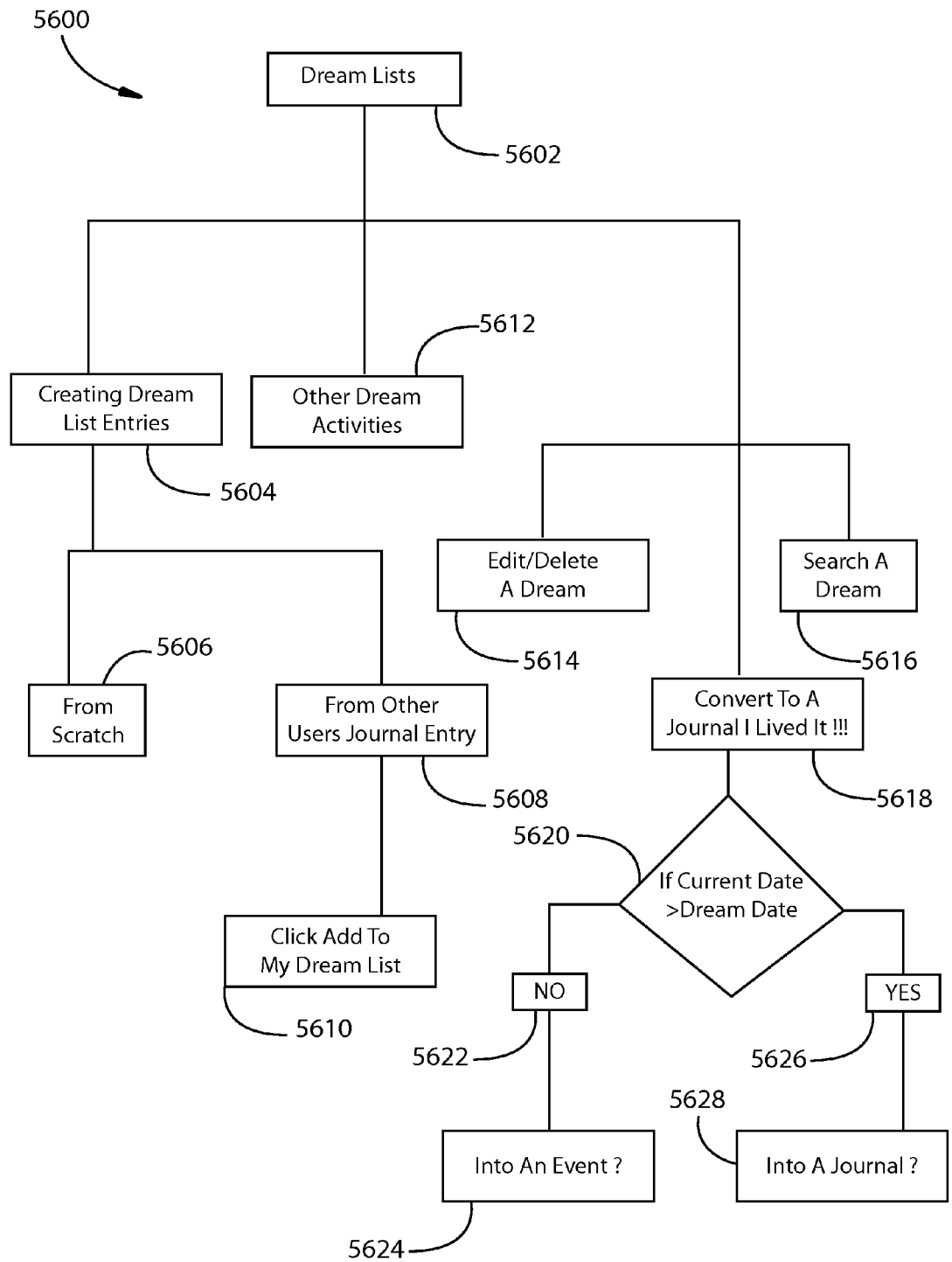
FIG. 56 is a flowchart illustrating a website dream-lists process, in an embodiment.

FIG. 56 is a flowchart illustrating a website dream lists process, in an embodiment. Dreams Lists page elements are displayed 5602, which allow a user to create dream list entries 5604, conduct other dream activities 5612 (described in FIG. 62), edit/delete a dream 5614, convert a dream list entry to a journal entry 5614, or search through dream entries 5616. If the user selects to create a dream list entry, further options are displayed to create the entry from scratch 5606 (described in FIGS. 57-61) or from another user's journal entry 5608, where an Add to My Dream List button is displayed 5610. When the user chooses to convert to a journal, the interface determines 5620 whether the current date is before or after the date input for the dream list entry, and if the current date is before the dream list entry date 5622, it is converted into an event (something that is planned for the future), otherwise 5626 into a journal entry (something that has already been completed).

FIGS. 57-61 are flowcharts illustrating a website process for creating a dream list entry 5700, 5800, 5900, 6000, 6100, in an embodiment. In step 1 of creating a dream list entry 5702, step 1 objects are displayed 5704, including dream list details 5706, which here include displaying 5708 activity date, name of place/location, activity, cost projected, country, state/province, city, ideal climatic conditions, and rating, as well as continue button 5710 which takes the user to the next step shown in FIG. 58.

Figure 57:
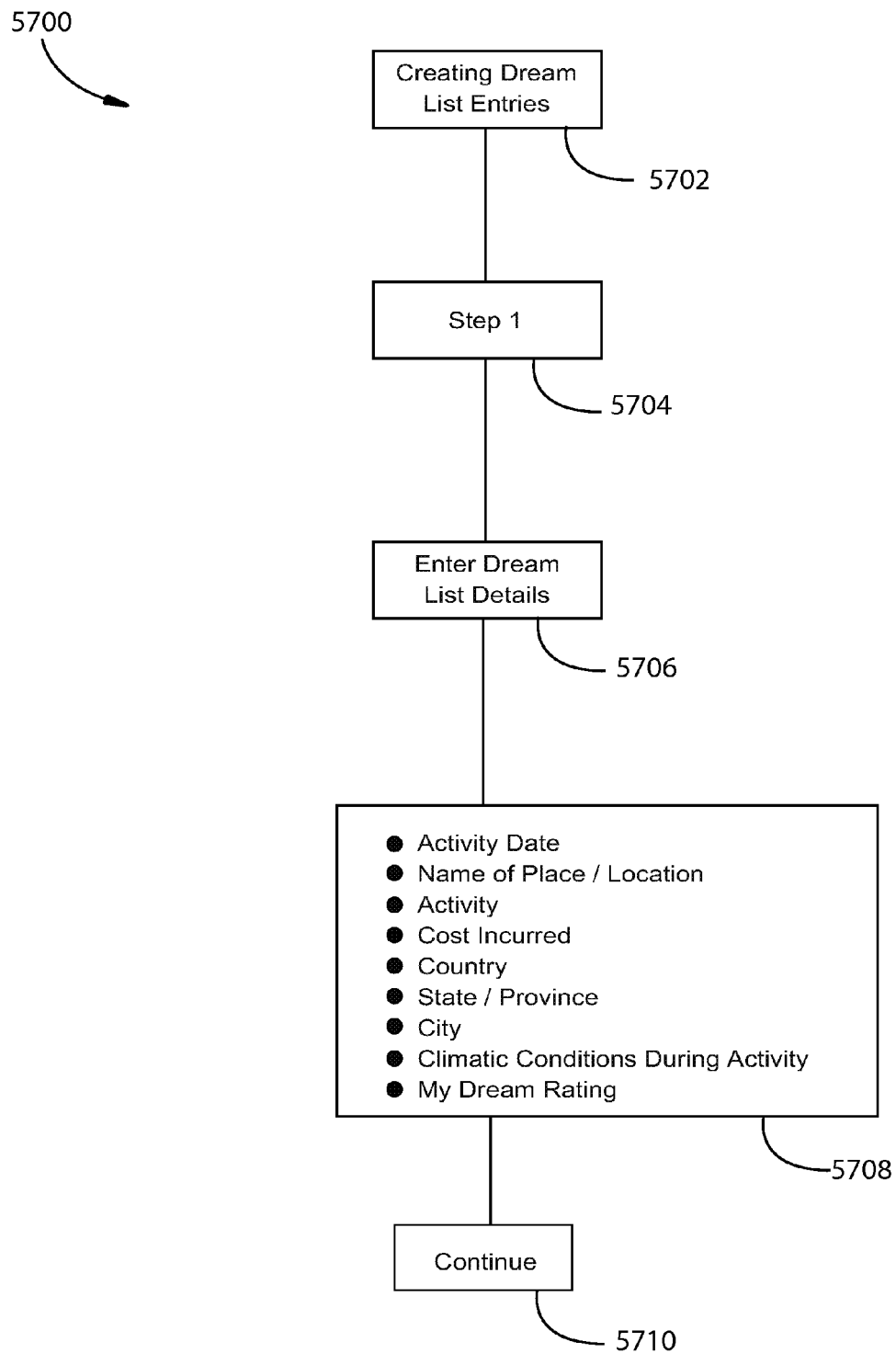
FIGS. 57-61 are flowcharts illustrating a website process for creating a dream-list entry, in an embodiment.
Figure 59:
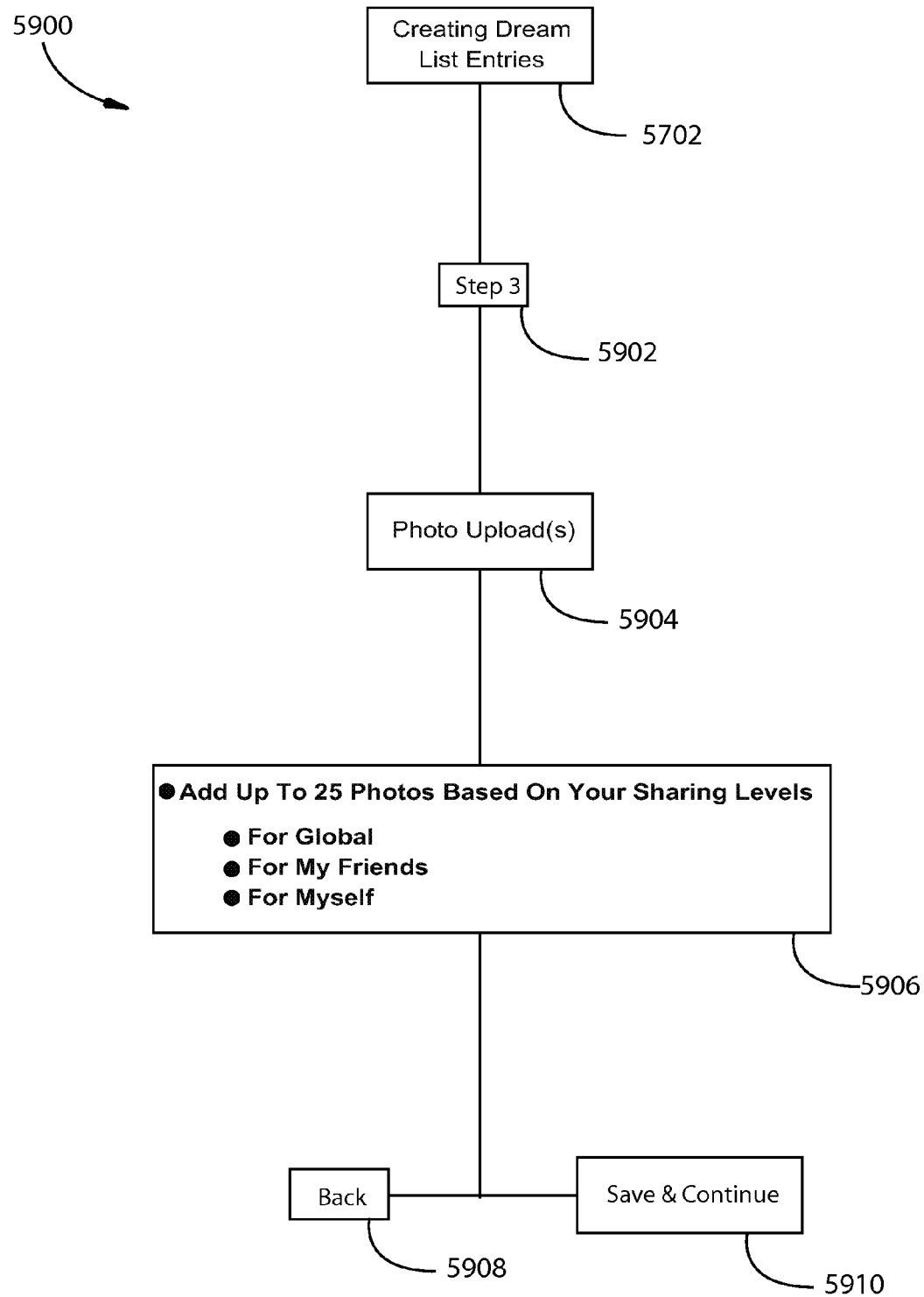

In step 2 of creating a dream list entry 5800, step 2 objects are displayed 5802, including a selector for the user to select sharing level(s) 5804, which here include displaying fields for general/global dream list information, friends dream list information, and dream list information only for the user, along with options to share with all related communities or only selected communities and all friends or only selected friends, as well as back button 5808 which takes the user to the previous step in FIG. 57 and save & continue button 5810 which takes the user to the next step shown in FIG. 59.

Figure 58:
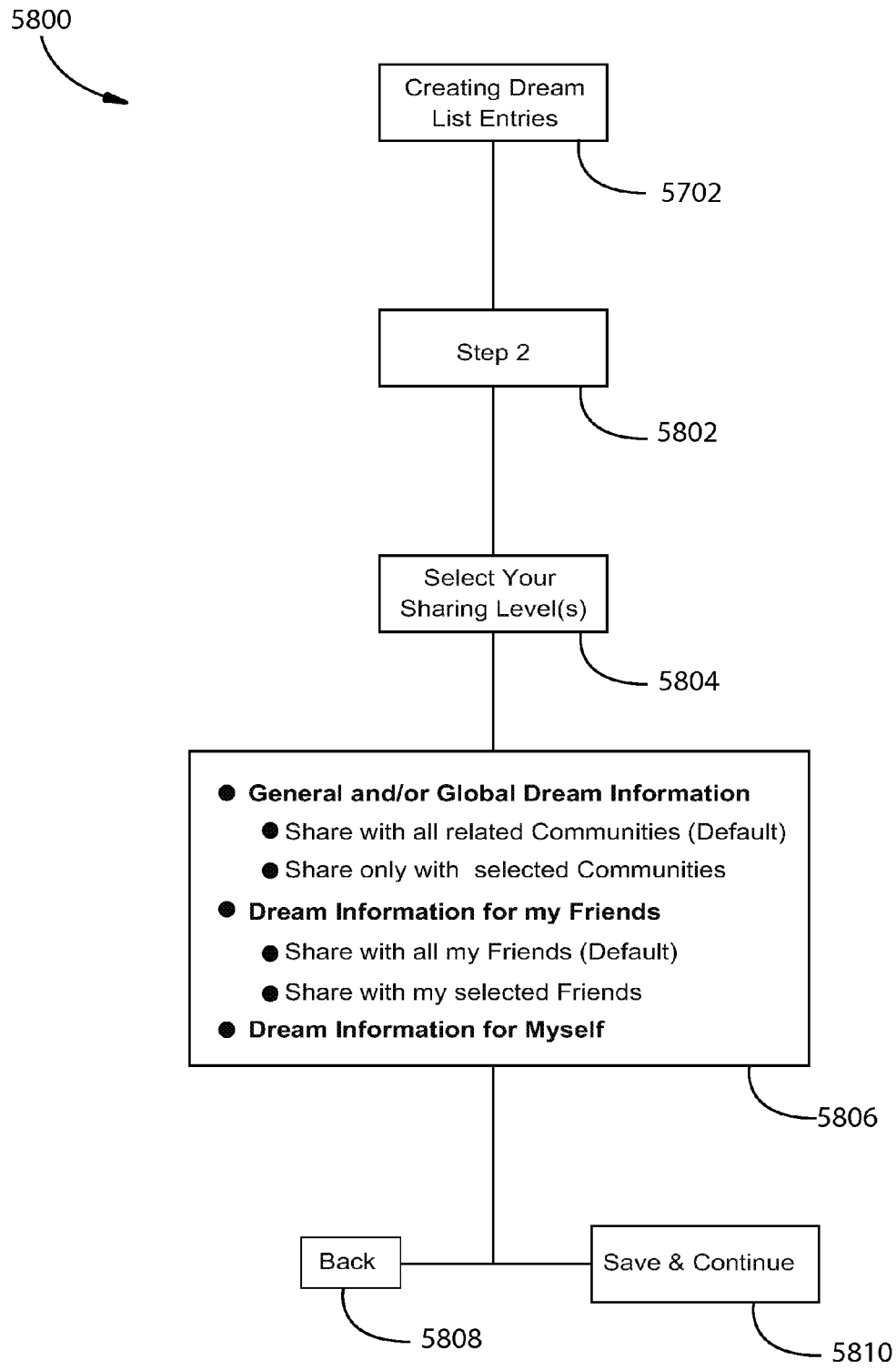
Figure 60:
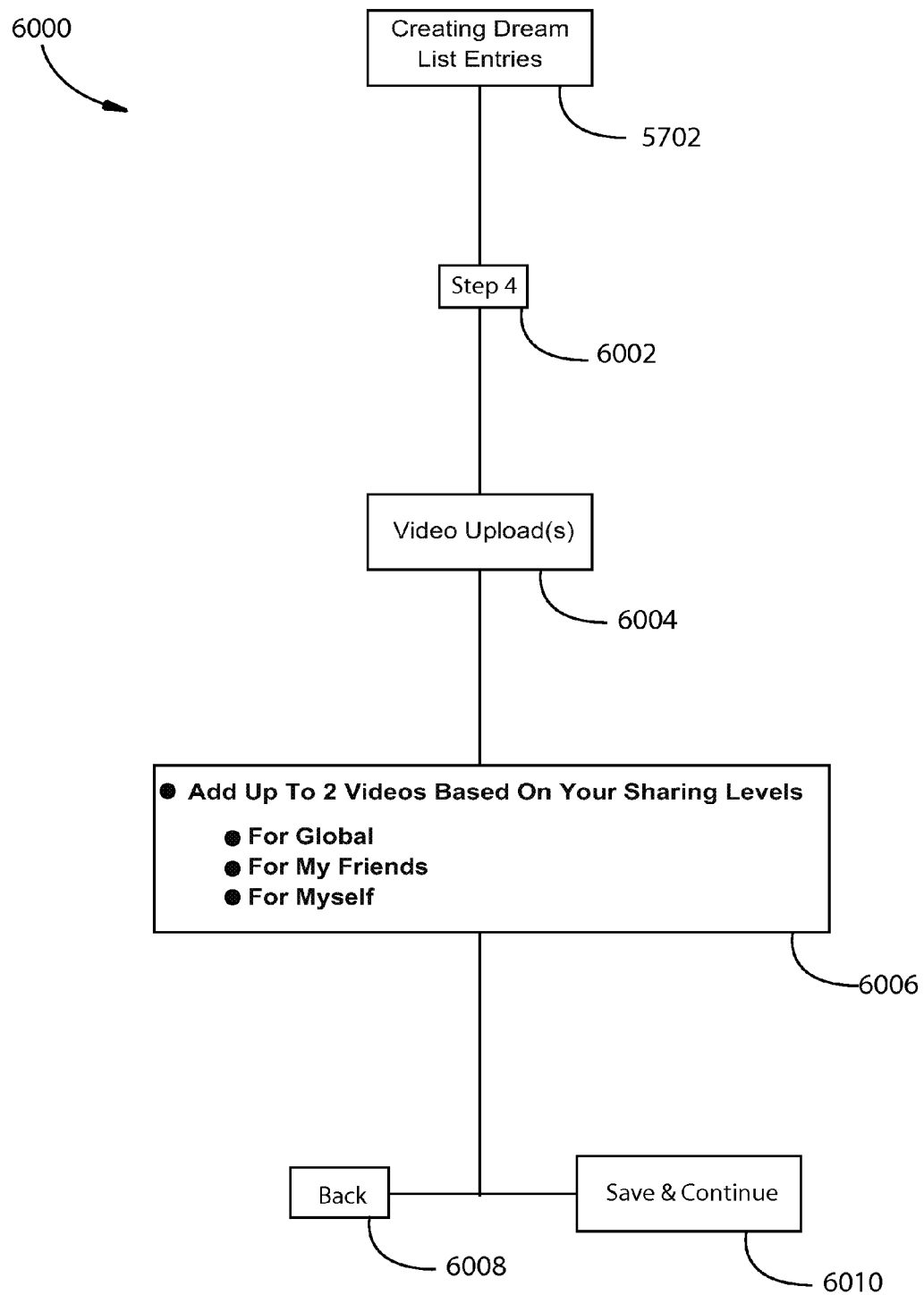

In step 3 of creating a dream list entry 5900, step 3 objects are displayed 5902, including a photo upload interface 5904 for the user to select photos to share, which here includes options for uploading pictures for sharing globally, with friends, and only with the user, and instructions 5906, as well as back button 5908 which takes the user to the previous step in FIG. 58 and save & continue button 5910 which takes the user to the next step shown in FIG. 60.

Figure 61:
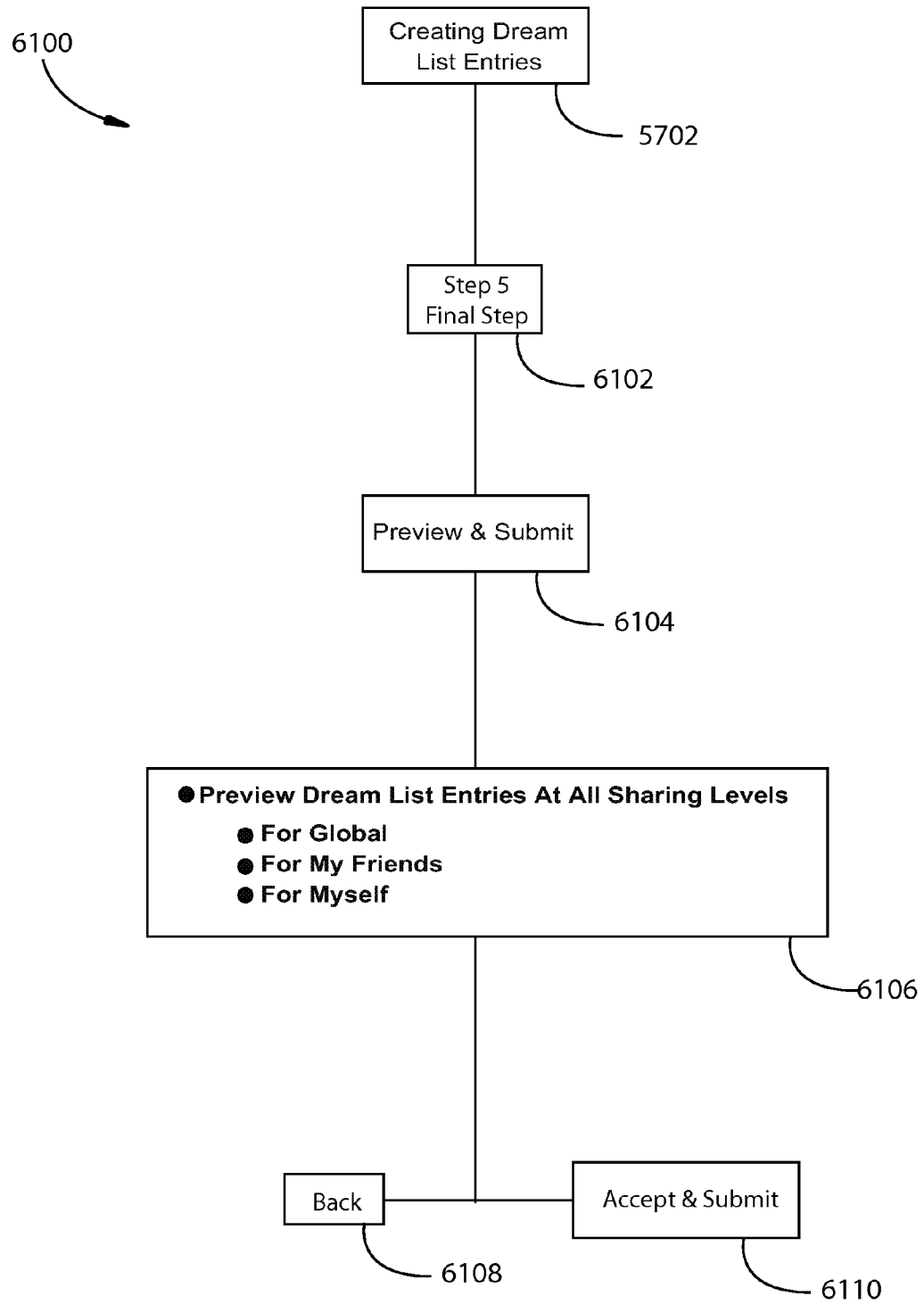

In step 4 of creating a dream list entry 6000, step 4 objects are displayed 6002, including a video upload interface 6004 for the user to select videos to share, which here includes options for uploading videos for sharing globally, with friends, and only with the user, and instructions 6006, as well as back button 6008 which takes the user to the previous step in FIG. 59 and save & continue button 6010 which takes the user to the next step shown in FIG. 61.

In step 5, the final step of creating a dream list entry 6100, step 5 objects are displayed 6102, including a preview and submit interface 6104, which here includes options 6106 for previewing information shared globally, for friends, and for the user only before submission, as well as back button 6108 which takes the user to the previous step in FIG. 60 and accept & submit button 6110 which submits the input information to the website for sharing with other users (as specified by the user's privacy settings) in one easy step.

Figure 62:
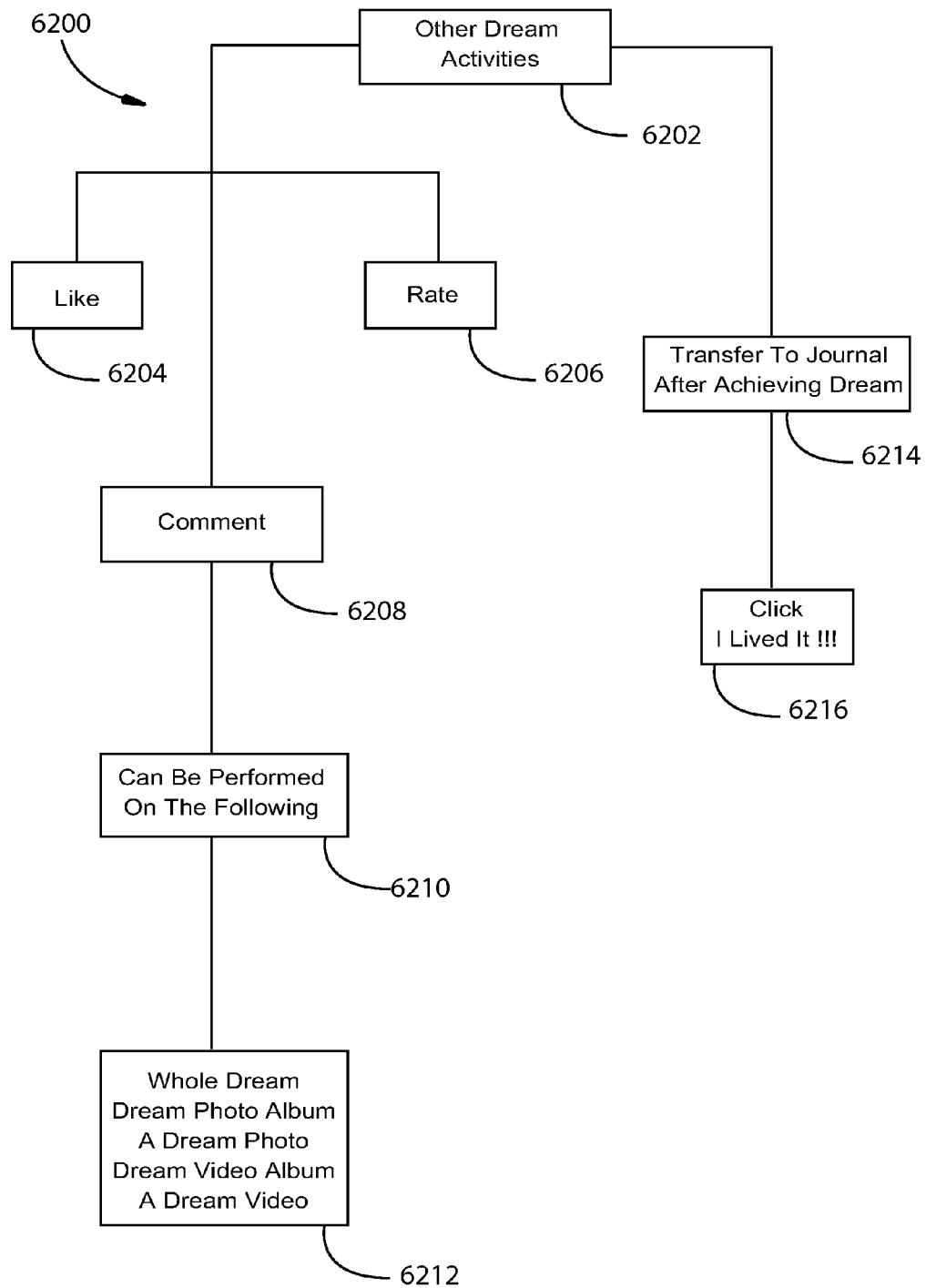
FIG. 62 is a flowchart illustrating a website process for other interactive activities, in an embodiment.

FIG. 62 is a flowchart illustrating a website process for other interactive activities 6200, in an embodiment. Other dream list activities objects are displayed 6202, including Like object 6204 for a user to indicate that they like a dream list entry or element, Rate object 6206 for a user to rate the dream list entry or element, Comment object 6208 which allows a user to comment on a dream list entry or element, and Transfer to Journal object 6214. Objects 6204, 6206, 6208 are displayed 6210 with an entire dream entry, dream photo album, dream photo, dream video album, or dream video 6212. Transfer to Journal object 6214 can be activated by clicking an I Lived It button 6216 on a dream list entry.

Figure 63:
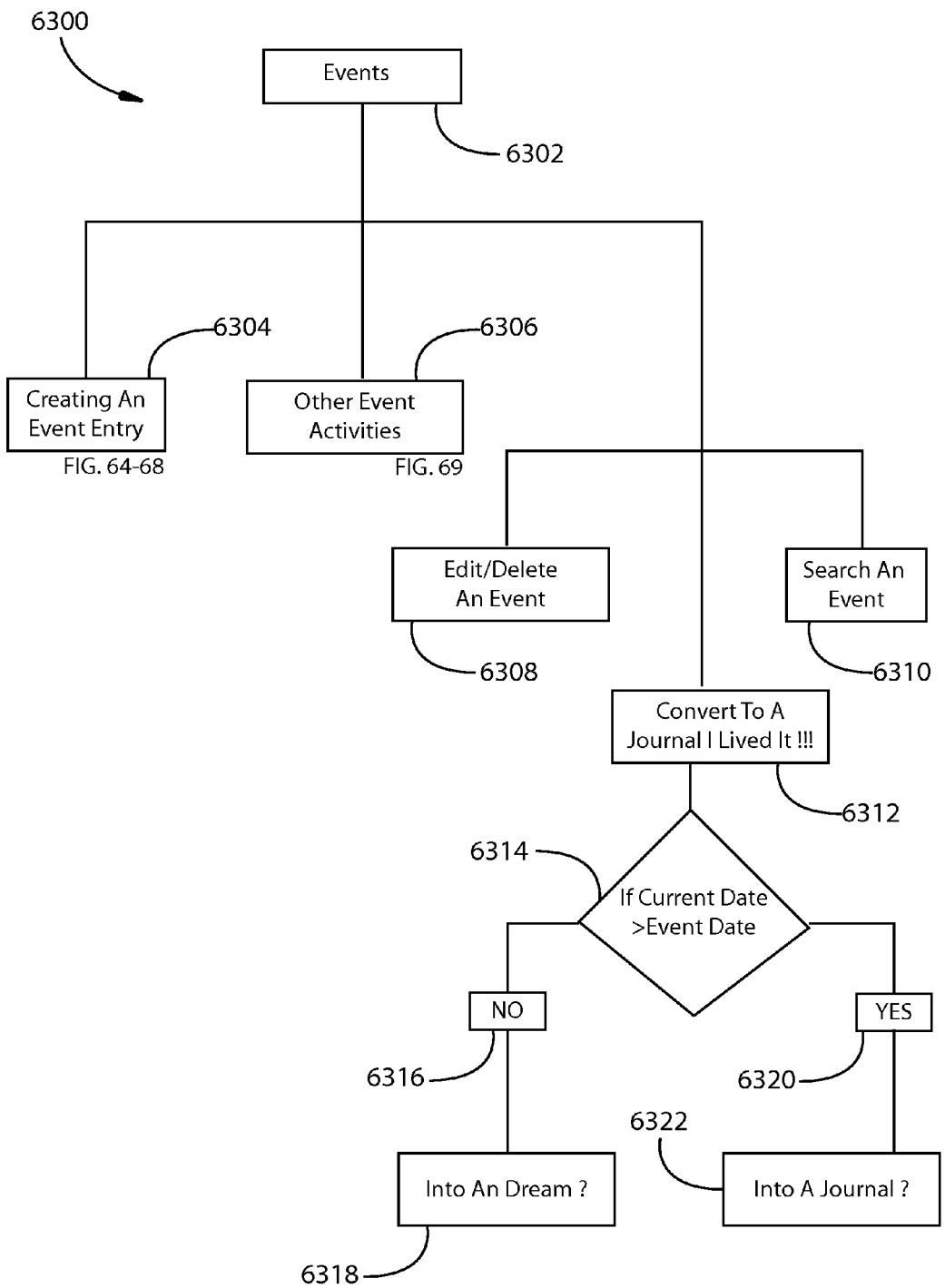
FIG. 63 is a flowchart illustrating a website events page process, in an embodiment.

FIG. 63 is a flowchart illustrating a website events page process 6300, in an embodiment. Events page elements are displayed 6302, including options for creating an event entry 6304 (described in FIGS. 64-69), for conducting other event activities 6306 (described in FIG. 70), for editing/deleting an event 6308, for searching through events 6310, and for converting an event into a journal entry 6312. When the user selects to convert an event into a journal entry, the interface determines 6314 whether the current date is before or after the date input for the event, and if the current date is before the event date 6316, it is converted into a dream list entry (something the user wants to do in the future), otherwise 6320 into a journal entry 6322 (something that has already been completed).

FIGS. 64-68 are flowcharts illustrating a website process for creating an event entry 6400, 6500, 6600, 6700, 6800, in an embodiment. In step 1 of creating an event entry 6402, step 1 objects are displayed 6404, including event details 6406, which here include displaying 6408 activity date, name of place/location, activity, cost incurred, country, state/province, city, climatic conditions during activity, and rating, as well as continue button 6410 which takes the user to the next step shown in FIG. 65.

Figure 64:
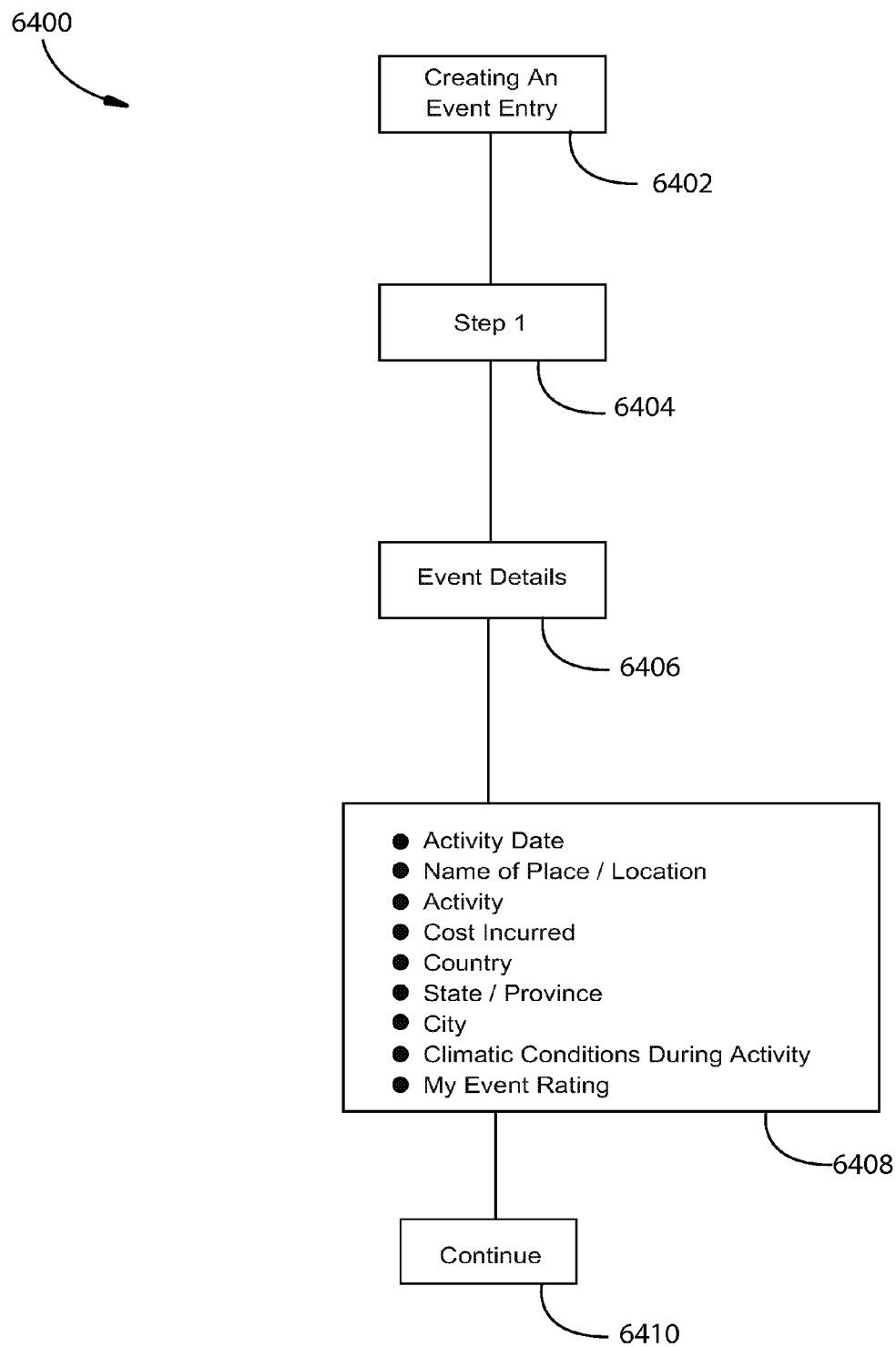
FIGS. 64-68 are flowcharts illustrating a website process for creating a dream list entry, in an embodiment.
Figure 66:
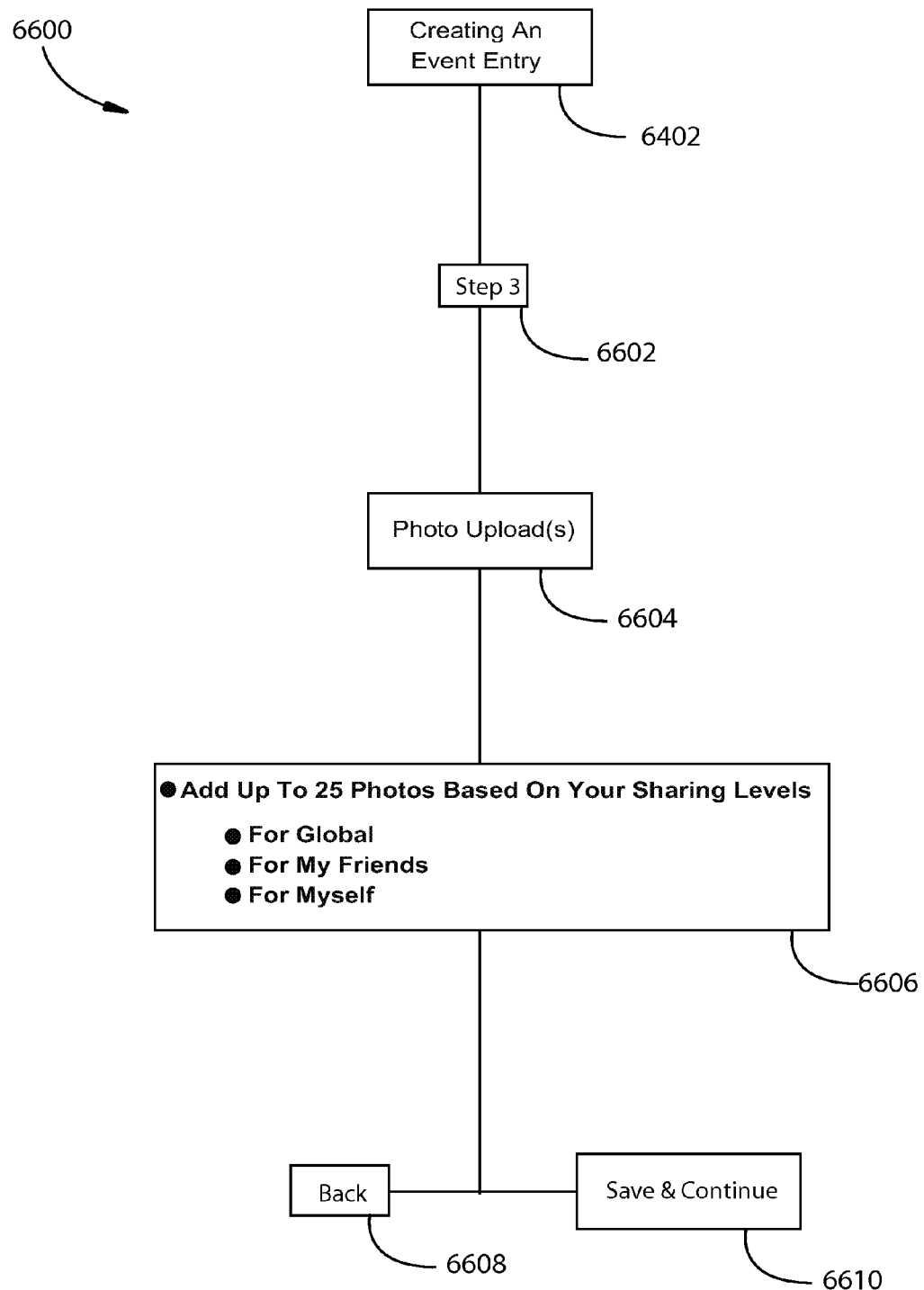

In step 2 of creating a event entry 6500, step 2 objects are displayed 6502, including a privacy selector 6504 which displays fields 6506 for general/global event information, friends event information, and event information only for the user, along with options to share with all related communities or only selected communities and all friends or only selected friends, as well as back button 6508 which takes the user to the previous step in FIG. 64 and save & continue button 6510 which takes the user to the next step shown in FIG. 66.

Figure 65:
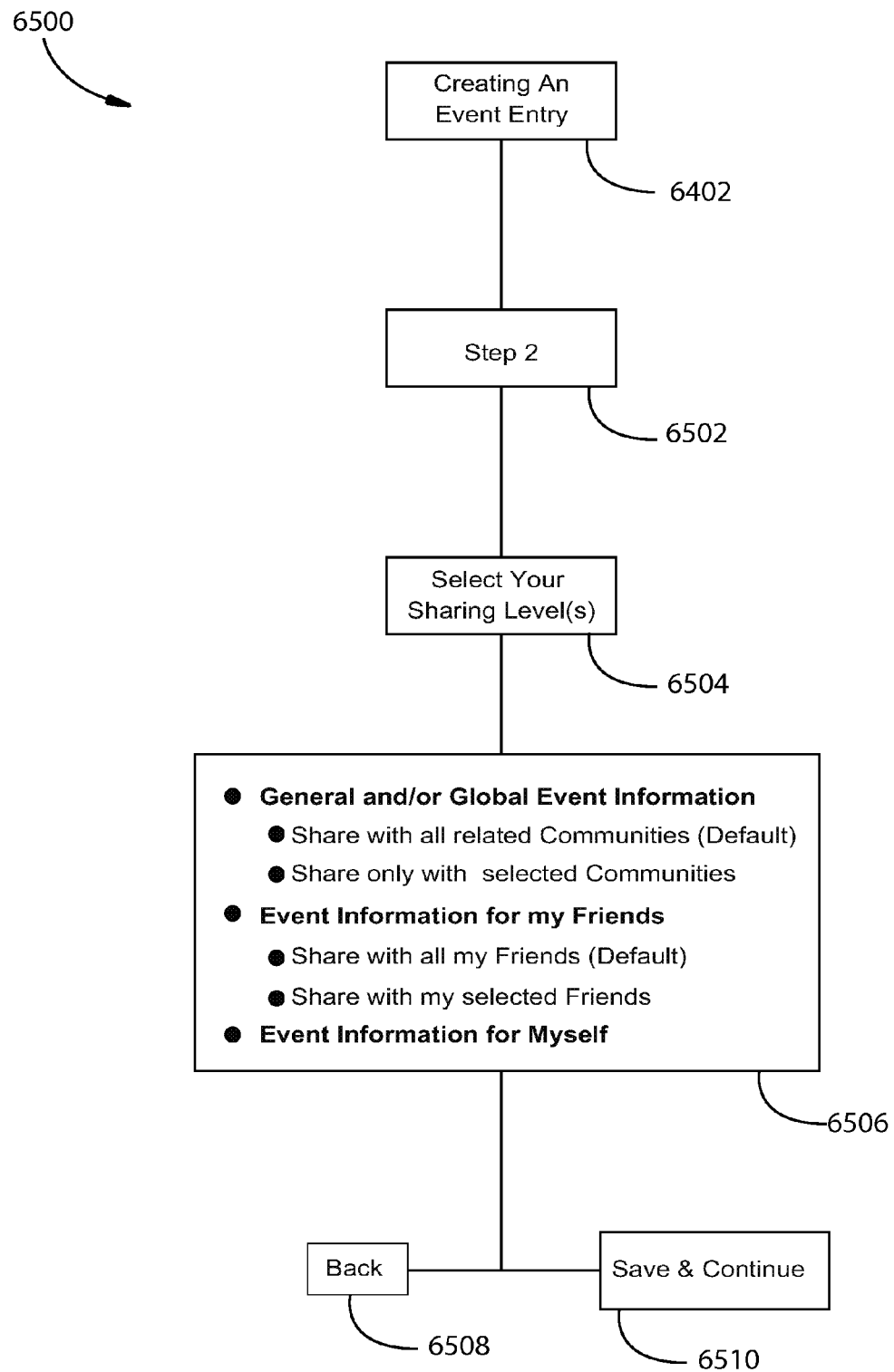
Figure 67:
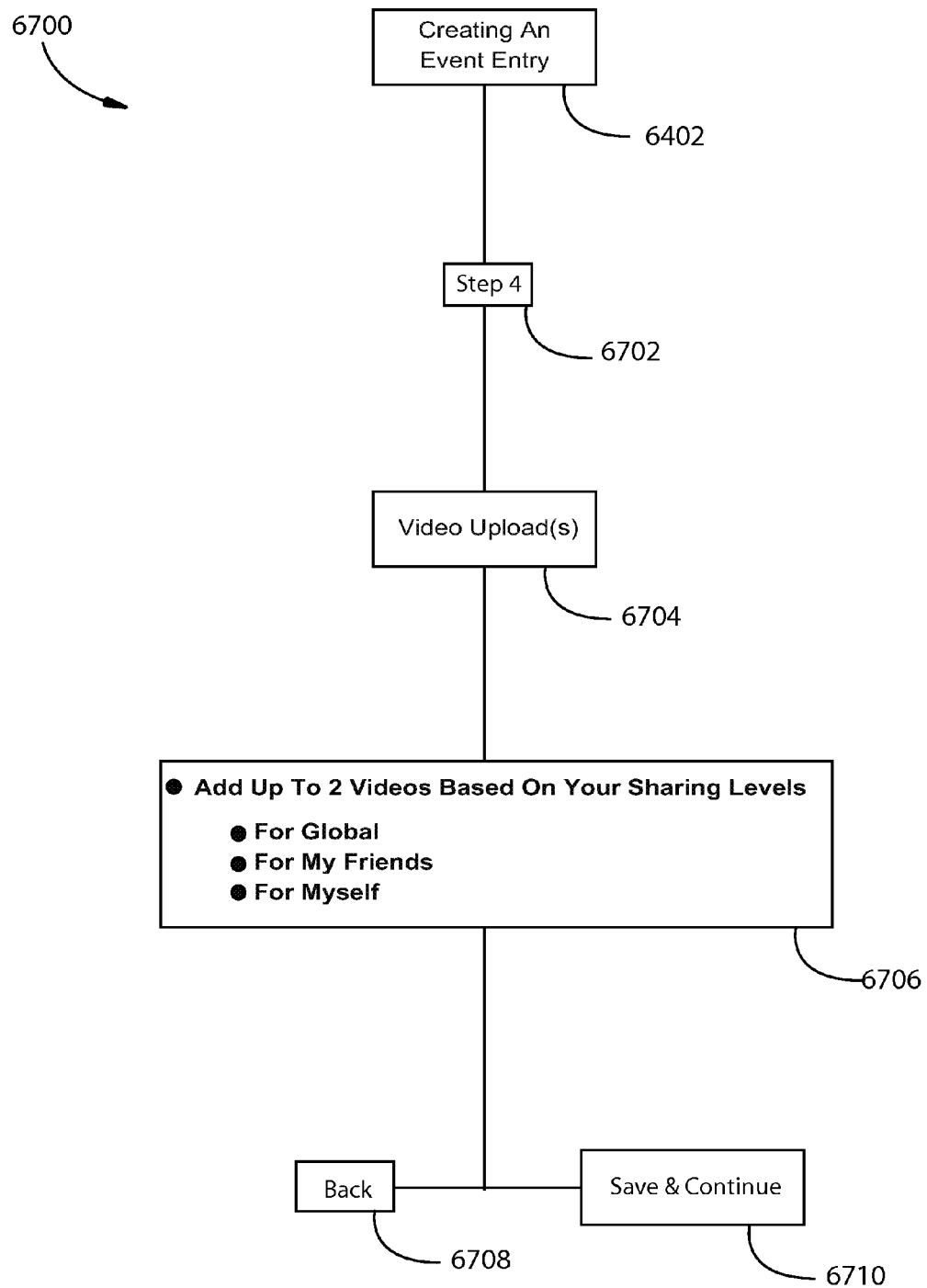

In step 3 of creating a event entry 6600, step 3 objects are displayed 6602, including a photo upload interface 6604 for the user to select photos to share 6606, which here includes options for uploading pictures for sharing globally, with friends, and only with the user, and instructions, as well as back button 6608 which takes the user to the previous step in FIG. 65 and save & continue button 6610 which takes the user to the next step shown in FIG. 67.

Figure 68:
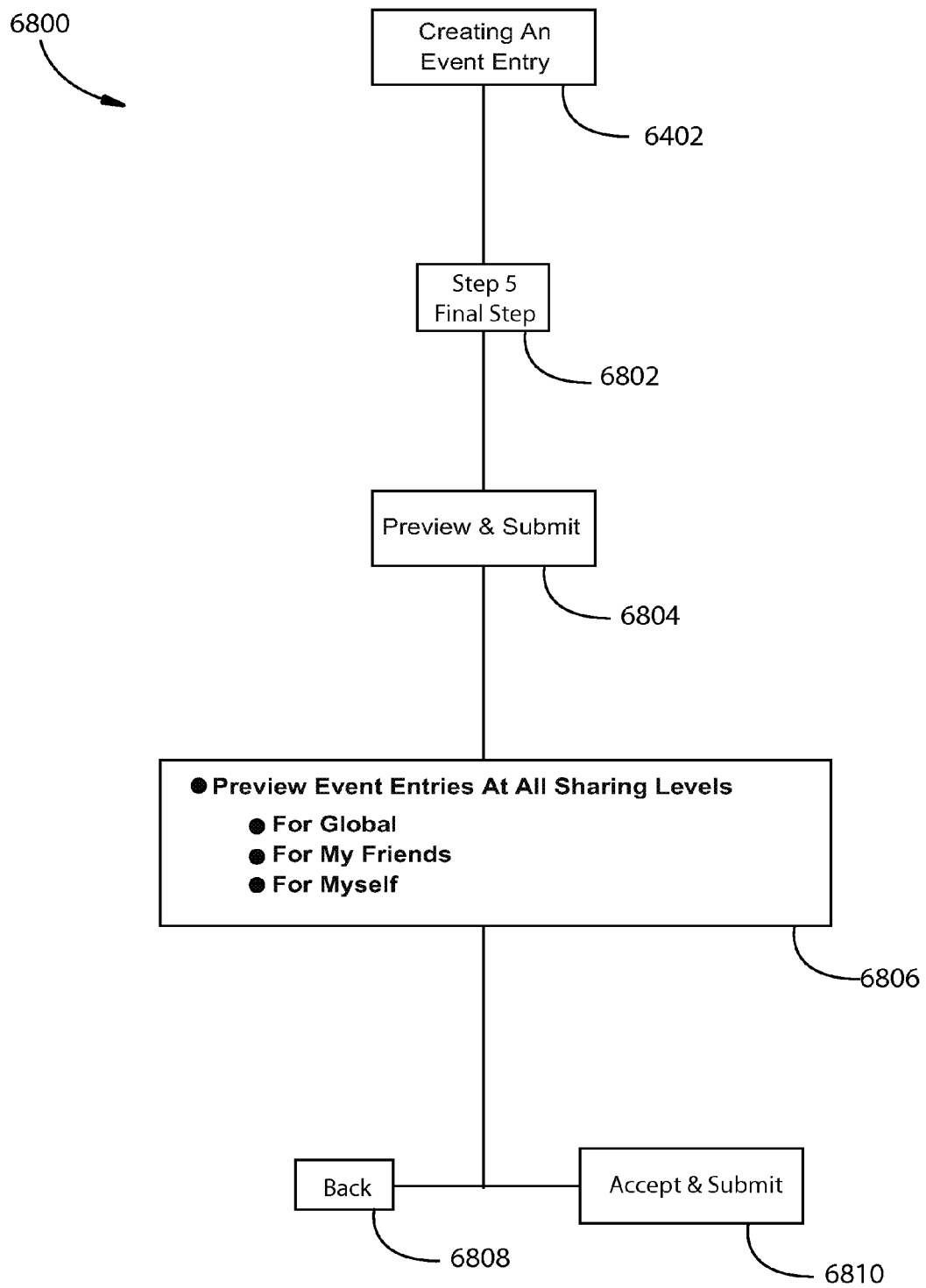

In step 4 of creating a event entry 6700, step 4 objects are displayed 6702, including a video upload interface 6704 for the user to select videos to share, which here includes options for uploading videos for sharing globally, with friends, and only with the user, and instructions 6706, as well as back button 6708 which takes the user to the previous step in FIG. 66 and save & continue button 6710 which takes the user to the next step shown in FIG. 68.

In step 5 of creating a event entry 6800, step 5 objects are displayed 6802, including a preview and submit interface 6804, which here includes options 6806 for previewing information shared globally, for friends, and for the user only before submission, as well as back button 6808 which takes the user to the previous step in FIG. 67 and accept & submit button 6810 which submits the input information to the website for sharing with other users (as specified by the user's privacy settings) in one easy step.

Figure 69:
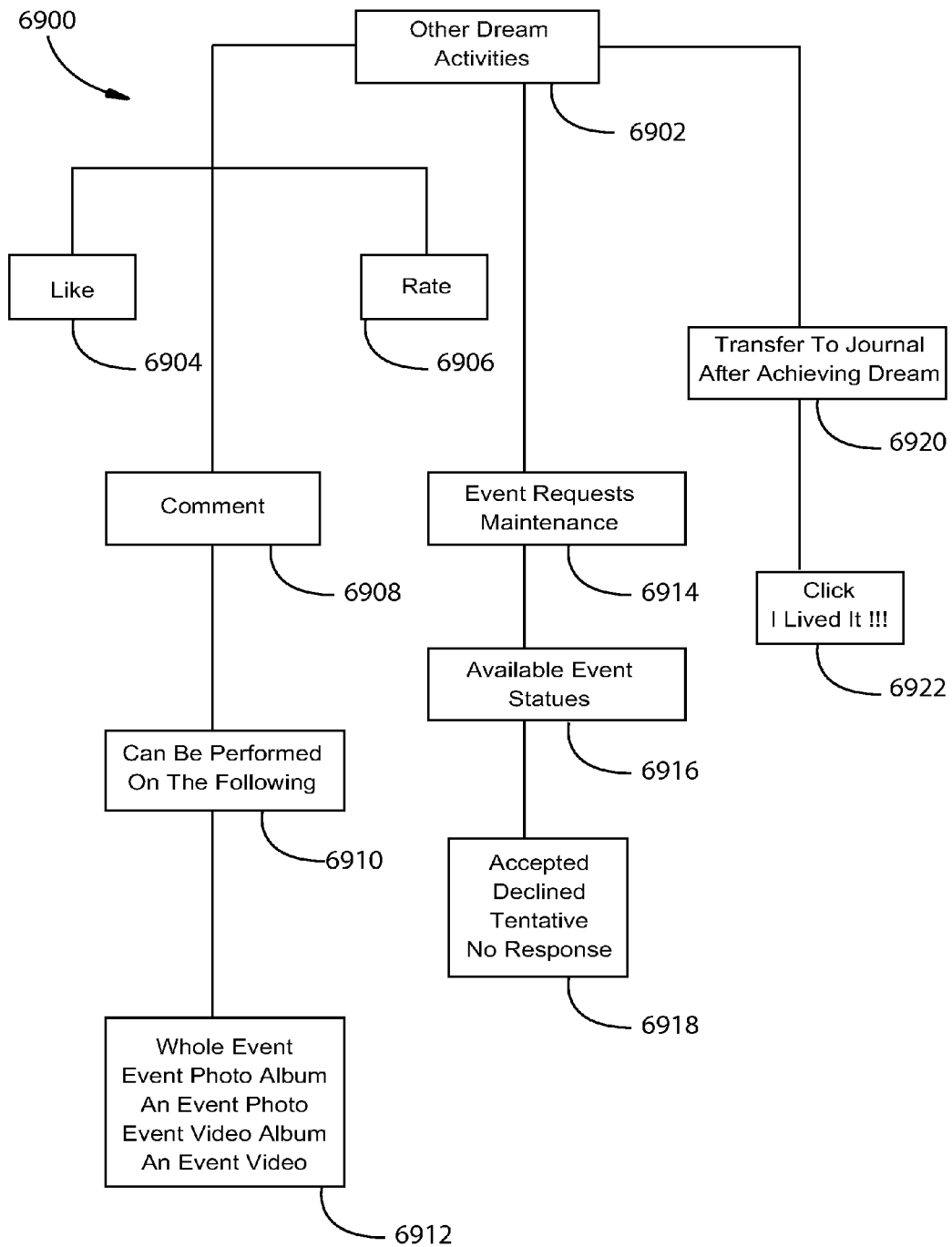
FIG. 69 is a flowchart illustrating a website process for other interactive event activities, in an embodiment.

FIG. 69 is a flowchart illustrating a website process for other interactive event activities 6900, in an embodiment. Other event activities objects are displayed 6902, including Like object 6904 for a user to indicate that they like a event entry or element, Rate object 6906 for a user to rate the event entry or element, Comment object 6908 which allows a user to comment on a event entry or element, event requests maintenance object 6914, and Transfer to Journal object 6920. Objects 6904, 6906, 6908 are displayed 6910 with an entire event entry, event photo album, event photo, event video album, or event video 6912. Selecting events requests maintenance 6914 displays the status of available events 6916, which can be accepted, declined, tentative, or no response 6918. Transfer to Journal object 6920 can be activated by clicking an I Lived It button 6922 on a event entry.

Figure 70:
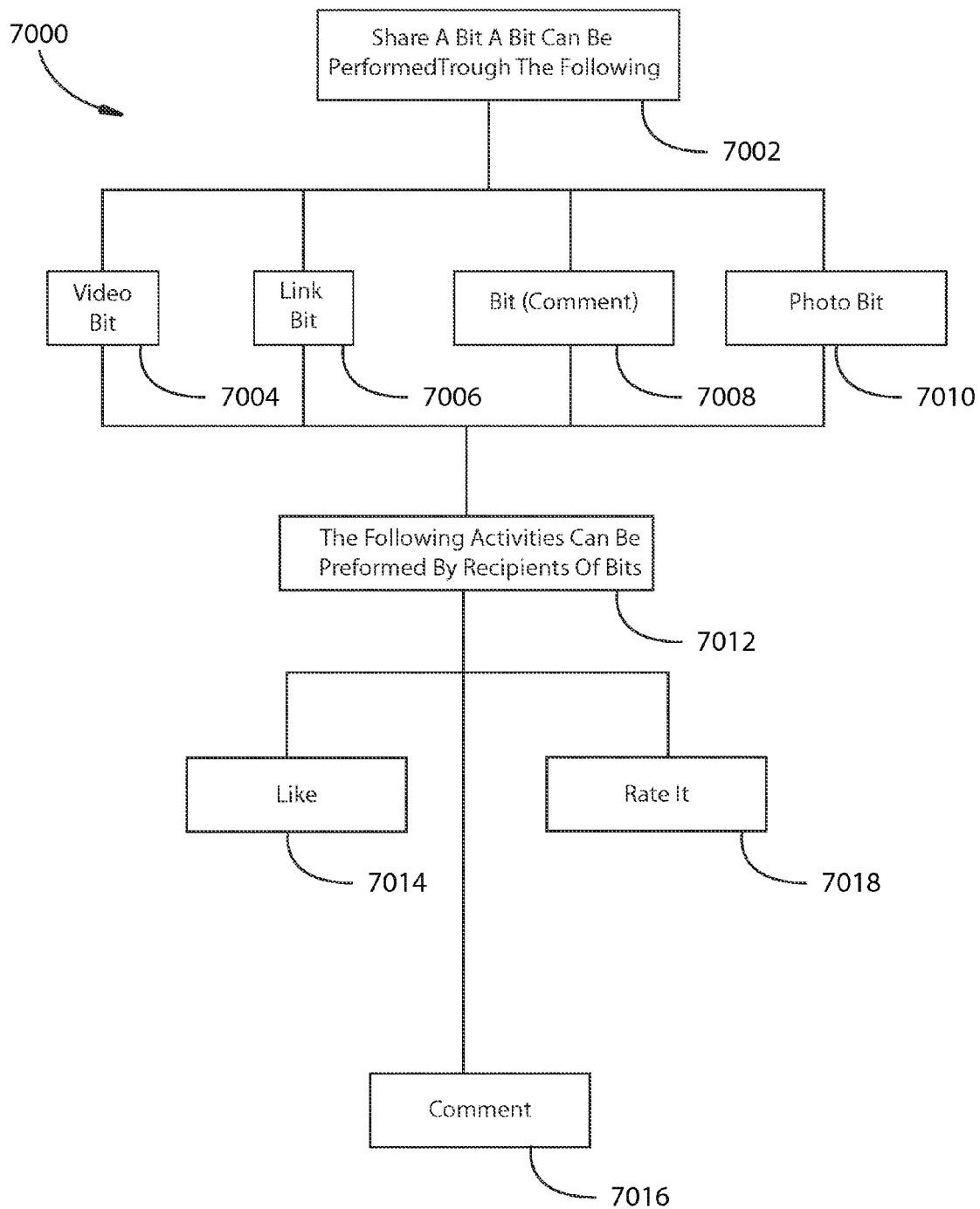
FIG. 70 is a flowchart illustrating a website process for bit sharing, in an embodiment.

FIG. 70 is a flowchart illustrating a website process for bit sharing 7000, in an embodiment. The page displays options for sharing bits 7002 (which are basically elements of interaction/sharing such as comments, photos, links, videos, etc.), including options for sharing a video bit 7004, link bit 7006, comment bit 7008, and photo bit 7010. After sharing, the website displays to recipients various options 7012, including to Like the bit 7014, Rate the bit 7018, or comment on the bit 7016.

Figure 71:
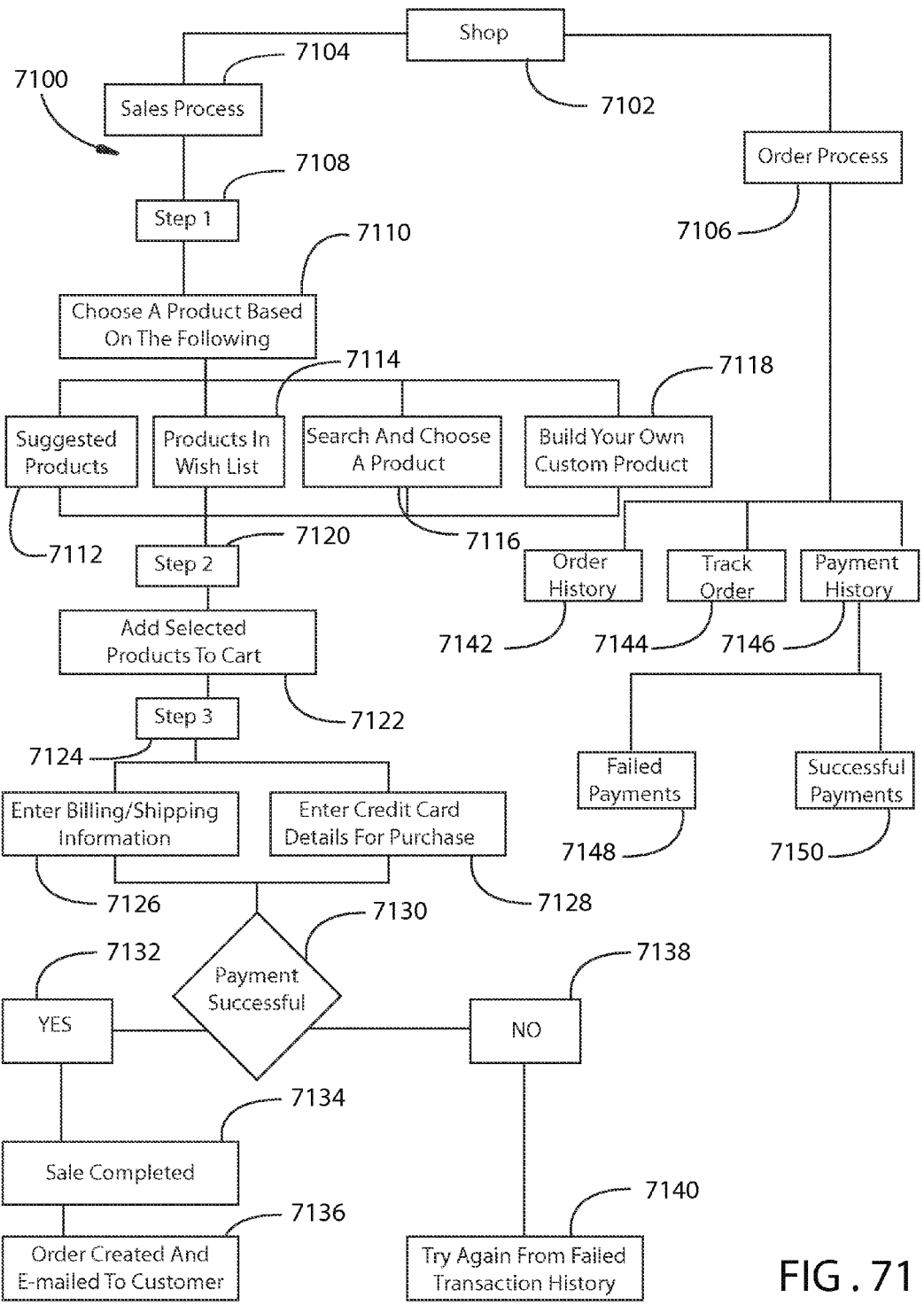
FIG. 71 is a flowchart illustrating a shop website process, in an embodiment.

FIG. 71 is a flowchart illustrating a shop website process 7100, in an embodiment. A shop page is displayed 7102 which includes options for a user to purchase 7104 or to check on an order 7106. The sales process when initiated begins by displaying step 1 element 7108, including options for choosing a product to purchase 7110 based on suggested products for that user 7112, products in the user's wish list 7114, by searching through available products 7116, and by building a custom product 7118. Once desired products have been selected, step 2 elements are displayed 7120 including the option to add the selected products to the user's cart 7122. Step 3 elements are then displayed 7124, including fields for entering billing/shipping information 7126 and for entering credit card details 7128. The payment is processed 7130, if a successful payment is processed 7132 a sale is completed 7134 and an order is created and sent to the user 7136. If not 7138, an option is given to try payment again 7140.

The order checking process 7106 when selected gives the user the option to view order history 7142, track orders 7144, and view payment history 7146. Viewing payment history displays both failed payments 7148 and successful payments 7150.

One embodiment of the invention is implemented as a program product for use with a computer system such as, for example, the computing environment 7200 shown in FIG. 72 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, solid state storage devices); and (iii) information conveyed to a computer by a communications medium, such as through a computer or telephone network, including wireless communications. The latter embodiment specifically includes information downloaded from the Internet and/or other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices.

In addition, various programs described hereinafter may be identified based upon the application for which they are implemented in one or more specific embodiments of the invention. However, it should be appreciated that any particular program nomenclature that follows is used merely for convenience, and thus the invention should not be limited to use solely in any specific application identified and/or implied by such nomenclature. In this regard, references to particular definitional languages, such as HTML and XML, are illustrative in nature and do not serve to limit the claims. It is broadly contemplated that the invention is applicable regardless of the particular schema and/or language used to define network resource content.

Figure 72:
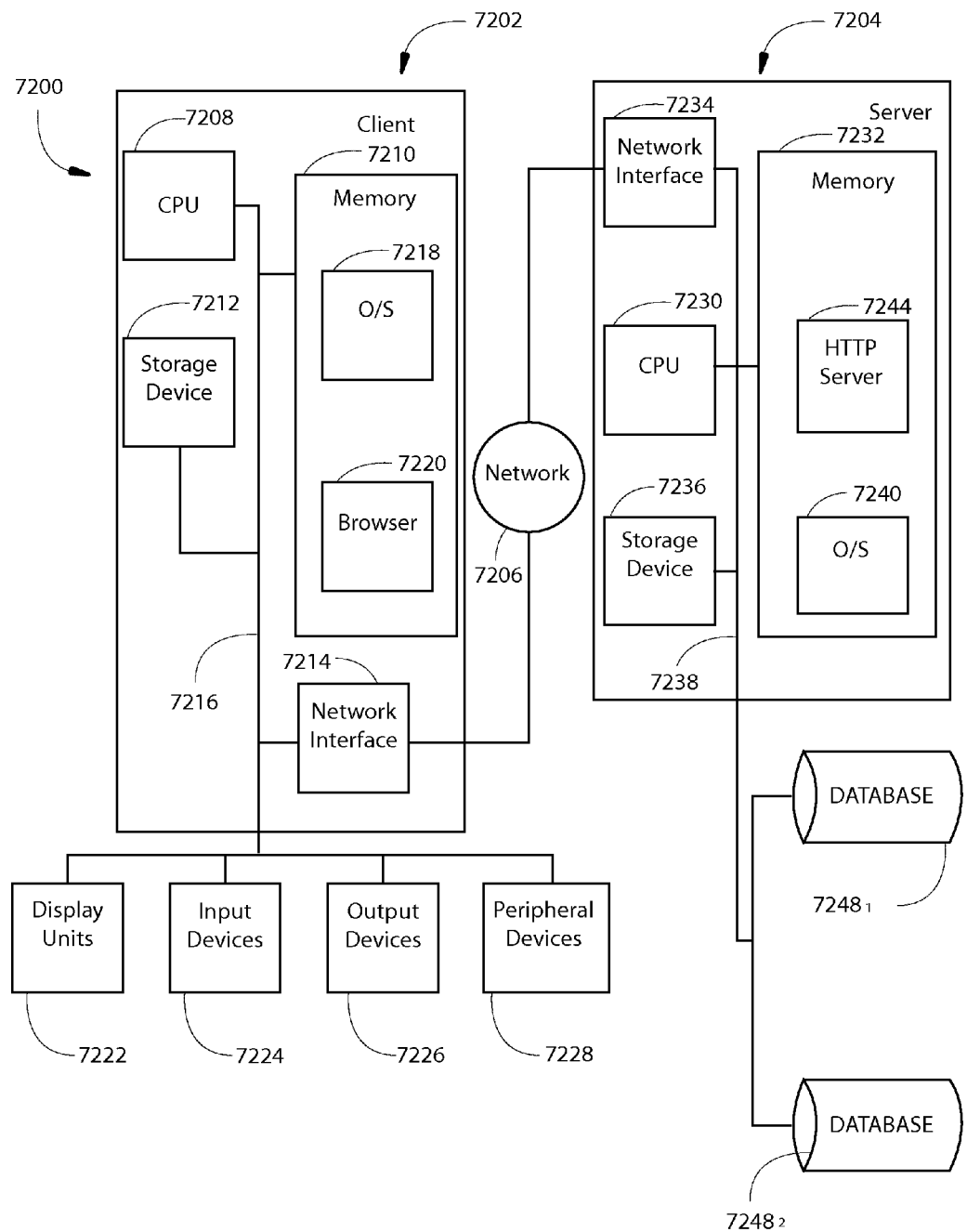
FIG. 72 is a block diagram illustrating an exemplary computing environment, in an embodiment.

Turning now to FIG. 72, a block diagram illustrating an exemplary computing environment 7200, in accordance with an embodiment of the present invention, is shown. In general, the computing environment 7200 includes a client (e.g., a user's) computer 7202, and a server computer 7204. The client computer 7202 and the server computer 7204 may be components of the same computer system or may be connected via a network 7206, such as the Internet.

As shown, the client computer 7202 includes a central processing unit (CPU) 7208 connected to a memory 7210, a storage device 7212, and a network interface 7214 via a bus 7216. The CPU 7208 is included to be representative of a single CPU, multiple CPUs, a single CPU having multiple processing cores, and the like. The storage device 7212 stores application programs and data for use by the client computer 7202. Examples of the storage device 7212 include one or more hard-disk drives, flash memory devices, optical media and the like.

The client computer 7202 may be connected to the data communications network 7206 (e.g., a local area network, which itself may be connected to other networks such as the internet) using the network interface 7214. The memory 7210 can be one or a combination of memory devices, including random access memory, nonvolatile or backup memory (e.g., programmable or flash memories, read-only memories, etc.). Illustratively, the memory 7210 of client computer 7202 stores an operating system 7218 used to manage hardware and software executing on the client computer 7202. As shown, memory 7210 also includes a browser program 7220 which, when executed by CPU 7208, provides support for navigating between various servers and locating network addresses at one or more of servers (e.g., server computer 7204).

The client computer 7202 may be connected to one or more display units 7222, input devices 7224, output devices 7226 and peripheral devices 7228. The display units 7222 may be internal or external monitors, television screens, handheld device displays, and the like. The input devices 7224 may be any one of a keyboard, mouse, track-ball, stylus, mouse pad, mouse button, joystick, scanner or the like. The output devices 7226 may be any one of a monitor, printer, plotter, copier or other output device. The peripheral devices 7228 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like.

Similar to the client computer 7202, the server computer 7204 may include a CPU 7230, a memory 7232, a network interface device 7234, and a storage device 7236, coupled via a bus 7238. The memory 7232 may be a random access memory sufficiently large to hold the necessary programming and data structures that are located on the server computer 7204. As shown, the memory 7232 stores an operating system 7240 used to manage server hardware and software executing on the server computer 7202. Illustratively, the memory 7232 also includes a hypertext transfer protocol (http) server 7244 configured to service requests from the client computer 7202. For example, the http server 7244 may respond to requests for access to electronic resources (e.g., HTML documents, network information, and the like) residing on the server computer 7204. The http server 7244 may receive requests to receive user profile, journal, or other information upon a user selecting an option to view or search such information. In response, the http server 7244 communicates with a software module that makes such information available for viewing (e.g., via the browser 7220) and download over the Internet. However, one of ordinary skill in the art will recognize that the http server 7244 is merely illustrative and embodiments of the invention may be adapted to support both known and unknown protocols.

The programming and data structures of the http server 7244 may be accessed and executed by the CPU 7230 as needed during operation. The server computer 7204 may connect to the network 7206 using the network interface device 7234 (e.g., an analog modem, a wired network card, or a wireless network device).

In one embodiment, users may interact with the server computer 7204 using a graphical user interface (GUI). In a particular embodiment, GUI content may comprise HTML documents (i.e., web pages) rendered on the display unit 7222 coupled with the client computer 7202 using the browser 7220. In one embodiment, the web pages may include pages that allow a user to interact with other users, store and share information relating to their own activities, interests and goals/dreams, search through, view, and save information about other user's shared activities, interests and goals/ dreams, search for an interact with friends and communities, receive advertisements relating to their interests, activities, and goals/dreams and make purchases, etc.

The memory 7232 may further include various software modules. The software modules may comprise a software application configured to provide the ability (e.g., via the GUI) to, for example, maintain the databases $7248_1$, $7248_2$ and/or other storage devices, process orders and initiate distribution of purchased items, authenticate users, etc.

Accordingly, the server computer 7204 may be coupled to a plurality of databases $7248_1$, $7248_2$ which may include a relational database $7248_1$ that is queried using an SQL query, or an XML database $7248_2$ queried using an XML query. The invention, however, is not limited to any particular physical database storage mechanism and may readily be extended to operate on other such mechanisms, whether currently known or unknown. While the databases $7248_1$, $7248_2$ are illustrated as being external to the server system, it is noted that the databases $7248_1$, $7248_2$ may exist on a local storage device (e.g., storage device 7236) of the server computer 7204, or may be accessed over the network 7206.

In some embodiments, information submitted by the users is stored on an Internet server and can be accessed by users, depending on their permission to access such information, from any device capable of connecting to the Internet. Other networks in some embodiments are used in place of the Internet for accessing the website system. In some embodiments, associated information is stored together in a relational database. For example, when a video is submitted with related description, comments, location, and rating, these pieces of information are stored in associated database fields. User profile, journal, dream list, and event information for example may be stored in databases $7248_1$, $7248_2$ and made available according to the settings of the user for other users to search through and view. The server computer may be connected with an external payment authentication network to handle payment authentication, and may similarly in some embodiments replace software modules with external networks or devices that perform the same function.

In other embodiments, software modules and storage may be distributed in a cloud environment, rather than residing on a central server or servers.

The invention is not limited to the particular embodiments illustrated in the drawings and described above in detail. Those skilled in the art will recognize that other arrangements could be devised, for example, using a differently configured or arranged website, or the use of downloadable software instead of or in addition to a website. The invention encompasses every possible combination of the various features of each embodiment disclosed. While the invention has been described with reference to specific illustrative embodiments, modifications and variations of the invention may be constructed without departing from the scope of the invention.

I claim:

1. An experience sharing and social networking method, comprising:
   receiving from a first user first information related to experiences and activities;
   storing the first information on a non-transitory computer-readable medium and associating it with the first user;
   displaying the first information to other users;
   receiving second information from at least one other user related to the first information, storing it, associating it with the first information, and displaying it users;
   categorizing and displaying the first information in a first category for experiences and activities indicated to have already taken place, in a second category for experiences and activities indicated to be taking place at a definite time in the future, and in a third category for experiences and activities indicated not to have taken place and not having been scheduled for any definite time in the future;
   receiving additional information from the first user indicating that at least some of the first information has moved from one category to another, re-categorizing the at least some of the first information accordingly, and modifying or adding to the first information as part of the re-categorization process; and
   converting the first information associated with the first user into second information associated with a second user in another category, and modifying or adding to the first information as part of the conversion process.

2. The method of claim 1, further comprising transmitting advertising information to the first user related to stored first information.

3. The method of claim 1, wherein the stored first information comprises multiple elements, further comprising receiving a security level associated with each element, wherein the security level dictates which other users the information can be displayed to.

4. The method of claim 3, wherein the second information received from the other user related to the first information is displayed only to users the first-information can be displayed to, as specified by the associated security level.

5. The method of claim 3, further comprising receiving an indication from two users that they desire to be associated as friends of one another and associating the two users as friends and receiving an indication from the user that the user desires to be associated with a community and associating the user with the community.

6. The method of claim 5, wherein the security level allows the associated element to be displayed to either a) only the user, b) only the user and at least one specified friend or group of friends, c) only the user and the user's friends, d) only the user, the user's friends, and members of at least one specified group the user is associated with, e) only the user, the user's friends, and members of groups the user is associated with, or f) all users.

7. The method of claim 5, further comprising organizing the user's friends into groups received from the user, wherein each of the user's friends may be members of one or more of the groups.

8. The method of claim 3, wherein the second information is displayed only to a subset of the users the first information can be displayed to, as specified by the associated security level, wherein the subset is received from the other user.

9. The method of claim 1, wherein the first information comprises videos, photographs, comments, locations, costs, and ratings.

10. The method of claim 1, further comprising transmitting public and private messages between users.

11. The method of claim 3, further comprising receiving a user query comprising search terms and one or more results categories and displaying stored first information relevant to terms of the query, viewable by the user, and falling under the results categories received, wherein the search terms comprise one or more of the following: location, type of experience or activity, cost, and rating.

12. The method of claim 1, wherein the second information is displayed to the user on a main website page together with the first information in expandable and collapsible form.

13. An experience sharing and social networking method, comprising:
   transmitting first information from a first user related to an experience or activity, including the date on which it occurred, the date for which it is planned, or that it has not occurred or been planned, to a central computing device over a network for storing and sharing with other users;
   updating transmitted first information to reflect that a scheduled experience or activity has taken place or been canceled, or to reflect that an experience or activity with no associated date has been scheduled or has taken place;
   receiving and viewing second information submitted by one or more other users regarding the transmitted first information;
   viewing third information submitted by one of said one or more other user pertaining to their experiences and activities; and
   viewing the third information pertaining to the other user's experience or activity on a graphical user interface, adding or modifying the third information on the graphical user interface so that the third information pertains to the first user's own experience or activity, including whether and when the experience or activity took place or is scheduled, and transmitting the added or modified third information to the central computing device over a network for storing and sharing with other users.

14. The method of claim 13, wherein the transmitted first information related to an experience or activity comprises multiple elements, further comprising transmitting a security level associated with each element, wherein the security level dictates which other users can view the first information.

15. The method of claim 13, further comprising transmitting second information pertaining to the other user's experience or activity for sharing with other users.

16. The method of claim 14, further comprising accepting a friend request from another user and requesting to be associated with a community.

17. The method of claim 16, wherein the security level allows the associated element to be displayed to either a) only the user transmitting the associated element, b) only the user transmitting the associated element and at least one specified friend or group of friends of the user, c) only the user transmitting the associated element and the user's friends, d) only the user transmitting the associated element, the user's friends, and members of at least one specified group the user is associated with, e) only the user transmitting the associated element, the user's friends, and members of groups the user is associated with, or f) all users.

18. The method of claim 16, further comprising organizing friends into one or more groups, wherein each friend may be a member of one or more of the groups.

19. The method of claim 14, further comprising transmitting a user query comprising search terms and one or more results categories and receiving information submitted by another user pertaining to the other user's experience or activity related to experiences and activities relevant to terms of the query, and falling under the results categories transmitted, wherein the search terms comprise one or more of the following: location, type of experience or activity, cost, and rating.

20. An experience sharing and social networking system, comprising:
- a processor; and
- a memory containing software modules, which, when executed by the processor, are configured to perform operations, the operations comprising:
- receiving from first users first information related to experiences and activities;
- storing the first information received from first users on a non-transitory computer-readable medium and associating it with the first users from which it was received;
- displaying the first information received from first users to other users;
- receiving second information from other users related to the displayed first information, storing it, associating it with the displayed first information, and displaying it to users;
- categorizing and displaying the received first information related to experiences and activities in a first category for experiences and activities indicated to have already taken place, in a second category for experiences and activities indicated to be taking place at a definite time in the future, and in a third category for experiences and activities indicated not to have taken place and not having been scheduled for any definite time in the future;
- receiving additional information from a user indicating that the first information has moved from one category to another, re-categorizing the first information accordingly, and modifying or adding to the first information as part of the re-categorization process; and
- converting the first information associated with the first user into information associated with a second user in another category, and modifying or adding to the first information as part of the conversion process.

21. A non-transitory computer-readable storage medium including a program, which when executed on a processor performs an operation, the operation comprising:
- receiving from first users first information related to experiences and activities;
- storing the first information received from first users on a non-transitory computer-readable medium and associating it with the first users from which it was received;
- displaying the first information to other users;
- receiving second information from other users related to the displayed first information, storing it, associating it with the displayed first information, and displaying it to users;
- categorizing and displaying the first information in a first category for experiences and activities indicated to have already taken place, in a second category for experiences and activities indicated to be taking place at a definite time in the future, and in a third category for experiences and activities indicated not to have taken place and not having been scheduled for any definite time in the future;
- receiving additional information from the first user indicating that information related to an experience or activity has moved from one category to another, re-categorizing the first information accordingly, and modifying or adding to the first information as part of the re-categorization process; and
- converting first information associated with the first user into second information associated with a second user in another category, and modifying or adding to the first information as part of the conversion process.

* * * * *